US011267980B2

United States Patent
Tangirala et al.

(10) Patent No.: US 11,267,980 B2
(45) Date of Patent: Mar. 8, 2022

(54) APPLICATION OF POLYFUNCTIONAL LIGANDS FOR IMPROVING PERFORMANCE AND STABILITY OF QUANTUM DOT INKS

(71) Applicant: Nanosys, Inc., Milpitas, CA (US)

(72) Inventors: Ravisubhash Tangirala, Fremont, CA (US); Austin Smith, Redwood City, CA (US); Charles Hotz, San Rafael, CA (US)

(73) Assignee: Nanosys, Inc., Milpitas, CA (US)

(*) Notice: Subject to any disclaimer, the term of this patent is extended or adjusted under 35 U.S.C. 154(b) by 159 days.

(21) Appl. No.: 16/758,626

(22) PCT Filed: Oct. 24, 2018

(86) PCT No.: PCT/US2018/057288
§ 371 (c)(1),
(2) Date: Apr. 23, 2020

(87) PCT Pub. No.: WO2019/084119
PCT Pub. Date: May 2, 2019

(65) Prior Publication Data
US 2020/0347254 A1    Nov. 5, 2020

Related U.S. Application Data

(60) Provisional application No. 62/578,190, filed on Oct. 27, 2017.

(51) Int. Cl.
*C09K 11/02* (2006.01)
*C09D 11/102* (2014.01)
(Continued)

(52) U.S. Cl.
CPC ............ *C09D 11/50* (2013.01); *C09D 11/033* (2013.01); *C09D 11/037* (2013.01); *C09D 11/102* (2013.01); *C09K 11/025* (2013.01); *C09K 11/0883* (2013.01); *C09K 11/70* (2013.01); *C09K 11/883* (2013.01); *B82Y 20/00* (2013.01); *B82Y 40/00* (2013.01)

(58) Field of Classification Search
CPC ........................ C09K 11/025; C09D 11/102
See application file for complete search history.

(56) References Cited

U.S. PATENT DOCUMENTS

| 5,851,723 A | 12/1998 | Kondo |
| 7,241,504 B2 | 7/2007 | Verborgt et al. |
| 2017/0162764 A1 | 6/2017 | Kan et al. |

FOREIGN PATENT DOCUMENTS

| WO | WO-2010015824 A1 | 2/2010 |
| WO | WO-2013181597 A2 | 12/2013 |

(Continued)

OTHER PUBLICATIONS

Goncalves. Fluorescent cartbon dots capped with PEG200 and mercaptosuccinic acid. Journal of Fluorescence Mar. 2010 (Year: 2010).*

(Continued)

*Primary Examiner* — Matthew E. Hoban
(74) *Attorney, Agent, or Firm* — Sterne, Kessler, Goldstein & Fox P.L.L.C.

(57) ABSTRACT

The present invention provides nanostructure compositions and methods of producing nanostructure compositions. The nanostructure compositions comprise a population of nanostructures comprising polyfunctional poly(alkylene oxide) ligands. The present invention also provides nanostructure films comprising the nanostructure compositions and methods of making nanostructure films using the nanostructure compositions.

21 Claims, 7 Drawing Sheets

(51) Int. Cl.
  *C09D 11/50*   (2014.01)
  *C09D 11/033*  (2014.01)
  *C09D 11/037*  (2014.01)
  *C09K 11/08*   (2006.01)
  *C09K 11/70*   (2006.01)
  *C09K 11/88*   (2006.01)
  *B82Y 20/00*   (2011.01)
  *B82Y 40/00*   (2011.01)

(56) References Cited

FOREIGN PATENT DOCUMENTS

| WO | WO-2015101777 A1 | 7/2015 |
| WO | WO-2017030857 A1 | 2/2017 |

OTHER PUBLICATIONS

Ren. Incorporation of silver nanoparticles coated with mercaptosuccinic acid/poly(ethylene glycol) copolymer into epoxy for enhancement of dielectric properties. Materials Chemistry and Physics 137 (2012) 673-680 (Year: 2012).*

International Search Report and Written Opinion for International Application No. PCT/US2018/057288, European Patent Office, Netherlands, dated Apr. 4, 2019, 16 pages.

Medintz, I.L., et al., "Quantum dot bioconjugates for imaging, labelling and sensing," *Nature Materials* 4(6):435-446, Nature Publishing Group, United Kingdom (2005).

Stewart, M.H., et al., "Multidentate poly(ethylene glycol) ligands provide colloidal stability to semiconductor and metallic nanocrystals in extreme conditions," *J Am Chem Soc* 132(28):9804-13, American Chemical Society, United States (2010).

* cited by examiner

APPLICATION OF POLYFUNCTIONAL LIGANDS FOR IMPROVING PERFORMANCE AND STABILITY OF QUANTUM DOT INKS

BACKGROUND OF THE INVENTION

Field of the Invention

The present invention provides nanostructure compositions and methods of producing nanostructure compositions. The nanostructure compositions comprise a population of nanostructures comprising polyfunctional poly(alkylene oxide) ligands. The present invention also provides nanostructure films comprising the nanostructure compositions and methods of making nanostructure films using the nanostructure compositions.

BACKGROUND OF THE INVENTION

Inkjet printing is a potentially cheaper and more efficient alternative to photolithography for fabrication of quantum dot color conversion layers. Epoxy chemistry offers an attractive option for development of inks containing quantum dots. Epoxides and other cyclic ethers, such as oxetanes, are highly strained structures that react easily with nucleophilic reagents such as alcohols, amines, and carboxylic acids to generate cross-linked polymer networks. These reactions can be catalyzed by thermal or cationic methods, making epoxy chemistry a versatile and commercially viable approach for fabricating inks.

Many approaches exist for the design of quantum dot inks including those that rely on epoxy chemistry. One approach uses a polymer with pendant epoxide groups, which upon heating in the presence of a catalyst, forms a cross-linked thermoset network. Another approach uses multifunctional epoxide or oxetane monomers, which can be polymerized cationically through the use of a photoacid generator.

In both approaches, quantum dots have to be homogenized with the ink components. Polyethylene glycol (PEG) based ligands enable good dispersion in polymer solutions or the epoxy monomers. But, these ligands are usually only tethered on one side by attachment to the quantum dot surface through a carboxylic acid. While the PEG tail enables good dispersion in the ink, the methyl ether termination renders it a passive component upon film curing. The higher mobility of an untethered PEG tail can cause ligand detachment from the quantum dot surface upon heating or air exposure, leading to quantum dot quenching, and consequently, performance and reliability problems in any device in which the quantum dots are used.

Reactive or cross-linkable ligands are multifunctional molecules containing a head group that can attach to quantum dot surfaces and other functional groups available for further reactions at the other end. These types of ligands are useful for fabricating nanocomposite films in which quantum dots can be cross-linked with other components of the matrix.

Unfortunately, reactive ligands are often expensive and are difficult to design with and stabilize due to the complexity of handling selective reactions using multifunctional molecules. The desired ligands and the quantum dots capped with these ligands are also often required to be soluble in hydrophilic solvents, monomers, and polymers. As a result, there are limited multifunctional molecules that can be used to prepare reactive ligands.

Thiol-ene "click" chemistry offers an attractive alternative for the modular design of ligands. The reaction can be initiated by a free radical from thermal of photo-initiated sources and results in high yields.

A need exists to prepare nanostructure compositions and/or resin mixes that have improved stability and result in improved optical properties when used to prepare a nanostructure film. A need also exists to prepare ligands with multiple functional groups.

BRIEF SUMMARY OF THE INVENTION

The present invention provides a nanostructure composition, comprising:
(a) at least one population of nanostructures; and
(b) at least one polyfunctional poly(alkylene oxide) ligand, wherein the poly(alkylene oxide) ligand comprises at least two terminal functional groups, wherein at least one terminal functional group is bound to the surface of the nanostructures.

In some embodiments, the nanostructure composition comprises at least one polyfunctional poly(alkylene oxide) ligand, wherein the polyfunctional poly(alkylene oxide) ligand has formula I:

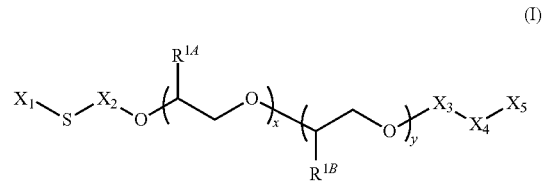

(I)

wherein:
x is 1 to 100;
y is 0 to 100;
$R^{1A}$ and $R^{1B}$ independently are H or $C_{1-20}$ alkyl;
$X_1$ is a linear or branched $C_{1-20}$ alkyl substituted by at least one —OH, —SH, —NH$_2$, —CO$_2$H, —P(O)(OH)$_2$, —P(O)OH, or —SO$_3$H;
$X_2$ is a $C_{1-12}$ alkylene;
$X_3$ is a bond or $C_{1-12}$ alkylene;
$X_4$ is a bond, —O—, —OC(=O)—, or amido; and
$X_5$ is a linear or branched $C_{1-20}$ alkyl substituted by at least one —OH, —SH, —NH$_2$, —CO$_2$H, —P(O)(OH)$_2$, —P(O)OH, or —SO$_3$H.

In some embodiments, the polyfunctional poly(alkylene oxide) ligand has formula II:

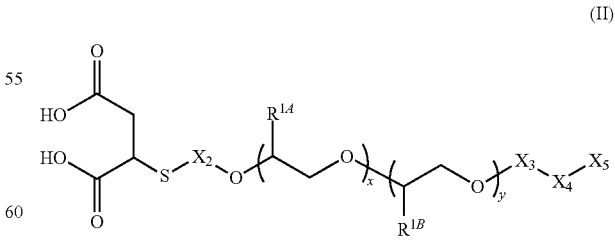

(II)

wherein:
x is 1 to 100;
y is 0 to 100;
$R^{1A}$ and $R^{1B}$ independently are H or $C_{1-20}$ alkyl;
$X_2$ is a $C_{1-12}$ alkylene;

$X_3$ is a bond or $C_{1-12}$ alkylene;

$X_4$ is a bond, —O—, —OC(=O)—, or amido; and $X_5$ is a linear or branched $C_{1-20}$ alkyl substituted by at least one —OH, —SH, —NH$_2$, —CO$_2$H, —P(O)(OH)$_2$, —P(O)OH, or —SO$_3$H.

In some embodiments, the nanostructure composition comprises between one and five populations of nanostructures. In some embodiments, the nanostructure composition comprises two populations of nanostructures.

In some embodiments, the nanostructures of the nanostructure composition comprise a core selected from the group consisting of InP, InZnP, InGaP, CdSe, CdS, CdSSe, CdZnSe, CdZnS, ZnSe, ZnSSe, InAs, InGaAs, and InAsP. In some embodiments, the nanostructures of the nanostructure composition comprise a core of InP.

In some embodiments, the nanostructures of the nanostructure composition comprise at least one shell.

In some embodiments, at least two of the terminal functional groups of the nanostructures of the nanostructure composition are different.

In some embodiments, x is 10 to 20 in the polyfunctional poly(alkylene oxide) ligand of Formula I. In some embodiments, x is 10 to 20 in the polyfunctional poly(alkylene oxide) ligand of Formula II.

In some embodiments, y is 0 to 10 in the polyfunctional poly(alkylene oxide) ligand of Formula I. In some embodiments, y is 0 to 10 in the polyfunctional poly(alkylene oxide) ligand of Formula II.

In some embodiments, $R^{1A}$ and $R^{1B}$ are —H in the polyfunctional poly(alkylene oxide) ligand of Formula I. In some embodiments, $R^{1A}$ and $R^{1B}$ are —H in the polyfunctional poly(alkylene oxide) ligand of Formula II.

In some embodiments, $X_2$ is —CH$_2$CH$_2$CH$_2$— in the polyfunctional poly(alkylene oxide) ligand of Formula I. In some embodiments, $X_2$ is —CH$_2$CH$_2$CH$_2$— in the polyfunctional poly(alkylene oxide) ligand of Formula II.

In some embodiments, the polyfunctional poly(alkylene oxide) ligand of the nanostructure composition has formula III:

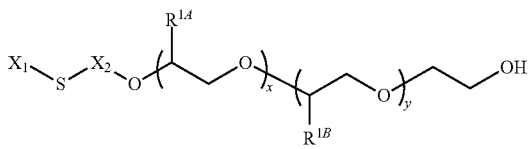

(III)

wherein:

x is 1 to 100;

y is 0 to 100;

$R^{1A}$ and $R^{1B}$ independently are H or $C_{1-20}$ alkyl;

$X_1$ is a linear or branched $C_{1-20}$ alkyl substituted by at least one —OH, —SH, —NH$_2$, —CO$_2$H, —P(O)(OH)$_2$, —P(O)OH, or —SO$_3$H; and $X_2$ is a $C_{1-12}$ alkylene.

In some embodiments, x is 10 to 20 and y is 0 in the polyfunctional poly(alkylene oxide) ligand of Formula III.

In some embodiments, $X_1$ is a branched $C_{1-20}$ alkyl in the polyfunctional poly(alkylene oxide) ligand of Formula III.

In some embodiments, $X_1$ is substituted by at least one —CO$_2$H in the polyfunctional poly(alkylene oxide) ligand of Formula III.

In some embodiments, the polyfunctional poly(alkylene oxide) ligand of the nanostructure composition has formula IV:

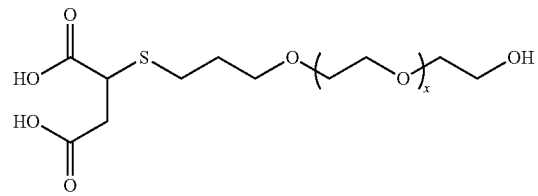

(IV)

wherein:

x is 1 to 100.

In some embodiments, x is 10 to 20 in the polyfunctional poly(alkylene oxide) ligand of Formula IV.

In some embodiments, the nanostructures of the nanostructure composition are quantum dots.

The present disclosure also provides a nanostructure composition, comprising:

(a) at least one population of nanostructures;

(b) a polyfunctional poly(alkylene oxide) ligand bound to the nanostructures; and (c) at least one organic resin.

In some embodiments, the nanostructure composition comprises between one and five populations of nanostructures. In some embodiments, the nanostructure composition comprises one population of nanostructures.

In some embodiments, the nanostructures of the nanostructure composition comprise a core selected from the group consisting of InP, InZnP, InGaP, CdSe, CdS, CdSSe, CdZnSe, CdZnS, ZnSe, ZnSSe, InAs, InGaAs, and InAsP. In some embodiments, the nanostructures of the nanostructure composition comprise a core of InP.

In some embodiments, the nanostructure composition comprises as a weight percentage between about 0.0001% and about 5% of the at least one population of nanostructures.

In some embodiments, the nanostructure composition comprises between one and five organic resins. In some embodiments, the nanostructure composition comprises one organic resin.

In some embodiments, the nanostructure composition comprises a thermosetting resin or a UV curable resin. In some embodiments, the nanostructure composition comprises an epoxy monomer.

In some embodiments, the at least one organic resin in the nanostructure composition is an epoxy monomer selected from the group consisting of 3,4-epoxycyclohexylmethyl-3',4'-epoxycyclohexane carboxylate, cyclohexene oxide, limonene dioxide, glycidyl methacrylate, trimethylolpropane triglycidyl ether, neopentyl glycol diglycidyl ether, bisphenol-A diglycidyl ether, glycidyl acrylate ester, glycidyl methacrylate ester, α-ethyl acrylate glycidyl ester, α-N-propyl acrylate glycidyl ester, α-N-butyl acrylate glycidyl ester, acrylate-3,4-epoxy-butyl ester, methacrylate-3,4-epoxy-butyl ester, acrylate-6,7-epoxy-heptyl ester, methacrylate-6,7-epoxy-heptyl ester, α-ethyl acrylate-6,7-epoxy-heptyl ester, o-vinyl benzyl glycidyl ether, m-vinyl benzyl glycidyl ether, and p-vinyl benzyl glycidyl ether.

In some embodiments, the at least one organic resin in the nanostructure composition is an oxetane monomer.

In some embodiments, the at least one organic resin in the nanostructure composition is an oxetane monomer selected from the group consisting of dioxetanyl ether, 3-ethyl-3-hydroxymethyl oxetane, 3-ethyl-3-phenoxymethyloxetane, 3,3-dimethyl oxetane, 3,3-(hydroxymethyl) methyl oxetane, 3,3-(nitratomethyl) methyl oxetane, 3,3-bis(hydroxymethyl) oxetane, 3,3-bis(chloromethyl) oxetane, 3,3-(azidomethyl) methyl oxetane, 3,3-bis(azidomethyl) oxetane, 3-methyl nitroaminomethyl-oxetane, 3,3-bis(methyl nitraminomethyl) oxetane, 3,3-(difluoro aminomethyl) methyl oxetane, 3,3-bis(difluoro aminomethyl) oxetane, 3-hydroxy-oxetane, 1,4-bis[(3-ethyl-3-oxetanylmethoxy)methyl]benzene, and bis[1-ethyl(3-oxetanyl)]methylether.

In some embodiments, the nanostructure composition further comprises an organic solvent. In some embodiments, the nanostructure composition further comprises an organic solvent selected from the group consisting of toluene, chloroform, propylene glycol methyl ether acetate, 1,4-butanediol diacetate, hexyl acetate, or combinations thereof.

In some embodiments, the nanostructure composition comprises as a weight percentage between about 5% and about 99% of the at least one organic resin.

In some embodiments, the nanostructure composition comprises a population of nanostructures comprising a InP core and/or a population of nanostructures comprising a CdSe core.

In some embodiments, the nanostructures in the nanostructure composition comprise at least one shell. In some embodiments, the nanostructure in the nanostructure composition comprise two shells.

In some embodiments, the nanostructures in the nanostructure composition are quantum dots.

In some embodiments, the nanostructure composition is stable for between about 1 day and about 3 years when stored at a temperature between about 10° C. and about 90° C.

In some embodiments, a molded article comprises the nanostructure composition described herein. In some embodiments, the molded article is a film, a substrate for a display, or a light emitting diode. In some embodiments, the molded article is a film.

The present disclosure provides a method of replacing a first ligand on a nanostructure with a second ligand, the method comprising admixing a reaction mixture comprising a population of nanostructures having the first ligand non-covalently bound to the nanostructure and a polyfunctional poly(alkylene oxide) ligand which is the second ligand, such that the second ligand displaces the first ligand and becomes non-covalently bound to the nanostructure, wherein the polyfunctional poly(alkylene oxide) ligand has formula I:

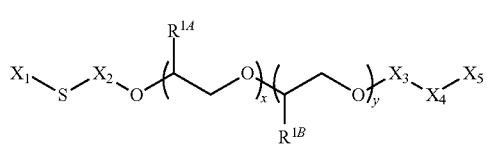

(I)

wherein:
x is 1 to 100;
y is 0 to 100;
$R^{1A}$ and $R^{1B}$ independently are H or $C_{1-20}$ alkyl;
$X_1$ is a linear or branched $C_{1-20}$ alkyl substituted by at least one —OH, —SH, —NH$_2$, —CO$_2$H, —P(O)(OH)$_2$, —P(O)OH, or —SO$_3$H;
$X_2$ is a $C_{1-12}$ alkylene;
$X_3$ is a bond or $C_{1-12}$ alkylene;
$X_4$ is a bond, —O—, —OC(=O)—, or amido; and
$X_5$ is a linear or branched $C_{1-20}$ alkyl substituted by at least one —OH, —SH, —NH$_2$, —CO$_2$H, —P(O)(OH)$_2$, —P(O)OH, or —SO$_3$H.

In some embodiments, the method of replacing a first ligand on a nanostructure with a second ligand comprises a second ligand which is a polyfunctional poly(alkylene oxide) ligand having formula II:

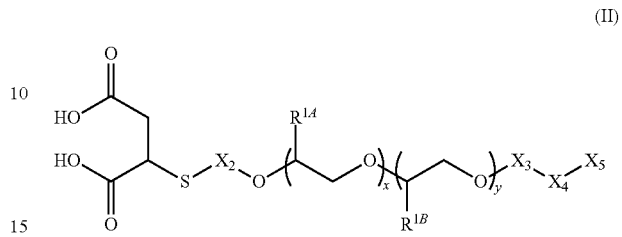

(II)

wherein:
x is 1 to 100;
y is 0 to 100;
$R^{1A}$ and $R^{1B}$ independently are H or $C_{1-20}$ alkyl;
$X_2$ is a $C_{1-12}$ alkylene;
$X_3$ is a bond or $C_{1-12}$ alkylene;
$X_4$ is a bond, —O—, —OC(=O)—, or amido; and
$X_5$ is a linear or branched $C_{1-20}$ alkyl substituted by at least one —OH, —SH, —NH$_2$, —CO$_2$H, —P(O)(OH)$_2$, —P(O)OH, or —SO$_3$H.

In some embodiments, the method of replacing a first ligand on a nanostructure with a second ligand comprises a second ligand which is a polyfunctional poly(alkylene oxide) ligand having formula III:

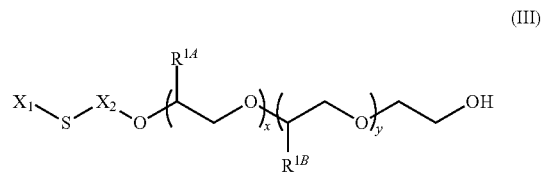

(III)

wherein:
x is 1 to 100;
y is 0 to 100;
$R^{1A}$ and $R^{1B}$ independently are H or $C_{1-20}$ alkyl;
$X_1$ is a linear or branched $C_{1-20}$ alkyl substituted by at least one —OH, —SH, —NH$_2$, —CO$_2$H, —P(O)(OH)$_2$, —P(O)OH, or —SO$_3$H; and
$X_2$ is a $C_{1-12}$ alkylene.

In some embodiments, the second ligand displaces between about 30% and about 100% of the first ligand on the nanostructure. In some embodiments the second ligand displaces between about 40% and about 100% of the first ligand on the nanostructure.

In some embodiments, the admixing is at an agitation rate between 100 rpm and 10,000 rpm.

In some embodiments, the admixing is for a time of between 1 minutes and 24 hours.

In some embodiments, the admixing is at a temperature between about 20° C. and about 100° C.

The present disclosure provides a method of preparing a nanostructure composition, the method comprising:
(a) providing a composition comprising at least one population of nanostructures and polyfunctional poly(alkylene oxide) ligands bound to the nanostructures; and
(b) admixing at least one organic resin with the composition of (a).

In some embodiments, the method of preparing a nanostructure composition comprises as a weight percentage between about 0.0001% and about 5% of the at least one population of nanostructures.

In some embodiments, the method of preparing a nanostructure composition comprises a polyfunctional poly(alkylene oxide) ligand having formula I:

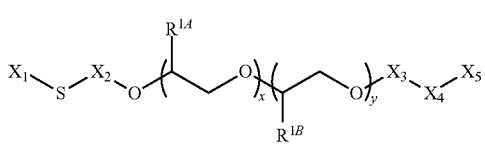

(I)

wherein:
x is 1 to 100;
y is 0 to 100;
$R^{1A}$ and $R^{1B}$ independently are H or $C_{1-20}$ alkyl;
$X_1$ is a linear or branched $C_{1-20}$ alkyl substituted by at least one —OH, —SH, —NH$_2$, —CO$_2$H, —P(O)(OH)$_2$, —P(O)OH, or —SO$_3$H;
$X_2$ is a $C_{1-12}$ alkylene;
$X_3$ is a bond or $C_{1-12}$ alkylene;
$X_4$ is a bond, —O—, —OC(=O)—, or amido; and
$X_5$ is a linear or branched $C_{1-20}$ alkyl substituted by at least one —OH, —SH, —NH$_2$, —CO$_2$H, —P(O)(OH)$_2$, —P(O)OH, or —SO$_3$H.

In some embodiments, the method of preparing a nanostructure composition comprises a polyfunctional poly(alkylene oxide) ligand having formula II:

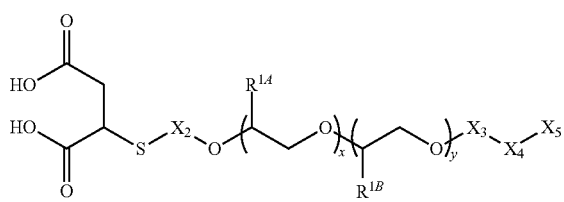

(II)

wherein:
x is 1 to 100;
y is 0 to 100;
$R^{1A}$ and $R^{1B}$ independently are H or $C_{1-20}$ alkyl;
$X_2$ is a $C_{1-12}$ alkylene;
$X_3$ is a bond or $C_{1-12}$ alkylene;
$X_4$ is a bond, —O—, —OC(=O)—, or amido; and
$X_5$ is a linear or branched $C_{1-20}$ alkyl substituted by at least one —OH, —SH, —NH$_2$, —CO$_2$H, —P(O)(OH)$_2$, —P(O)OH, or —SO$_3$H.

In some embodiments, the method of preparing a nanostructure composition comprises a polyfunctional poly(alkylene oxide) ligand of formula II wherein x is 10 to 20.

In some embodiments, the method of preparing a nanostructure composition comprises a polyfunctional poly(alkylene oxide) ligand of formula II wherein y is 0.

In some embodiments, the method of preparing a nanostructure composition comprises a polyfunctional poly(alkylene oxide) ligand of formula II wherein $R^{1A}$ and $R^{1B}$ are H.

In some embodiments, the method of preparing a nanostructure composition comprises a polyfunctional poly(alkylene oxide) ligand of formula II wherein $X_5$ is a branched $C_{1-20}$ alkyl.

In some embodiments, the method of preparing a nanostructure composition comprises a polyfunctional poly(alkylene oxide) ligand having formula III:

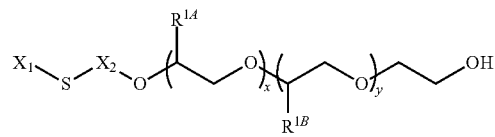

(III)

wherein:
x is 1 to 100;
y is 0 to 100;
$R^{1A}$ and $R^{1B}$ independently are H or $C_{1-20}$ alkyl;
$X_1$ is a linear or branched $C_{1-20}$ alkyl substituted by at least one —OH, —SH, —NH$_2$, —CO$_2$H, —P(O)(OH)$_2$, —P(O)OH, or —SO$_3$H; and
$X_2$ is a $C_{1-12}$ alkylene.

In some embodiments, the method of preparing a nanostructure composition comprises a polyfunctional poly(alkylene oxide) ligand of formula III wherein x is 10 to 20 and y is 0.

In some embodiments, the method of preparing a nanostructure composition comprises admixing between one and five organic resins. In some embodiments, the method of preparing a nanostructure composition comprises admixing one organic resin.

In some embodiments, the method of preparing a nanostructure composition comprises admixing at least one organic resin wherein the at least one organic resin is a thermosetting resin or a UV curable resin.

In some embodiments, the method of preparing a nanostructure composition comprises admixing at least one organic resin wherein the at least one organic resin is a UV curable resin.

In some embodiments, the method of preparing a nanostructure composition comprises admixing at least one organic resin wherein the at least one organic resin is a epoxy monomer or an oxetane monomer.

In some embodiments, the method of preparing a nanostructure composition comprises a nanostructure composition comprising as a weight percentage between about 5% and about 99% of the at least one organic resin.

In some embodiments, the method of preparing a nanostructure composition comprises a nanostructure composition wherein the nanostructures are quantum dots.

In some embodiments, the method of preparing a nanostructure composition comprises providing in (a):

(1) replacing a first ligand non-covalently bound to a population of nanostructures with the polyfunctional poly (alkylene oxide) ligand;

(2) purifying the nanostructures prepared in (1); and (3) dispersing the nanostructures in (2) in a organic resin or an organic solvent.

In some embodiments, the method of preparing a nanostructure composition comprises providing in (a) and further comprises:

(4) precipitating the nanostructures prepared in (1) in a non-polar solvent; and (5) centrifuging the composition in (4) and removing a supernatant.

In some embodiments, the non-polar solvent in (4) is hexane.

In some embodiments, the method of preparing a nanostructure composition comprises an organic resin, wherein the organic resin is an epoxy monomer or an oxetane monomer.

In some embodiments, the method of preparing a nanostructure composition comprises an organic solvent, wherein the organic solvent is toluene, chloroform, propylene glycol methyl ether acetate, 1,4-butanediol diacetate, hexyl acetate, or combinations thereof.

In some embodiments, the method of preparing a nanostructure composition comprises admixing, wherein the admixing is at an agitation rate between 100 rpm and 10,000 rpm.

In some embodiments, the method of preparing a nanostructure composition comprises admixing, wherein the admixing is for a time of between 1 minutes and 24 hours.

The present disclosure also provides a nanostructure film layer comprising:

(a) at least one population of nanostructures comprising a polyfunctional poly(alkylene oxide) ligand bound to the nanostructures; and (b) at least one organic resin.

In some embodiments, the nanostructure film layer comprises between one and five populations of nanostructures. In some embodiments, the nanostructure film layer comprises one population of nanostructures.

In some embodiments, the nanostructure film layer comprises a population of nanostructures, wherein the at least one population of nanostructures comprises a core selected from the group consisting of InP, InZnP, InGaP, CdSe, CdS, CdSSe, CdZnSe, CdZnS, ZnSe, ZnSSe, InAs, InGaAs, and InAsP. In some embodiments, the nanostructure film layer comprises a population of nanostructures, wherein the nanostructures comprises a core of InP.

In some embodiments, the nanostructure film layer comprises a population of nanostructures, wherein the at least one population of nanostructures comprises as a weight percentage between about 0.0001% and about 5% of the total weight of the nanostructure film layer.

In some embodiments, the polyfunctional poly(alkylene oxide) ligand of the nanostructure film layer has formula I:

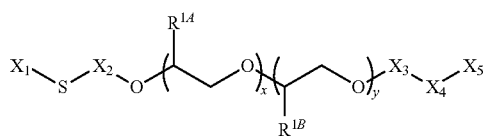

(I)

wherein:
x is 1 to 100;
y is 0 to 100;
$R^{1A}$ and $R^{1B}$ independently are H or $C_{1-20}$ alkyl;
$X_1$ is a linear or branched $C_{1-20}$ alkyl substituted by at least one —OH, —SH, —NH$_2$, —CO$_2$H, —P(O)(OH)$_2$, —P(O)OH, or —SO$_3$H;
$X_2$ is a $C_{1-12}$ alkylene;
$X_3$ is a bond or $C_{1-12}$ alkylene;
$X_4$ is a bond, —O—, —OC(=O)—, or amido; and
$X_5$ is a linear or branched $C_{1-20}$ alkyl substituted by at least one —OH, —SH, —NH$_2$, —CO$_2$H, —P(O)(OH)$_2$, —P(O)OH, or —SO$_3$H.

In some embodiments, the polyfunctional poly(alkylene oxide) ligand of the nanostructure film layer has formula I, wherein x is 10 to 20.

In some embodiments, the polyfunctional poly(alkylene oxide) ligand of the nanostructure film layer has formula I, wherein y is 0.

In some embodiments, the polyfunctional poly(alkylene oxide) ligand of the nanostructure film layer has formula I, wherein $R^{1A}$ and $R^{1B}$ are H.

In some embodiments, the polyfunctional poly(alkylene oxide) ligand of the nanostructure film layer has formula I, wherein $X_1$ is a branched $C_{1-20}$ alkyl.

In some embodiments, the polyfunctional poly(alkylene oxide) ligand of the nanostructure film layer has formula II

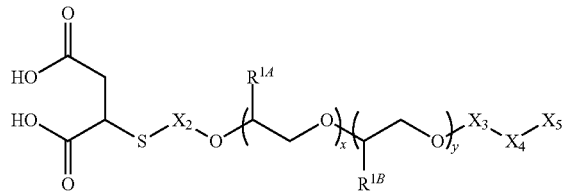

(II)

wherein:
x is 1 to 100;
y is 0 to 100;
$R^{1A}$ and $R^{1B}$ independently are H or $C_{1-20}$ alkyl;
$X_2$ is a $C_{1-12}$ alkylene;
$X_3$ is a bond or $C_{1-12}$ alkylene;
$X_4$ is a bond, —O—, —OC(=O)—, or amido; and
$X_5$ is a linear or branched $C_{1-20}$ alkyl substituted by at least one —OH, —SH, —NH$_2$, —CO$_2$H, —P(O)(OH)$_2$, —P(O)OH, or —SO$_3$H.

In some embodiments, the polyfunctional poly(alkylene oxide) ligand of the nanostructure film layer has formula II, wherein x is 10 to 20 and y is 0.

In some embodiments, the nanostructure film layer comprises between one and five organic resins. In some embodiments, the nanostructure film layer comprises one organic resin.

In some embodiments, the nanostructure film layer comprises at least one organic resin, wherein the at least one organic resin is a thermosetting resin or a UV curable resin.

In some embodiments, the nanostructure film layer comprises at least one organic resin, wherein the at least one organic resin is a UV curable resin.

In some embodiments, the nanostructure film layer comprises at least one organic resin, wherein the at least one organic resin is an epoxy monomer or an oxetane monomer.

In some embodiments, the nanostructure film layer comprises at least one organic resin, wherein the at least one organic resin is an epoxy monomer selected from the group consisting of 3,4-epoxycyclohexylmethyl-3',4'-epoxycyclohexane carboxylate, cyclohexene oxide, limonene dioxide, glycidyl methacrylate, trimethylolpropane triglycidyl ether, neopentyl glycol diglycidyl ether, bisphenol-A diglycidyl ether, glycidyl acrylate ester, glycidyl methacrylate ester, α-ethyl acrylate glycidyl ester, α-N-propyl acrylate glycidyl ester, α-N-butyl acrylate glycidyl ester, acrylate-3,4-epoxy-butyl ester, methacrylate-3,4-epoxy-butyl ester, acrylate-6,7-epoxy-heptyl ester, methacrylate-6,7-epoxy-heptyl ester, α-ethyl acrylate-6,7-epoxy-heptyl ester, o-vinyl benzyl glycidyl ether, m-vinyl benzyl glycidyl ether, and p-vinyl benzyl glycidyl ether.

In some embodiments, the nanostructure film layer comprises at least one organic resin, wherein the at least one organic resin is an oxetane monomer selected from the group consisting of dioxetanyl ether, 3-ethyl-3-hydroxymethyl oxetane, 3-ethyl-3-phenoxymethyloxetane, 3,3-dimethyl oxetane, 3,3-(hydroxymethyl) methyl oxetane, 3,3-(nitratomethyl) methyl oxetane, 3,3-bis(hydroxymethyl) oxetane, 3,3-bis(chloromethyl) oxetane, 3,3-(azidomethyl) methyl oxetane, 3,3-bis(azidomethyl) oxetane, 3-methyl nitroaminomethyl-oxetane, 3,3-bis(methyl nitraminomethyl) oxetane, 3,3-(difluoro aminomethyl) methyl oxetane, 3,3-bis(difluoro aminomethyl) oxetane, 3-hydroxy-oxetane, 1,4-bis[(3-ethyl-3-oxetanylmethoxy)methyl]benzene, and bis[1-ethyl(3-oxetanyl)]methylether.

In some embodiments, the nanostructure film layer comprises as a weight percentage between 5% and 99% of the at least one organic resin.

In some embodiments, the nanostructure film layer comprises at least one population of nanostructures, wherein the at least one population of nanostructures comprises at least one shell.

In some embodiments, the nanostructure film layer comprises at least one population of nanostructures, wherein the at least one population of nanostructures comprises two shells.

In some embodiments, the nanostructure film layer comprises at least one population of nanostructures, wherein the nanostructures are quantum dots.

In some embodiments, the nanostructure film layer comprises at least one population of quantum dots, wherein the quantum dots are InP and/or CdSe quantum dots.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Figure 1:
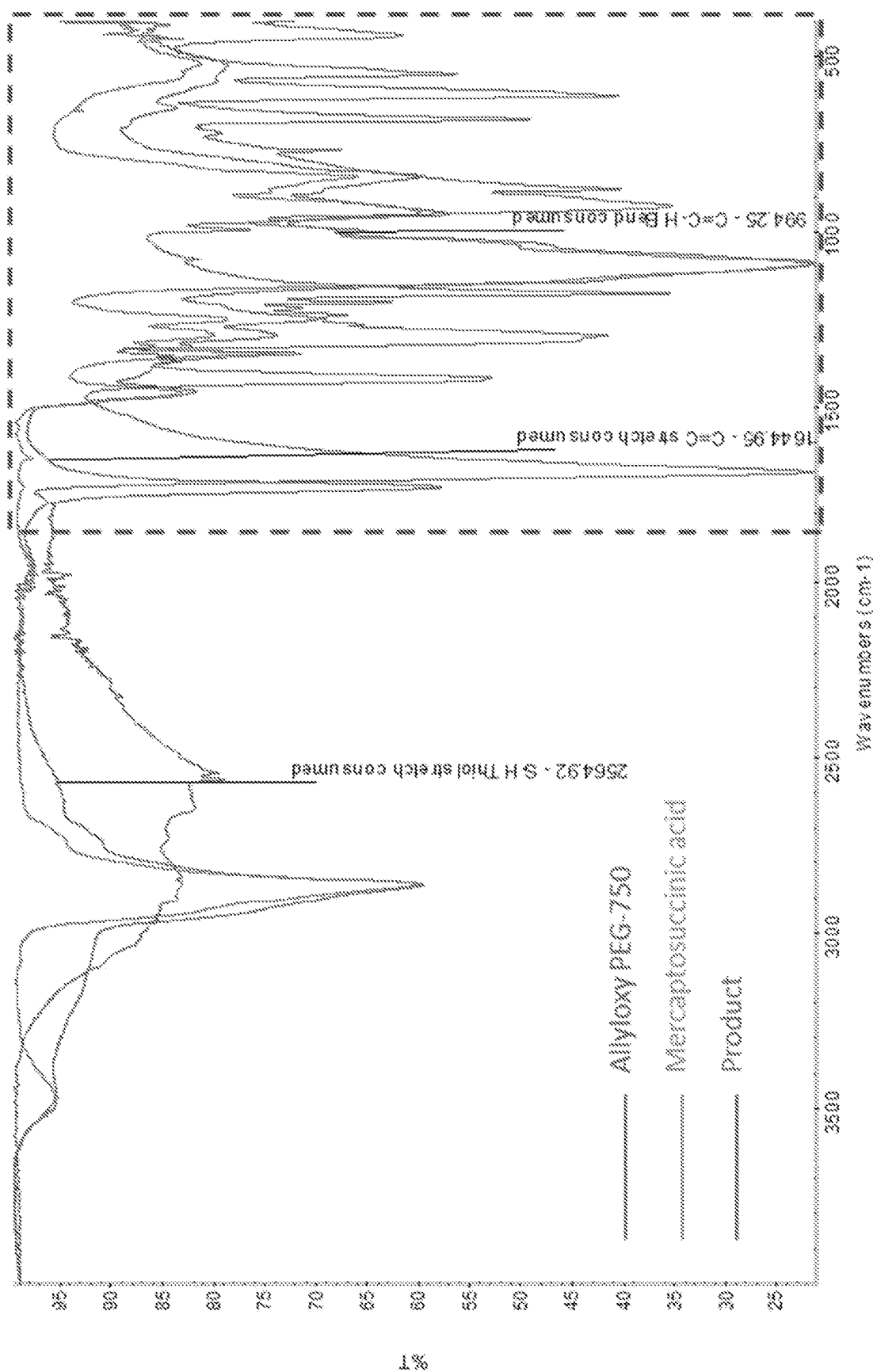
FIG. 1 is a Fourier-transform infrared (FTIR) spectra of the mercaptosuccinic acid starting material, the allyloxy PEG-750 starting material, and the hydroxy-terminated PEG-750 ligand product for the 400-4000 $cm^{-1}$ wavelength range.

Unless defined otherwise, all technical and scientific terms used herein have the same meaning as commonly understood by one of ordinary skill in the art to which the invention pertains. The following definitions supplement those in the art and are directed to the current application and are not to be imputed to any related or unrelated case, e.g., to any commonly owned patent or application. Although any methods and materials similar or equivalent to those described herein can be used in practice for testing, the preferred materials and methods are described herein. Accordingly, the terminology used herein is for the purpose of describing particular embodiments only, and is not intended to be limiting.

As used in this specification and the appended claims, the singular forms "a," "an," and "the" include plural referents unless the context clearly dictates otherwise. Thus, for example, reference to "a nanostructure" includes a plurality of such nanostructures, and the like.

The term "about" as used herein indicates the value of a given quantity varies by 10% of the value. For example, "about 100 nm" encompasses a range of sizes from 90 nm to 110 nm, inclusive.

A "nanostructure" is a structure having at least one region or characteristic dimension with a dimension of less than about 500 nm. In some embodiments, the nanostructure has a dimension of less than about 200 nm, less than about 100 nm, less than about 50 nm, less than about 20 nm, or less than about 10 nm. Typically, the region or characteristic dimension will be along the smallest axis of the structure. Examples of such structures include nanowires, nanorods, nanotubes, branched nanostructures, nanotetrapods, tripods, bipods, nanocrystals, nanodots, quantum dots, nanoparticles, and the like. Nanostructures can be, e.g., substantially crystalline, substantially monocrystalline, polycrystalline, amorphous, or a combination thereof. In some embodiments, each of the three dimensions of the nanostructure has a dimension of less than about 500 nm, less than about 200 nm, less than about 100 nm, less than about 50 nm, less than about 20 nm, or less than about 10 nm.

The term "heterostructure" when used with reference to nanostructures refers to nanostructures characterized by at least two different and/or distinguishable material types. Typically, one region of the nanostructure comprises a first material type, while a second region of the nanostructure comprises a second material type. In certain embodiments, the nanostructure comprises a core of a first material and at least one shell of a second (or third etc.) material, where the different material types are distributed radially about the long axis of a nanowire, a long axis of an arm of a branched nanowire, or the center of a nanocrystal, for example. A shell can but need not completely cover the adjacent materials to be considered a shell or for the nanostructure to be considered a heterostructure; for example, a nanocrystal characterized by a core of one material covered with small islands of a second material is a heterostructure. In other embodiments, the different material types are distributed at different locations within the nanostructure; e.g., along the major (long) axis of a nanowire or along a long axis of arm of a branched nanowire. Different regions within a heterostructure can comprise entirely different materials, or the different regions can comprise a base material (e.g., silicon) having different dopants or different concentrations of the same dopant.

As used herein, the "diameter" of a nanostructure refers to the diameter of a cross-section normal to a first axis of the nanostructure, where the first axis has the greatest difference in length with respect to the second and third axes (the second and third axes are the two axes whose lengths most nearly equal each other). The first axis is not necessarily the longest axis of the nanostructure; e.g., for a disk-shaped nanostructure, the cross-section would be a substantially circular cross-section normal to the short longitudinal axis of the disk. Where the cross-section is not circular, the diameter is the average of the major and minor axes of that cross-section. For an elongated or high aspect ratio nanostructure, such as a nanowire, the diameter is measured across a cross-section perpendicular to the longest axis of the nanowire. For a spherical nanostructure, the diameter is measured from one side to the other through the center of the sphere.

The terms "crystalline" or "substantially crystalline," when used with respect to nanostructures, refer to the fact that the nanostructures typically exhibit long-range ordering across one or more dimensions of the structure. It will be understood by one of skill in the art that the term "long range ordering" will depend on the absolute size of the specific nanostructures, as ordering for a single crystal cannot extend beyond the boundaries of the crystal. In this case, "long-range ordering" will mean substantial order across at least the majority of the dimension of the nanostructure. In some instances, a nanostructure can bear an oxide or other coating, or can be comprised of a core and at least one shell. In such instances it will be appreciated that the oxide, shell(s), or other coating can but need not exhibit such ordering (e.g. it can be amorphous, polycrystalline, or otherwise). In such instances, the phrase "crystalline," "substantially crystalline," "substantially monocrystalline," or "monocrystalline" refers to the central core of the nanostructure (excluding the coating layers or shells). The terms "crystalline" or "substantially crystalline" as used herein are intended to also encompass structures comprising various defects, stacking faults, atomic substitutions, and the like, as long as the structure exhibits substantial long range ordering (e.g., order over at least about 80% of the length of at least one axis of the nanostructure or its core). In addition, it will be appreciated that the interface between a core and the outside of a nanostructure or between a core and an adjacent shell or between a shell and a second adjacent shell may contain non-crystalline regions and may even be amorphous. This does not prevent the nanostructure from being crystalline or substantially crystalline as defined herein.

The term "monocrystalline" when used with respect to a nanostructure indicates that the nanostructure is substantially crystalline and comprises substantially a single crystal. When used with respect to a nanostructure heterostructure comprising a core and one or more shells, "monocrystalline" indicates that the core is substantially crystalline and comprises substantially a single crystal.

A "nanocrystal" is a nanostructure that is substantially monocrystalline. A nanocrystal thus has at least one region or characteristic dimension with a dimension of less than about 500 nm. In some embodiments, the nanocrystal has a dimension of less than about 200 nm, less than about 100 nm, less than about 50 nm, less than about 20 nm, or less than about 10 nm. The term "nanocrystal" is intended to encompass substantially monocrystalline nanostructures comprising various defects, stacking faults, atomic substitutions, and the like, as well as substantially monocrystalline nanostructures without such defects, faults, or substitutions. In the case of nanocrystal heterostructures comprising a core and one or more shells, the core of the nanocrystal is typically substantially monocrystalline, but the shell(s) need not be. In some embodiments, each of the three dimensions of the nanocrystal has a dimension of less than about 500 nm, less than about 200 nm, less than about 100 nm, less than about 50 nm, less than about 20 nm, or less than about 10 nm.

The term "quantum dot" (or "dot") refers to a nanocrystal that exhibits quantum confinement or exciton confinement. Quantum dots can be substantially homogenous in material properties, or in certain embodiments, can be heterogeneous, e.g., including a core and at least one shell. The optical properties of quantum dots can be influenced by their particle size, chemical composition, and/or surface composition, and can be determined by suitable optical testing available in the art. The ability to tailor the nanocrystal size, e.g., in the range between about 1 nm and about 15 nm, enables photoemission coverage in the entire optical spectrum to offer great versatility in color rendering.

A "ligand" is a molecule capable of interacting (whether weakly or strongly) with one or more facets of a nanostructure, e.g., through covalent, ionic, van der Waals, or other molecular interactions with the surface of the nanostructure.

"Photoluminescence quantum yield" is the ratio of photons emitted to photons absorbed, e.g., by a nanostructure or population of nanostructures. As known in the art, quantum yield is typically determined by a comparative method using well-characterized standard samples with known quantum yield values.

As used herein, the term "shell" refers to material deposited onto the core or onto previously deposited shells of the same or different composition and that result from a single act of deposition of the shell material. The exact shell thickness depends on the material as well as the precursor input and conversion and can be reported in nanometers or monolayers. As used herein, "target shell thickness" refers to the intended shell thickness used for calculation of the required precursor amount. As used herein, "actual shell thickness" refers to the actually deposited amount of shell material after the synthesis and can be measured by methods known in the art. By way of example, actual shell thickness can be measured by comparing particle diameters determined from transmission electron microscopy (TEM) images of nanocrystals before and after a shell synthesis.

As used herein, the term "solubilizing group" refers to a substantially non-polar group that has a low solubility in water and high solubility in organic solvents such as hexane, pentane, toluene, benzene, diethylether, acetone, ethyl acetate, dichloromethane (methylene chloride), chloroform, dimethylformamide, and N-methylpyrrolidinone. In some embodiments, the solubilizing group is a long-chain alkyl, a long-chain heteroalkyl, a long-chain alkenyl, a long-chain alkynyl, a cycloalkyl, or an aryl.

As used herein, the term "stable" refers to a mixture or composition that resists change or decomposition due to internal reaction or due to the action of air, heat, light, pressure, or other natural conditions. The stability of a nanostructure composition can be determined by measuring the peak emission wavelength after admixing at least one population of nanostructure, at least one polyfunctional poly(alkylene oxide), and optionally at least one organic resin. The peak emission wavelength can be measured by irradiating a nanostructure composition with UV or blue (450 nm) light and measuring the output with a spectrometer. The emission spectrum is compared to the emission from the original nanostructure composition. A nanostructure composition is stable if the peak emission wavelength does not shift by more than 5 nm.

As used herein, the term "full width at half-maximum" (FWHM) is a measure of the size distribution of quantum dots. The emission spectra of quantum dots generally have the shape of a Gaussian curve. The width of the Gaussian curve is defined as the FWHM and gives an idea of the size distribution of the particles. A smaller FWHM corresponds to a narrower quantum dot nanocrystal size distribution. FWHM is also dependent upon the emission wavelength maximum.

As used herein, the term "functional group equivalent weight" (FGEW) is used to determine the ratio of the reactive functional groups in a polymer. The FGEW of a polymer is defined as the ratio of the number average molecular weight (NAMW) to the number of functional groups in the polymer (n). It is the weight of a polymer that contains one formula weight of the functional group. The FGEW is calculated using end-group analysis by counting the number of reactive functional groups and dividing into the number average molecular weight:

$$FGEW=NAMW/n$$

where n=the number of reactive functional groups in the monomer.

"Alkyl" as used herein refers to a straight or branched, saturated, aliphatic radical having the number of carbon atoms indicated. In some embodiments, the alkyl is $C_{1-2}$ alkyl, $C_{1-3}$ alkyl, $C_{1-4}$ alkyl, $C_{1-5}$ alkyl, $C_{1-6}$ alkyl, $C_{1-7}$ alkyl, $C_{1-8}$ alkyl, $C_{1-9}$ alkyl, $C_{1-10}$ alkyl, $C_{1-12}$ alkyl, $C_{1-14}$ alkyl, $C_{1-16}$ alkyl, $C_{1-15}$ alkyl, $C_{1-20}$ alkyl, $C_{8-20}$ alkyl, $C_{12-20}$ alkyl, $C_{14-20}$ alkyl, $C_{16-20}$ alkyl, or $C_{18-20}$ alkyl. For example, $C_{1-6}$ alkyl includes, but is not limited to, methyl, ethyl, propyl, isopropyl, butyl, isobutyl, sec-butyl, tert-butyl, pentyl, isopentyl, and hexyl. In some embodiments, the alkyl is octyl, nonyl, decyl, undecyl, dodecyl, tridecyl, tetradecyl, pentadecyl, hexadecyl, heptadecyl, octadecyl, nonadecyl, or icosanyl.

The term "alkylene," as used herein, alone or in combination, refers to a saturated aliphatic group derived from a straight or branched chain saturated hydrocarbon attached at two or more positions, such as methylene ($-CH_2-$). Unless otherwise specified, the term "alkyl" may include "alkylene" groups.

"Alkenyl" as used herein refers to a monovalent group derived from a straight- or branched-chain hydrocarbon moiety having at least one carbon-carbon double bond by the removal of a single hydrogen atom. In some embodiments, the alkenyl group contains 2-20 carbon atoms and is a $C_{2-20}$ alkenyl. In some embodiments, the alkenyl group contains 2-15 carbon atoms and is a $C_{2-15}$ alkenyl. In some embodiments, the alkenyl group contains 2-10 carbon atoms and is a $C_{2-10}$ alkenyl. In some embodiments, the alkenyl group contains 2-8 carbon atoms and is a $C_{2-8}$ alkenyl. In some embodiments, the alkenyl group contains 2-5 carbons and is a $C_{2-5}$ alkenyl. Alkenyl groups include, for example, ethenyl, propenyl, butenyl, and 1-methyl-2-buten-1-yl.

"Alkynyl" as used herein refers to a monovalent group derived from a straight- or branched-chain hydrocarbon having at least one carbon-carbon triple bond by the removal of a single hydrogen atom. In some embodiments, the alkynyl group contains 2-20 carbon atoms and is a $C_{2-20}$ alkynyl. In some embodiments, the alkynyl group contains 2-15 carbon atoms and is a $C_{2-15}$ alkynyl. In some embodiments, the alkynyl group contains 2-10 carbon atoms and is a $C_{2-10}$ alkynyl. In some embodiments, the alkynyl group contains 2-8 carbon atoms and is a $C_{2-8}$ alkynyl. In some embodiments, the alkynyl group contains 2-5 carbons and is a $C_{2-5}$ alkynyl. Representative alkynyl groups include, but are not limited to, ethynyl, 2-propynyl (propargyl), and 1-propynyl.

"Alkylamino" as used herein, refers to a "substituted amino" of the formula ($—NR^K_2$), wherein $R^K$ is, independently, a hydrogen or an optionally substituted alkyl group, as defined herein, and the nitrogen moiety is directly attached to the parent molecule.

"Heteroalkyl" as used herein, refers to an alkyl moiety which is optionally substituted with one or more functional groups, and that contain one or more oxygen, sulfur, nitrogen, phosphorus, or silicon atoms, e.g., in place of carbon atoms.

"Cycloalkyl" as used herein, refers to a monovalent or divalent group of 3 to 8 carbon atoms, preferably 3 to 5 carbon atoms derived from a saturated cyclic hydrocarbon. Cycloalkyl groups can be monocyclic or polycyclic. Cycloalkyl can be substituted by $C_{1-3}$ alkyl groups or halogens.

"Amido" as used herein, refers to both "aminocarbonyl" and "carbonylamino." These terms when used alone or in connection with another group refers to an amido group such as $N(R^L R^M)$—C(O)— or $R^M C(O)$—N($R^L$) when used terminally and C(O)—N($R^L$) or N($R^M$)—C(O)— when used internally, wherein each of $R^L$ and $R^M$ is independently hydrogen, alkyl, cycloaliphatic, (cycloaliphatic)aliphatic, aryl, araliphatic, heterocycloaliphatic, (heterocycloaliphatic) aliphatic, heteroaryl, carboxy, sulfanyl, sulfinyl, sulfonyl, (aliphatic)carbonyl, (cycloaliphatic)carbonyl, ((cycloaliphatic)aliphatic)carbonyl, arylcarbonyl, (araliphatic)carbonyl, (heterocycloaliphatic)carbonyl, ((heterocycloaliphatic) aliphatic)carbonyl, (heteroaryl)carbonyl, or (heteroaraliphatic)carbonyl, each of which being defined herein and being optionally substituted. Examples of amino groups include alkylamino, dialkylamino, or arylamino. Examples of amido groups include alkylamido (such as alkylcarbonylamino or alkylcarbonylamino), (heterocycloaliphatic)amido, (heteroaralkyl)amido, (heteroaryl)amido, (heterocycloalkyl)alkylamido, arylamido, aralkylamido, (cycloalkyl)alkylamido, or cycloalkylamido.

"Carboxyalkyl" as used herein, refers to a carboxylic acid group (—COOH) appended to a lower alkyl radical.

"Heterocycloalkyl" as used herein, refers to cycloalkyl substituents that have from 1 to 5, and more typically from 1 to 4 heteroatoms in the ring structure. Suitable heteroatoms employed in compounds are nitrogen, oxygen, and sulfur. Representative heterocycloalkyl moieties include, for example, morpholino, piperazinyl, piperidinyl, and the like.

"Aryl" as used herein refers to unsubstituted monocyclic or bicyclic aromatic ring systems having from six to fourteen carbon atoms, i.e., a $C_{6-14}$ aryl. Non-limiting exemplary aryl groups include phenyl, naphthyl, phenanthryl, anthracyl, indenyl, azulenyl, biphenyl, biphenylenyl, and fluorenyl groups. In one embodiment, the aryl group is a phenyl or naphthyl.

"Heteroaryl" or "heteroaromatic" as used herein refers to unsubstituted monocyclic and bicyclic aromatic ring systems having 5 to 14 ring atoms, i.e., a 5- to 14-membered heteroaryl, wherein at least one carbon atom of one of the rings is replaced with a heteroatom independently selected from the group consisting of oxygen, nitrogen, and sulfur. In one embodiment, the heteroaryl contains 1, 2, 3, or 4 heteroatoms independently selected from the group consisting of oxygen, nitrogen, and sulfur. In one embodiment, the heteroaryl has three heteroatoms. In another embodiment, the heteroaryl has two heteroatoms. In another embodiment, the heteroaryl has one heteroatom. In another embodiment, the heteroaryl is a 5- to 10-membered heteroaryl. In another embodiment, the heteroaryl is a 5- or 6-membered heteroaryl. In another embodiment, the heteroaryl has 5 ring atoms, e.g., thienyl, a 5-membered heteroaryl having four carbon atoms and one sulfur atom. In another embodiment, the heteroaryl has 6 ring atoms, e.g., pyridyl, a 6-membered heteroaryl having five carbon atoms and one nitrogen atom. Non-limiting exemplary heteroaryl groups include thienyl, benzo[b]thienyl, naphtho[2,3-b]thienyl, thianthrenyl, furyl, benzofuryl, pyranyl, isobenzofuranyl, benzooxazonyl, chromenyl, xanthenyl, 2H-pyrrolyl, pyrrolyl, imidazolyl, pyrazolyl, pyridyl, pyrazinyl, pyrimidinyl, pyridazinyl, isoindolyl, 3H-indolyl, indolyl, indazolyl, purinyl, isoquinolyl, quinolyl, phthalazinyl, naphthyridinyl, cinnolinyl, quinazolinyl, pteridinyl, 4aH-carbazolyl, carbazolyl, β-carbolinyl, phenanthridinyl, acridinyl, pyrimidinyl, phenanthrolinyl, phenazinyl, thiazolyl, isothiazolyl, phenothiazolyl, isoxazolyl, furazanyl, and phenoxazinyl. In one embodiment, the heteroaryl is thienyl (e.g., thien-2-yl and thien-3-yl), furyl (e.g., 2-furyl and 3-furyl), pyrrolyl (e.g., 1H-pyrrol-2-yl and 1H-pyrrol-3-yl), imidazolyl (e.g., 2H-imidazol-2-yl and 2H-imidazol-4-yl), pyrazolyl (e.g., 1H-pyrazol-3-yl, 1H-pyrazol-4-yl, and 1H-pyrazol-5-yl), pyridyl (e.g., pyridin-2-yl, pyridin-3-yl, and pyridin-4-yl), pyrimidinyl (e.g., pyrimidin-2-yl, pyrimidin-4-yl, and pyrimidin-5-yl), thiazolyl (e.g., thiazol-2-yl, thiazol-4-yl, and thiazol-5-yl), isothiazolyl (e.g., isothiazol-3-yl, isothiazol-4-yl, and isothiazol-5-yl), oxazolyl (e.g., oxazol-2-yl, oxazol-4-yl, and oxazol-5-yl), isoxazolyl (e.g., isoxazol-3-yl, isoxazol-4-yl, and isoxazol-5-yl), or indazolyl (e.g., 1H-indazol-3-yl). The term "heteroaryl" also includes possible N-oxides. A non-limiting exemplary N-oxide is pyridyl N-oxide.

Unless clearly indicated otherwise, ranges listed herein are inclusive.

A variety of additional terms are defined or otherwise characterized herein.

Nanostructure Composition

In some embodiments, the present disclosure provides a nanostructure composition comprising:

(a) at least one population of nanostructures; and (b) at least one polyfunctional poly(alkylene oxide) ligand, wherein the polyfunctional poly(alkylene oxide) ligand comprises at least two terminal functional groups, wherein at least one terminal functional group is bound to the surface of the nanostructures.

In some embodiments, the polyfunctional poly(alkylene oxide) ligand comprises a random copolymer of ethylene oxide and propylene oxide, a poly(ethylene oxide)-poly (propylene oxide) diblock copolymer, a poly(ethylene oxide)-poly(propylene oxide)-poly(ethylene oxide) triblock copolymer, a poly(propylene oxide)-poly(ethylene oxide)-poly(propylene oxide) triblock copolymer, or combinations thereof.

In some embodiments, the nanostructure is a quantum dot.

In some embodiments, the present disclosure provides a nanostructure composition comprising:
(a) at least one population of nanostructures; and
(b) at least one polyfunctional poly(alkylene oxide) ligand bound to the surface of the nanostructures, the polyfunctional poly(alkylene oxide) ligand having formula (I):

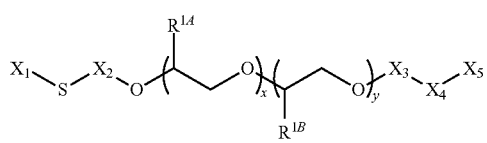

(I)

wherein:
x is 1 to 100;
y is 0 to 100;
$R^{1A}$ and $R^{1B}$ independently are H or $C_{1-20}$ alkyl;
$X_1$ is a linear or branched $C_{1-20}$ alkyl substituted by at least one —OH, —SH, —NH$_2$, —CO$_2$H, —P(O)(OH)$_2$, —P(O)OH, or —SO$_3$H;
$X_2$ is a $C_{1-12}$ alkylene;
$X_3$ is a bond or $C_{1-12}$ alkylene;
$X_4$ is a bond, —O—, —OC(=O)—, or amido; and
$X_5$ is a linear or branched $C_{1-20}$ alkyl substituted by at least one —OH, —SH, —NH$_2$, —CO$_2$H, —P(O)(OH)$_2$, —P(O)OH, or —SO$_3$H.

In some embodiments, the nanostructure is a quantum dot.

In some embodiments, the present disclosure provides a nanostructure composition comprising:
(a) at least one population of nanostructures; and
(b) at least one polyfunctional poly(alkylene oxide) ligand bound to the surface of the nanostructures, the polyfunctional poly(alkylene oxide) ligand having formula (II):

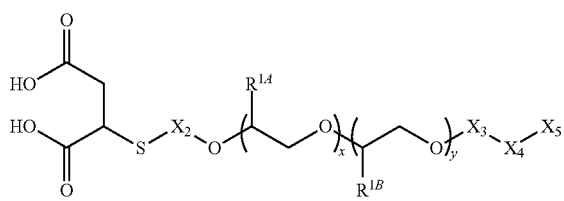

(II)

wherein:
x is 1 to 100;
y is 0 to 100;
$R^{1A}$ and $R^{1B}$ independently are H or $C_{1-20}$ alkyl;
$X_2$ is a $C_{1-12}$ alkylene;
$X_3$ is a bond or $C_{1-12}$ alkylene;
$X_4$ is a bond, —O—, —OC(=O)—, or amido; and
$X_5$ is a linear or branched $C_{1-20}$ alkyl substituted by at least one —OH, —SH, —NH$_2$, —CO$_2$H, —P(O)(OH)$_2$, —P(O)OH, or —SO$_3$H.

In some embodiments, the nanostructure is a quantum dot.

In some embodiments, the present disclosure provides a nanostructure composition comprising:
(a) at least one population of nanostructures; and
(b) at least one polyfunctional poly(alkylene oxide) ligand bound to the surface of the nanostructures, the polyfunctional poly(alkylene oxide) ligand having formula (III):

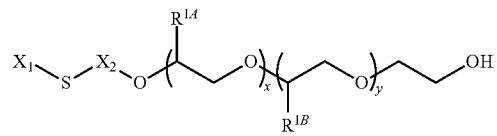

(III)

wherein:
x is 1 to 100;
y is 0 to 100;
$R^{1A}$ and $R^{1B}$ independently are H or $C_{1-20}$ alkyl;
$X_1$ is a linear or branched $C_{1-20}$ alkyl substituted by at least one —OH, —SH, —NH$_2$, —CO$_2$H, —P(O)(OH)$_2$, —P(O)OH, or —SO$_3$H; and
$X_2$ is a $C_{1-12}$ alkylene.

In some embodiments, the nanostructure is a quantum dot.

In some embodiments, the present disclosure provides a nanostructure composition comprising:
(a) at least one population of nanostructures; and
(b) at least one polyfunctional poly(alkylene oxide) ligand bound to the surface of the nanostructures, the polyfunctional poly(alkylene oxide) ligand having formula (IV):

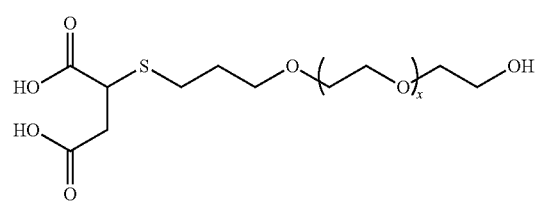

(IV)

wherein:
x is 1 to 100.

In some embodiments, the present disclosure provides a nanostructure composition comprising:
(a) at least one population of nanostructures, wherein the nanostructures comprise ligands bound to the nanostructures;
(b) a polyfunctional poly(alkylene oxide) ligand bound to the nanostructures; and
(c) at least one organic resin.

In some embodiments, the nanostructure is a quantum dot.

Nanostructure Film Layer

In some embodiments, the present invention provides a nanostructure film layer comprising:
(a) at least one population of nanostructures, wherein the nanostructures comprise ligands bound to the nanostructures;
(b) a polyfunctional poly(alkylene oxide) ligand bound to the nanostructures; and
(c) at least one organic resin.

In some embodiments, the nanostructure is a quantum dot.

Nanostructure Molded Article

In some embodiments, the present invention provides a nanostructure molded article comprising:
(a) at least one population of nanostructures, wherein the nanostructures comprise ligands bound to the nanostructures;

(b) a polyfunctional poly(alkylene oxide) ligand bound to the nanostructures; and (c) at least one organic resin.

In some embodiments, the molded article is a film, a substrate for a display, or a light emitting diode.

In some embodiments, the nanostructure is a quantum dot.

In some embodiments, the present invention provides a nanostructure film comprising:

(a) a first barrier layer;

(b) a second barrier layer; and (c) a nanostructure layer between the first barrier layer and the second barrier layer, wherein the nanostructure layer comprises at least one population of nanostructures, wherein the nanostructures comprise polyfunctional poly(alkylene oxide) ligands bound to the nanostructures; and at least one organic resin.

In some embodiments, the nanostructure is a quantum dot.

Quantum Dots

The quantum dots (or other nanostructures) for use in the present invention can be produced from any suitable material, suitably an inorganic material, and more suitably an inorganic conductive or semiconductive material. Suitable semiconductor materials include any type of semiconductor, including Group II-VI, Group III-V, Group IV-VI, and Group IV semiconductors. Suitable semiconductor materials include, but are not limited to, Si, Ge, Sn, Se, Te, B, C (including diamond), P, BN, BP, BAs, AlN, AlP, AlAs, AlSb, GaN, GaP, GaAs, GaSb, InN, InP, InAs, InSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $Al_2CO$, and combinations thereof.

The synthesis of Group II-VI nanostructures has been described in U.S. Pat. Nos. 6,225,198, 6,322,901, 6,207,229, 6,607,829, 6,861,155, 7,060,243, 7,125,605, 7,374,824, 7,566,476, 8,101,234, and 8,158,193 and in U.S. Patent Appl. Publication Nos. 2011/0262752 and 2011/0263062. In some embodiments, the core is a Group II-VI nanocrystal selected from the group consisting of ZnO, ZnSe, ZnS, ZnTe, CdO, CdSe, CdS, CdTe, HgO, HgSe, HgS, and HgTe. In some embodiments, the core is a nanocrystal selected from the group consisting of ZnSe, ZnS, CdSe, and CdS.

Although Group II-VI nanostructures such as CdSe and CdS quantum dots can exhibit desirable luminescence behavior, issues such as the toxicity of cadmium limit the applications for which such nanostructures can be used. Less toxic alternatives with favorable luminescence properties are thus highly desirable. Group III-V nanostructures in general and InP-based nanostructures in particular, offer the best known substitute for cadmium-based materials due to their compatible emission range.

In some embodiments, the nanostructures are free from cadmium. As used herein, the term "free of cadmium" is intended that the nanostructures contain less than 100 ppm by weight of cadmium. The Restriction of Hazardous Substances (RoHS) compliance definition requires that there must be no more than 0.01% (100 ppm) by weight of cadmium in the raw homogeneous precursor materials. The cadmium level in the Cd-free nanostructures is limited by the trace metal concentration in the precursor materials. The trace metal (including cadmium) concentration in the precursor materials for the Cd-free nanostructures, can be measured by inductively coupled plasma mass spectroscopy (ICP-MS) analysis, and are on the parts per billion (ppb) level. In some embodiments, nanostructures that are "free of cadmium" contain less than about 50 ppm, less than about 20 ppm, less than about 10 ppm, or less than about 1 ppm of cadmium.

In some embodiments, the core is a Group III-V nanostructure. In some embodiments, the core is a Group III-V nanocrystal selected from the group consisting of BN, BP, BAs, BSb, AlN, AlP, AlAs, AlSb, GaN, GaP, GaAs, GaSb, InN, InP, InAs, and InSb. In some embodiments, the core is an InP nanocrystal.

The synthesis of Group III-V nanostructures has been described in U.S. Pat. Nos. 5,505,928, 6,306,736, 6,576,291, 6,788,453, 6,821,337, 7,138,098, 7,557,028, 7,645,397, 8,062,967, and 8,282,412 and in U.S. Patent Appl. Publication No. 2015/0236195. Synthesis of Group III-V nanostructures has also been described in Wells, R. L., et al., "The use of tris(trimethylsilyl)arsine to prepare gallium arsenide and indium arsenide," Chem. Mater. 1:4-6 (1989) and in Guzelian, A. A., et al., "Colloidal chemical synthesis and characterization of InAs nanocrystal quantum dots," Appl. Phys. Lett. 69: 1432-1434 (1996).

Synthesis of InP-based nanostructures has been described, e.g., in Xie, R., et al., "Colloidal InP nanocrystals as efficient emitters covering blue to near-infrared," J. Am. Chem. Soc. 129:15432-15433 (2007); Micic, O. I., et al., "Core-shell quantum dots of lattice-matched $ZnCdSe_2$ shells on InP cores: Experiment and theory," J. Phys. Chem. B 104:12149-12156 (2000); Liu, Z., et al., "Coreduction colloidal synthesis of III-V nanocrystals: The case of InP," Angew. Chem. Int. Ed. Engl. 47:3540-3542 (2008); Li, L. et al., "Economic synthesis of high quality InP nanocrystals using calcium phosphide as the phosphorus precursor," Chem. Mater. 20:2621-2623 (2008); D. Battaglia and X. Peng, "Formation of high quality InP and InAs nanocrystals in a noncoordinating solvent," Nano Letters 2:1027-1030 (2002); Kim, S., et al., "Highly luminescent InP/GaP/ZnS nanocrystals and their application to white light-emitting diodes," J. Am. Chem. Soc. 134:3804-3809 (2012); Nann, T., et al., "Water splitting by visible light: A nanophotocathode for hydrogen production," Angew. Chem. Int. Ed. 49:1574-1577 (2010); Borchert, H., et al., "Investigation of ZnS passivated InP nanocrystals by XPS," Nano Letters 2:151-154 (2002); L. Li and P. Reiss, "One-pot synthesis of highly luminescent InP/ZnS nanocrystals without precursor injection," J. Am. Chem. Soc. 130:11588-11589 (2008); Hussain, S., et al. "One-pot fabrication of high-quality InP/ZnS (core/shell) quantum dots and their application to cellular imaging," Chemphyschem. 10:1466-1470 (2009); Xu, S., et al., "Rapid synthesis of high-quality InP nanocrystals," J. Am. Chem. Soc. 128:1054-1055 (2006); Micic, O. I., et al., "Size-dependent spectroscopy of InP quantum dots," J. Phys. Chem. B 101:4904-4912 (1997); Haubold, S., et al., "Strongly luminescent InP/ZnS core-shell nanoparticles," Chemphyschem. 5:331-334 (2001); CrosGagneux, A., et al., "Surface chemistry of InP quantum dots: A comprehensive study," J. Am. Chem. Soc. 132:18147-18157 (2010); Micic, O. I., et al., "Synthesis and characterization of InP, GaP, and $GaInP_2$ quantum dots," J. Phys. Chem. 99:7754-7759 (1995); Guzelian, A. A., et al., "Synthesis of size-selected, surface-passivated InP nanocrystals," J. Phys. Chem. 100: 7212-7219 (1996); Lucey, D. W., et al., "Monodispersed InP quantum dots prepared by colloidal chemistry in a non-coordinating solvent," Chem. Mater. 17:3754-3762 (2005); Lim, J., et al., "InP@ZnSeS, core@composition gradient shell quantum dots with enhanced stability," Chem. Mater. 23:4459-4463 (2011); and Zan, F., et al., "Experimental studies on blinking behavior of single InP/ZnS quantum dots: Effects of synthetic conditions and UV irradiation," *J. Phys. Chem. C* 116:394-3950 (2012).

In some embodiments, the core is doped. In some embodiments, the dopant of the nanocrystal core comprises a metal, including one or more transition metals. In some embodiments, the dopant is a transition metal selected from the group consisting of Ti, Zr, Hf, V, Nb, Ta, Cr, Mo, W, Mn, Tc, Re, Fe, Ru, Os, Co, Rh, Ir, Ni, Pd, Pt, Cu, Ag, Au, and combinations thereof. In some embodiments, the dopant comprises a non-metal. In some embodiments, the dopant is ZnS, ZnSe, ZnTe, CdSe, CdS, CdTe, HgS, HgSe, HgTe, $CuInS_2$, $CuInSe_2$, AlN, AlP, AlAs, GaN, GaP, or GaAs.

Inorganic shell coatings on nanostructures are a universal approach to tailoring their electronic structure. Additionally, deposition of an inorganic shell can produce more robust particles by passivation of surface defects. Ziegler, J., et al., *Adv. Mater.* 20:4068-4073 (2008). For example, shells of wider band gap semiconductor materials such as ZnS can be deposited on a core with a narrower band gap such as CdSe or InP to afford structures in which excitons are confined within the core. This approach increases the probability of radiative recombination and makes it possible to synthesize very efficient quantum dots with quantum yields close to unity and thin shell coatings.

In some embodiments, the nanostructures include a core and at least one shell. In some embodiments, the nanostructures include a core and at least two shells. The shell can, e.g., increase the quantum yield and/or stability of the nanostructures. In some embodiments, the core and the shell comprise different materials. In some embodiments, the nanostructure comprises shells of different shell material.

Exemplary materials for preparing shells include, but are not limited to, Si, Ge, Sn, Se, Te, B, C (including diamond), P, Co, Au, BN, BP, BAs, AlN, AlP, AlAs, AlSb, GaN, GaP, GaAs, GaSb, InN, InP, InAs, InSb, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $Al_2CO$, and combinations thereof.

In some embodiments, the shell is a mixture of at least two of a zinc source, a selenium source, a sulfur source, a tellurium source, and a cadmium source. In some embodiments, the shell is a mixture of two of a zinc source, a selenium source, a sulfur source, a tellurium source, and a cadmium source. In some embodiments, the shell is a mixture of three of a zinc source, a selenium source, a sulfur source, a tellurium source, and a cadmium source. In some embodiments, the shell is a mixture of: zinc and sulfur; zinc and selenium; zinc, sulfur, and selenium; zinc and tellurium; zinc, tellurium, and sulfur; zinc, tellurium, and selenium; zinc, cadmium, and sulfur; zinc, cadmium, and selenium; cadmium and sulfur; cadmium and selenium; cadmium, selenium, and sulfur; cadmium and zinc; cadmium, zinc, and sulfur; cadmium, zinc, and selenium; or cadmium, zinc, sulfur, and selenium. In some embodiments, the shell is a mixture of zinc and selenium. In some embodiments, the shell is a mixture of zinc and sulfur.

Exemplary core/shell luminescent nanostructures include, but are not limited to (represented as core/shell) CdSe/ZnS, InP/ZnS, PbSe/PbS, CdSe/CdS, CdTe/CdS, and CdTe/ZnS. The synthesis of core/shell nanostructures is disclosed in U.S. Pat. No. 9,169,435.

In some embodiments, the nanostructures include a core and at least two shells. In some embodiments, one shell is a mixture of zinc and selenium and one shell is a mixture of zinc and sulfur. In some embodiments, the core/shell/shell nanostructure is InP/ZnSe/ZnS.

The luminescent nanocrystals can be made from a material impervious to oxygen, thereby simplifying oxygen barrier requirements and photostabilization of the quantum dots in the quantum dot film layer. In exemplary embodiments, the luminescent nanocrystals are coated with one or more organic polymeric ligand material and dispersed in an organic polymeric matrix comprising one or more matrix materials. The luminescent nanocrystals can be further coated with one or more inorganic layers comprising one or more material such as a silicon oxide, an aluminum oxide, or a titanium oxide (e.g., $SiO_2$, $Si_2O_3$, $TiO_2$, or $Al_2O_3$), to hermetically seal the quantum dots.

First Ligands

In some embodiments, the nanostructures comprise ligands bound to their surface. In some embodiments, the nanostructures include a coating layer comprising ligands to protect the nanostructures from external moisture and oxidation, to control aggregation, and to allow for dispersion of the nanostructures in the matrix material. Suitable first ligands include those disclosed in U.S. Pat. Nos. 6,949,206; 7,267,875; 7,374,807; 7,572,393; 7,645,397; and 8,563,133 and in U.S. Patent Appl. Publication Nos. 2008/0237540; 2008/0281010; and 2010/0110728.

In some embodiments, the nanostructure comprises a multi-part ligand structure, such as the three-part ligand structure disclosed in U.S. Patent Appl. Publication No. 2008/237540, in which the head-group, tail-group, and middle/body group are independently fabricated and optimized for their particular function, and then combined into an ideally functioning complete surface ligand.

In some embodiments, the first ligands comprise one or more organic polymeric ligands. Suitable ligands provide: efficient and strong bonding quantum dot encapsulation with low oxygen permeability; precipitate or segregate into domain in the matrix material to form a discontinuous dual-phase or multi-phase matrix; disperse favorably throughout the matrix material; and are commercially available materials or can be easily formulated from commercially available materials.

In some embodiments, the first ligand comprises a carboxy, a thiol, a phosphine, or a phosphine oxide group.

In some embodiments, the first ligand comprises a carboxy group. As used herein, "carboxy" refers to a group that contains a carbon-oxygen double bond such as —COOH, —COOR$^A$, OC(O)H, —OC(O)R$^A$, wherein R$^A$ is alkyl, alkenyl, alkynyl, heteroalkyl, cycloalkyl, heterocycloalkyl, aryl, or heteroaryl, each of which can be optionally substituted. In some embodiments, the carboxy is a carboxylic acid, a dicarboxylic acid, a polycarboxylic acid, or a carboxylate. In some embodiments, the first ligand comprises a carboxylic acid group. In some embodiments, the first ligand comprises a carboxylic acid group and the carboxylic acid is a caprylic acid, capric acid, lauric acid, myristic acid, or palmitic acid. In some embodiments, the first ligand is a carboxylate. In some embodiments, the first ligand comprises a carboxylate and the carboxylate is a carboxyalkyl.

In some embodiments, the first ligand comprises a phosphine group. In some embodiments, the first ligand comprises a phosphine group and the phosphine group is trihexylphosphine, trioctylphosphine (TOP), or tridecylphosphine.

In some embodiments, the first ligand comprises a phosphine oxide group. In some embodiments, the first ligand comprises a phosphine oxide group and the phosphine oxide is trihexylphosphine oxide, trioctylphosphine oxide (TOPO), or tridecylphosphine oxide.

Polyfunctional Poly(Alkylene Oxide) Ligands

Ligands employed in the stabilization of nanostructures generally belong to either the group of neutral L-type ligands, which bind to cations and anions of the nanocrystal and X-type ligands, which selectively bind to the cationic component. L-type ligands donate their lone pair to a surface metal atom, thus establishing a dative (coordinate covalent) bond. Examples of L-type ligands are amines, thiols, phosphines, and phosphine oxides. X-type ligands are typically monovalent atoms that bind to positively charged sites at the quantum dot surface. Examples of X-type ligands are carboxylates, phosphonates, and thiolates.

In some embodiments, a polyfunctional poly(alkylene oxide) ligand comprises a poly(alkylene oxide) backbone. In some embodiments, the polyfunctional poly(alkylene oxide) ligand comprises two functional groups: one attached to the head of the poly(alkylene oxide) backbone and one attached to the tail of the poly(alkylene oxide) backbone. In some embodiments, at least one functional group can bind to II-VI nanocrystal surfaces as a neutral L-type binding ligand (e.g., R—COOH). In some embodiments, at least one functional group can bind to II-VI nanocrystal surfaces as an electron donating X-type ligand (e.g., R—COO⁻).

In some embodiments, the polyfunctional poly(alkylene oxide) ligand has at least two functional groups attached to the terminal ends of the poly(alkylene oxide) ligand. In some embodiments, the at least two functional groups are —OH, —SH, —NH$_2$, —CO$_2$H, —P(O)(OH)$_2$, —P(O)OH, or —SO$_3$H. In some embodiments, the at least two functional groups are different. In some embodiments, at least one functional group is a —OH and at least one functional group is a —CO$_2$H. In some embodiments, one functional group is a —OH and two functional groups are —CO$_2$H.

In some embodiments, the polyfunctional poly(alkylene oxide) ligand is a mixture of a functional group terminated poly(alkylene oxide), a copolymer of alkylene oxides, and combinations thereof. In some embodiments, the polyfunctional poly(alkylene oxide) comprises a copolymer of alkylene oxides. In some embodiments, the copolymer is a random copolymer or a block copolymer. In some embodiments, the block copolymer is a diblock copolymer or a triblock copolymer. In some embodiments, the copolymer is based on a propylene oxide (PO), an ethylene oxide (EO), or a mixture of PO and EO. In some embodiments, the copolymer is a mixture of PO and EO.

In some embodiments, the polyfunctional poly(alkylene oxide) ligand comprises a random copolymer of ethylene oxide and propylene oxide, a poly(ethylene oxide)-poly(propylene oxide) diblock copolymer, a poly(ethylene oxide)-poly(propylene oxide)-poly(ethylene oxide) triblock copolymer, a poly(propylene oxide)-poly(ethylene oxide)-poly(propylene oxide) triblock copolymer, or combinations thereof.

In some embodiments, the polyfunctional poly(alkylene oxide) ligand comprises a copolymer of PO and EO. In some embodiments, the ratio of ethylene oxide groups to propylene oxide groups is sufficiently high so that the polyfunctional poly(alkylene oxide) ligand has a high degree of hydrophilicity. In some embodiments, the ratio of ethylene oxide groups to propylene oxide groups is low enough that the ligand has the desired resiliency. In some embodiments, the ratio of ethylene oxide groups:propylene oxide groups is between about 15:1 and about 1:15, about 15:1 and about 1:10, about 15:1 and about 1:5, about 10:1 and 1:15, about 10:1 and 1:10, about 10:1 and 1:5, about 5:1 and 1:15, about 5:1 and 1:10, or about 5:1 and 1:5.

In some embodiments, the polyfunctional poly(alkylene oxide) ligand has the structure of formula I:

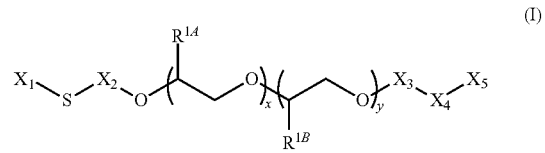

wherein:
x is 1 to 100;
y is 0 to 100;
$R^{1A}$ and $R^{1B}$ independently are H or $C_{1-20}$ alkyl;
$X_1$ is a linear or branched $C_{1-20}$ alkyl substituted by at least one —OH, —SH, —NH$_2$, —CO$_2$H, —P(O)(OH)$_2$, —P(O)OH, or —SO$_3$H;
$X_2$ is a $C_{1-12}$ alkylene;
$X_3$ is a bond or $C_{1-12}$ alkylene;
$X_4$ is a bond, —O—, —OC(=O)—, or amido; and
$X_5$ is a linear or branched $C_{1-20}$ alkyl substituted by at least one —OH, —SH, —NH$_2$, —CO$_2$H, —P(O)(OH)$_2$, —P(O)OH, or —SO$_3$H.

In some embodiments, x is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, x is 10 to 50. In some embodiments, x is 10 to 20.

In some embodiments, y is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, y is 1 to 20. In some embodiments, y is 1 to 10.

In some embodiments, the ratio of x to y is between about 15:1 and about 1:15, about 15:1 and about 1:10, about 15:1 and about 1:5, about 10:1 and 1:15, about 10:1 and 1:10, about 10:1 and 1:5, about 5:1 and 1:15, about 5:1 and 1:10, or about 5:1 and 1:5.

In some embodiments, $R^{1A}$ is H. In some embodiments, $R^{1A}$ is $C_{1-20}$ alkyl. In some embodiments, $R^{1A}$ is $C_{1-10}$ alkyl. In some embodiments, $R^{1A}$ is $C_{1-5}$ alkyl. In some embodiments, $R^{1A}$ is —CH$_3$.

In some embodiments, $R^{1B}$ is H. In some embodiments, $R^{1B}$ is $C_{1-20}$ alkyl. In some embodiments, $R^{1B}$ is $C_{1-10}$ alkyl. In some embodiments, $R^{1B}$ is $C_{1-5}$ alkyl. In some embodiments, $R^{1B}$ is —CH$_3$.

In some embodiments, $R^{1A}$ is H and $R^{1B}$ is —CH$_3$. In some embodiments, $R^{1A}$ CH$_3$ and $R^{1B}$ is H. In some embodiments, $R^{1A}$ is H and $R^{1B}$ is H. In some embodiments, $R^{1A}$ is —CH$_3$ and $R^{1B}$ is —CH$_3$.

In some embodiments, X is a linear $C_{1-20}$ alkyl. In some embodiments, X is a linear $C_{1-10}$ alkyl. In some embodiments, X is a linear $C_{1-5}$ alkyl. In some embodiments, $X_1$ is a branched $C_{1-20}$ alkyl. In some embodiments, $X_1$ is a branched $C_{1-10}$ alkyl. In some embodiments, $X_1$ is a branched $C_{1-5}$ alkyl. In some embodiments, $X_1$ is a branched $C_4$ alkyl. In some embodiments, $X_1$ is substituted by at least one —OH. In some embodiments, $X_1$ is substituted by at least one —SH. In some embodiments, $X_1$ is substituted by at least one —NH$_2$. In some embodiments, $X_1$ is substituted by at least one —CO$_2$H. In some embodiments, $X_1$ is substituted by at least one —P(O)(OH)$_2$. In some embodiments, $X_1$ is substituted by at least one —P(O)OH. In some embodiments, $X_1$ is substituted by at least one —SO$_3$H. In some embodiments, $X_1$ is substituted by two —CO$_2$H.

In some embodiments, $X_2$ is $C_{1-12}$ alkylene. In some embodiments, $X_2$ is $C_{1-10}$ alkylene. In some embodiments, $X_2$ is $C_{1-5}$ alkylene. In some embodiments, $X_2$ is —CH$_2$CH$_2$CH$_2$—.

In some embodiments, $X_3$ is a bond. In some embodiments, $X_3$ is $C_{1-20}$ alkylene. In some embodiments, $X_3$ is $C_{1-10}$ alkylene. In some embodiments, $X_3$ is $C_{1-5}$ alkylene. In some embodiments, $X_3$ is —CH$_2$CH$_2$—.

In some embodiments, $X_4$ is a bond. In some embodiments, $X_4$ is —O—. In some embodiments, $X_4$ is —OC(=O)—. In some embodiments, $X_4$ is amido. In some embodiments, $X_4$ is —NHC(=O)—.

In some embodiments, $X_5$ is a linear $C_{1-20}$ alkyl. In some embodiments, $X_5$ is a linear $C_{1-10}$ alkyl. In some embodiments, $X_5$ is a linear $C_{1-5}$ alkyl. In some embodiments, $X_5$ is a linear $C_2$ alkyl. In some embodiments, $X_5$ is a branched $C_{1-20}$ alkyl. In some embodiments, $X_5$ is a branched $C_{1-10}$ alkyl. In some embodiments, $X_5$ is a branched $C_{1-5}$ alkyl. In some embodiments, $X_5$ is substituted by at least one —OH. In some embodiments, $X_5$ is substituted by at least one —SH. In some embodiments, $X_5$ is substituted by at least one —NH$_2$. In some embodiments, $X_5$ is substituted by at least one —CO$_2$H. In some embodiments, $X_5$ is substituted by at least one —P(O)(OH)$_2$. In some embodiments, $X_5$ is substituted by at least one —P(O)OH. In some embodiments, $X_5$ is substituted by at least one —SO$_3$H. In some embodiments, $X_5$ is substituted by one —OH.

In some embodiments, wherein $X_1$ is a branched $C_4$ alkyl substituted by two —CO$_2$H, in formula I, the polyfunctional poly(alkylene oxide) ligand has the structure of formula II:

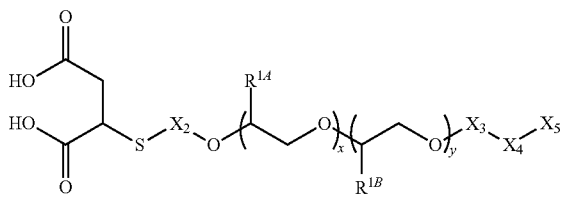

(II)

wherein:
x is 1 to 100;
y is 0 to 100;
$R^{1A}$ and $R^{1B}$ independently are H or $C_{1-20}$ alkyl;
$X_2$ is a $C_{1-12}$ alkylene;
$X_3$ is a bond or $C_1$ alkylene;
$X_4$ is a bond, —O—, —OC(=O)—, or amido; and
$X_5$ is a linear or branched $C_{1-20}$ alkyl substituted by at least one —OH, —SH, —NH$_2$, —CO$_2$H, —P(O)(OH)$_2$, —P(O)OH, or —SO$_3$H.

In some embodiments, x is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, x is 10 to 50. In some embodiments, x is 10 to 20.

In some embodiments, y is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, y is 1 to 20. In some embodiments, y is 1 to 10.

In some embodiments, the ratio of x to y is between about 15:1 and about 1:15, about 15:1 and about 1:10, about 15:1 and about 1:5, about 10:1 and about 1:15, about 10:1 and about 1:10, about 10:1 and about 1:5, about 5:1 and about 1:15, about 5:1 and about 1:10, or about 5:1 and 1:5.

In some embodiments, $R^{1A}$ is H. In some embodiments, $R^{1A}$ is $C_{1-20}$ alkyl. In some embodiments, $R^{1A}$ is $C_{1-10}$ alkyl. In some embodiments, $R^{1A}$ is $C_{1-5}$ alkyl. In some embodiments, $R^{1A}$ is —CH$_3$.

In some embodiments, $R^{1B}$ is H. In some embodiments, $R^{1B}$ is $C_{1-20}$ alkyl. In some embodiments, $R^{1B}$ is $C_{1-10}$ alkyl. In some embodiments, $R^{1B}$ is $C_{1-5}$ alkyl. In some embodiments, $R^{1B}$ is —CH$_3$.

In some embodiments, $R^{1A}$ is H and $R^{1B}$ is —CH$_3$. In some embodiments, $R^{1A}$ CH$_3$ and $R^{1B}$ is H. In some embodiments, $R^{1A}$ is H and $R^{1B}$ is H. In some embodiments, $R^{1A}$ is —CH$_3$ and $R^{1B}$ is —CH$_3$.

In some embodiments, $X_2$ is $C_{1-12}$ alkylene. In some embodiments, $X_2$ is $C_{1-10}$ alkylene. In some embodiments, $X_2$ is $C_{1-5}$ alkylene. In some embodiments, $X_2$ is —CH$_2$CH$_2$CH$_2$—.

In some embodiments, $X_3$ is a bond. In some embodiments, $X_3$ is $C_{1-20}$ alkylene. In some embodiment $X_3$ is $C_{1-10}$ alkylene. In some embodiments, $X_3$ is $C_{1-5}$ alkylene. In some embodiments, $X_3$ is —CH$_2$CH$_2$—.

In some embodiments, $X_4$ is a bond. In some embodiments, $X_4$ is —O—. In some embodiments, $X_4$ is —OC(=O)—. In some embodiments, $X_4$ is amido. In some embodiments, $X_4$ is —NHC(=O)—.

In some embodiments, $X_5$ is a linear $C_{1-20}$ alkyl. In some embodiments, $X_5$ is a linear $C_{1-10}$ alkyl. In some embodiments, $X_5$ is a linear $C_{1-5}$ alkyl. In some embodiments, $X_5$ is a linear $C_2$ alkyl. In some embodiments, $X_5$ is a branched $C_{1-20}$ alkyl. In some embodiments, $X_5$ is a branched $C_{1-10}$ alkyl. In some embodiments, $X_5$ is a branched $C_{1-5}$ alkyl. In some embodiments, $X_5$ is substituted by at least one —OH. In some embodiments, $X_5$ is substituted by at least one —SH. In some embodiments, $X_5$ is substituted by at least one —NH$_2$. In some embodiments, $X_5$ is substituted by at least one —CO$_2$H. In some embodiments, $X_5$ is substituted by at least one —P(O)(OH)$_2$. In some embodiments, $X_5$ is substituted by at least one —P(O)OH. In some embodiments, $X_5$ is substituted by at least one —SO$_3$H. In some embodiments, $X_5$ is substituted by one —OH.

In some embodiments, wherein $X_3$ is a bond, $X_4$ is a bond, and $X_5$ is a linear $C_2$ alkyl substituted by one —OH in formula I, the polyfunctional poly(alkylene oxide) ligand has the structure of formula III:

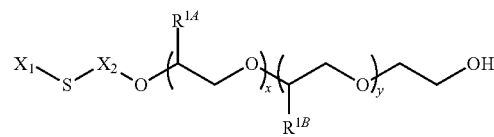

(III)

wherein:
x is 1 to 100;
y is 0 to 100;
$R^{1A}$ and $R^{1B}$ independently are H or $C_{1-20}$ alkyl;
$X_1$ is a linear or branched $C_{1-20}$ alkyl substituted by at least one —OH, —SH, —NH$_2$, —CO$_2$H, —P(O)(OH)$_2$, —P(O)OH, or —SO$_3$H; and
$X_2$ is a $C_{1-12}$ alkylene.

In some embodiments, x is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, x is 10 to 50. In some embodiments, x is 10 to 20.

In some embodiments, y is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, y is 1 to 20. In some embodiments, y is 1 to 10.

In some embodiments, the ratio of x to y is between about 15:1 and about 1:15, about 15:1 and about 1:10, about 15:1 and about 1:5, about 10:1 and 1:15, about 10:1 and 1:10, about 10:1 and 1:5, about 5:1 and 1:15, about 5:1 and 1:10, or about 5:1 and 1:5.

In some embodiments, $R^{1A}$ is H. In some embodiments, $R^{1A}$ is $C_{1-20}$ alkyl. In some embodiments, $R^{1A}$ is $C_{1-10}$ alkyl. In some embodiments, $R^{1A}$ is $C_{1-5}$ alkyl. In some embodiments, $R^{1A}$ is —$CH_3$.

In some embodiments, $R^{1B}$ is H. In some embodiments, $R^{1B}$ is $C_{1-20}$ alkyl. In some embodiments, $R^{1B}$ is $C_{1-10}$ alkyl. In some embodiments, $R^{1B}$ is $C_{1-5}$ alkyl. In some embodiments, $R^{1B}$ is —$CH_3$.

In some embodiments, $R^{1A}$ is H and $R^{1B}$ is —$CH_3$. In some embodiments, $R^{1A}$ is -$CH_3$ and $R^{1B}$ is H. In some embodiments, $R^{1A}$ is H and $R^{1B}$ is H. In some embodiments, $R^{1A}$ is —$CH_3$ and $R^{1B}$ is —$CH_3$.

In some embodiments, $X_1$ is a linear $C_{1-20}$ alkyl. In some embodiments, $X_1$ is a linear $C_{1-10}$ alkyl. In some embodiments, $X_1$ is a linear $C_{1-5}$ alkyl. In some embodiments, $X_1$ is a branched $C_{1-20}$ alkyl. In some embodiments, $X_1$ is a branched $C_{1-10}$ alkyl. In some embodiments, $X_1$ is a branched $C_{1-5}$ alkyl. In some embodiments, $X_1$ is a branched $C_4$ alkyl. In some embodiments, $X_1$ is substituted by at least one —OH. In some embodiments, $X_1$ is substituted by at least one —SH. In some embodiments, $X_1$ is substituted by at least one —$NH_2$. In some embodiments, $X_1$ is substituted by at least one —$CO_2H$. In some embodiments, $X_1$ is substituted by at least one —$P(O)(OH)_2$. In some embodiments, $X_1$ is substituted by at least one —P(O)OH. In some embodiments, $X_1$ is substituted by at least one —$SO_3H$. In some embodiments, $X_1$ is substituted by two —$CO_2H$.

In some embodiments, $X_2$ is $C_{1-12}$ alkylene. In some embodiments, $X_2$ is $C_{1-10}$ alkylene. In some embodiments, $X_2$ is $C_{1-5}$ alkylene. In some embodiments, $X_2$ is —$CH_2CH_2CH_2$—.

In some embodiments, wherein $X_1$ is a branched $C_4$ alkyl substituted by two —$CO_2H$, $X_2$ is a $C_3$ alkylene, $R^{1A}$ is —H, $R^{1B}$ is —H, $X_3$ is a bond, $X_4$ is a bond, and $X_5$ is a linear $C_2$ alkyl substituted by one —OH in formula I, the polyfunctional poly(alkylene oxide) ligand has the structure of formula IV:

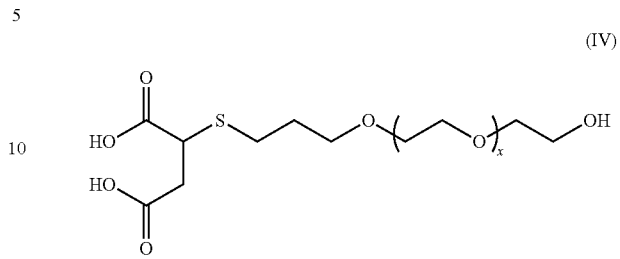

wherein:

x is 1 to 100.

In some embodiments, x is between 1 and 50. In some embodiments, x is between 1 and 20. In some embodiments, x is between 10 and 20.

In some embodiments, the polyfunctional poly(alkylene oxide) ligand is prepared from a hydroxy-terminated polymer by the reaction shown in SCHEME 1.

SCHEME 1

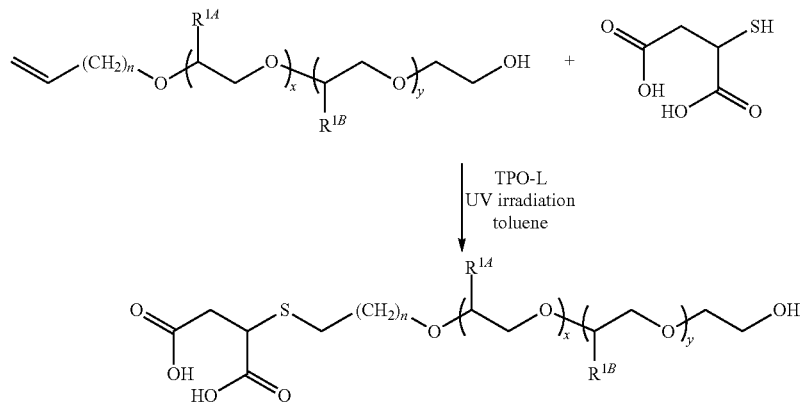

wherein:

x is 1 to 100;

y is 1 to 100;

n is 1 to 11; and $R^{1A}$ and $R^{1B}$ independently are H or $C_{1-20}$ alkyl.

In some embodiments, x is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, x is 10 to 50. In some embodiments, x is 10 to 20.

In some embodiments, y is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, y is 1 to 20.

In some embodiments, $R^{1A}$ is H. In some embodiments, $R^{1A}$ is $C_{1-20}$ alkyl. In some embodiments, $R^{1A}$ is $C_{1-10}$ alkyl. In some embodiments, $R^{1A}$ is $C_{1-5}$ alkyl. In some embodiments, $R^{1A}$ is —$CH_3$.

In some embodiments, $R^{1B}$ is H. In some embodiments, $R^{1B}$ is $C_{1-20}$ alkyl. In some embodiments, $R^{1B}$ is $C_{1-10}$ alkyl. In some embodiments, $R^{1B}$ is $C_{1-5}$ alkyl. In some embodiments, $R^{1B}$ is —$CH_3$.

In some embodiments, n is 1-11. In some embodiments, n is 1-10. In some embodiments, n is 1-5. In some embodiments, n is 2.

In some embodiments, the allyloxy-terminated polymer is a commercially available allyloxy-terminated polyethylene oxide polymer. In some embodiments, the allyloxy-terminated polymer of SCHEME 1 has y=0, $R^{1A}$=H, and $R^{1B}$=H, and 2-6 EO and is available from Gelest, Inc. In some embodiments, the allyloxy-terminated polymer of SCHEME 1 has y=0, $R^{1A}$=H, and $R^{1B}$=H, and 1-4 EO and is available from Gelest, Inc. In some embodiments, the allyloxy-terminated polymer of SCHEME 1 has y=0, $R^{1A}$=H, and $R^{1B}$=H, and 6-9 EO and is available from Gelest, Inc.

In some embodiments, the allyloxy-terminated polyethylene oxide polymer is prepared by reacting a polyethyleneglycol with an allyl halide or an allylalkyl halide. In some embodiments, the polyethyleneglycol alkene is prepared according to the method disclosed in U.S. Pat. No. 7,718,577. U.S. Pat. No. 7,718,577 discloses the following synthetic procedure shown in SCHEME 2.

SCHEME 2

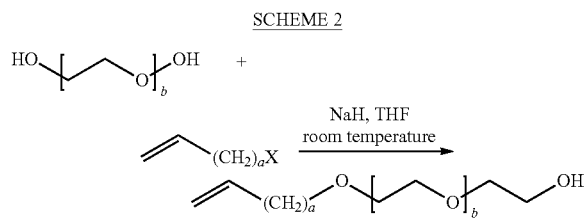

wherein:
a is 1 to 11 and b is 1 to 100; and
X is an allyl halide or allylalkyl halide.

In some embodiments, the polyfunctional poly(alkylene oxide) ligand is prepared from a carboxylic acid-terminated polymer by the reaction shown in SCHEME 3.

SCHEME 3

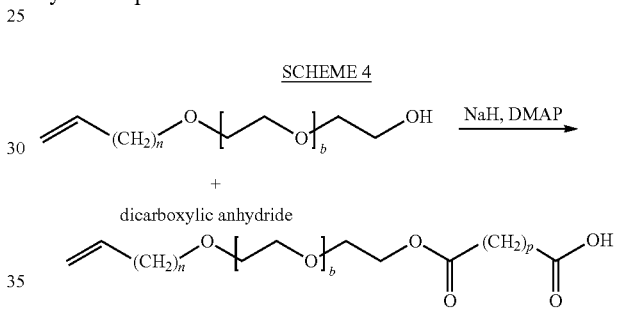

wherein:
x is 1 to 100;
y is 1 to 100;
n is 1 to 11;
p is 1 to 4; and
$R^{1A}$ and $R^{1B}$ independently are H or $C_{1-20}$ alkyl.

In some embodiments, x is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, x is 10 to 50. In some embodiments, x is 10 to 20.

In some embodiments, y is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, y is 1 to 20.

In some embodiments, $R^{1A}$ is H. In some embodiments, $R^{1A}$ is $C_{1-20}$ alkyl. In some embodiments, $R^{1A}$ is $C_{1-10}$ alkyl. In some embodiments, $R^{1A}$ is $C_{1-5}$ alkyl. In some embodiments, $R^{1A}$ is —$CH_3$.

In some embodiments, $R^1$ is H. In some embodiments, $R^1$ is $C_{1-20}$ alkyl. In some embodiments, $R^1$ is $C_{1-10}$ alkyl. In some embodiments, $R^1$ is $C_{1-5}$ alkyl. In some embodiments, $R^1$ is —$CH_3$.

In some embodiments, n is 1-11. In some embodiments, n is 1-10. In some embodiments, 1 is 1-5. In some embodiments, n is 2.

In some embodiments, the carboxylic acid-terminated polyethylene oxide polymer is prepared by reacting a polyethyleneglycol with an allyl halide or an allylalkyl halide. In some embodiments, the polyethyleneglycol alkene is prepared according to the method disclosed in U.S. Pat. No. 7,718,577. U.S. Pat. No. 7,718,577 discloses the following synthetic procedure shown in SCHEME 4.

SCHEME 4 wherein:
b is 1 to 100;
n is 1 to 11; and
p is 1 to 4.

Ligand Exchange

In some embodiments, the present invention is directed to a method for exchanging ligands on nanostructures. In some embodiments, a first ligand on a nanostructure dot is exchanged with a polyfunctional poly(alkylene oxide)

ligand. At least one functional group of the groups displace the native hydrophobic ligands of the nanostructure and afford a stable anchoring of the ligand onto the nanocrystal surface. In some embodiments, the nanostructure is a quantum dot.

In some embodiments, the present disclosure is directed to a method for exchanging ligands on nanostructures. In some embodiments, a first ligand on a nanostructure is exchanged with a polyfunctional poly(alkylene oxide) ligand. At least one functional group of the polyfunctional poly(alkylene oxide) ligand displaces the native hydrophobic ligands non-covalently bound to the nanostructure and affords a stable anchoring of the polyfunctional poly(alkylene oxide) ligand onto the nanostructure surface. In some embodiments, the nanostructure is a quantum dot.

In some embodiments, the present disclosure is directed to a method of replacing a first ligand on a nanostructure with a second ligand. In some embodiments, the second ligand is a polyfunctional poly(alkylene oxide) ligand. In some embodiments, the nanostructure is a quantum dot.

In some embodiments, the present disclosure is directed to a method of replacing a first ligand on a nanostructure with a second ligand comprising:

admixing a reaction mixture comprising a population of nanostructures having the first ligand non-covalently bound to the nanostructure and a polyfunctional poly(alkylene oxide) ligand which is the second ligand, such that the second ligand displaces the first ligand and becomes non-covalently bound to the nanostructure.

In some embodiments, the admixed reaction mixture is substantially free of solvent. In some embodiments, the admixed reaction mixture is free of a solvent. As used herein, the term "substantially free of solvent" is intended that the admixed reaction mixture contains less than 2% by weight of solvent. In some embodiments, the admixed reaction mixture contains by weight less than 1%, less than 0.5%, or less than 0.1% of a solvent. Solvent ligand replacement may be carried out when the second ligand is a polyfunctional poly(alkylene oxide) ligand and wherein the polyfunctional poly(alkylene oxide) ligand has a $T_g$ of less than 100° C. and a viscosity of less than about 1000 cSt (see U.S. Pat. No. 9,005,480, which is incorporated herein by reference in its entirety).

In some embodiments, the nanostructure is a quantum dot.

In some embodiments, the first ligand is bound covalently to the nanostructure. In some embodiments, the first ligand is bound non-covalently to the nanostructure.

In some embodiments, the second ligand becomes covalently bound to the nanostructure. In some embodiments, the second ligand becomes non-covalently bound to the nanostructure.

In some embodiments, the admixing is performed at a temperature between about ° C. and about 200° C., about 0° C. and about 150° C., about 0° C. and about 100° C., about 0° C. and about 80° C., about 20° C. and about 200° C., about 20° C. and about 150° C., about 20° C. and about 100 CC, about 20° C. and about 80° C., about 50° C. and about 200°, about 50° C. and about 150° C., about 50° C. and about 100° C., about 50° C. and about 80° C., about 80° C. and about 200° C., about 80° C. and about 150° C., about 80° C. and about 100° C., about 100° C. and about 200° C., about 100° C. and about 150° C., or about 150° C. and about 200° C. In some embodiments, the admixing is performed at a temperature between about 50° C. and about 100° C. In some embodiments, the admixing is performed at a temperature of about 8° C.

In some embodiments, the admixing is performed over a period of about 1 minute and about 6 hours, about 1 minute and about 2 hours, about 1 minute and about 1 hour, about 1 minute and about 40 minutes, about 1 minute and about 30 minutes, about 1 minute and about 20 minutes, about 1 minute and about 10 minutes, about 10 minutes and about 6 hours, about 10 minutes and about 2 hours, about 10 minutes and about 1 hour, about 10 minutes and about 40 minutes, about 10 minutes and about 30 minutes, about 10 minutes and about 20 minutes, about 20 minutes and about 6 hours, about 20 minutes and about 2 hours, about 20 minutes and about 1 hour, about 20 minutes and about 40 minutes, about 20 minutes and about 30 minutes, about 30 minutes and about 6 hours, about 30 minutes and about 2 hours, about 30 minutes and about 1 hour, about 30 minutes and about 40 minutes, about 40 minutes and about 6 hours, about 40 minutes and about 2 hours, about 40 minutes and about 1 hour, about 1 hour and about 6 hours, about 1 hour and about 2 hours, or about 2 hours and about 6 hours. In some embodiments, the admixing is performed over a period of about 40 minutes and about 2 hours. In some embodiments, the admixing is performed over a period of about 1 hour.

In some embodiments, the reaction mixture further comprises a solvent. In some embodiments, the solvent is selected from the group consisting of chloroform, acetone, butanone, ethylene glycol monoethyl ether, ethylene glycol monopropyl ether, ethylene glycol monobutyl ether, diethylene glycol diethyl ether, methyl ethyl ketone, methyl isobutyl ketone, monomethyl ether glycol ester, gamma-butyrolactone, methylacetic-3-ethyl ether, butyl carbitol, butyl carbitol acetate, propanediol monomethyl ether, propanediol monomethyl ether acetate, cyclohexane, toluene, xylene, isopropyl alcohol, and combinations thereof. In some embodiments, the solvent is toluene.

The ratio of the quantum dots to the polyfunctional poly(alkylene oxide) ligand can be determined by measuring the optical density of a stock solution at a desired wavelength. For example, to achieve a ligand ratio of 5.0 mg/mL/OD$_{460}$, 4.0 mL of a stock solution of quantum dots with an optical density of 10 (measured at a wavelength of 460 nm in a 1 cm path length cuvette) can be combined with 200 mg of a polyfunctional poly(alkylene oxide) ligand. And, to achieve a ligand ratio of 2.5 mg/mL/OD$_{460}$, 4.0 mL of a stock solution of quantum dots with an optical density of 10 (measured at a wavelength of 460 nm in a 1 cm path length cuvette) can be combined with 100 mg of a polyfunctional poly(alkylene oxide) ligand.

In some embodiments, the ratio of quantum dots to the polyfunctional poly(alkylene oxide) ligand measured by optical density (at a wavelength between about 450 nm and about 600 nm) is between about 0.25 mg/mL and about 10 mg/mL, about 0.25 mg/mL and about 5 mg/mL, about 0.25 mg/mL and about 1 mg/mL, about 0.25 mg/mL and about 0.5 mg/mL, about 0.5 mg/mL and about 10 mg/mL, about 0.5 mg/mL and about 5 mg/mL, about 0.5 mg/mL and about 1 mg/mL, about 1 mg/mL and about 10 mg/mL, about 1 mg/mL and about 5 mg/mL, or about 5 mg/mL and about 10 mg/mL. In some embodiments, the ratio of quantum dots to the polyfunctional poly(alkylene oxide) ligand measured by optical density (at a wavelength of about 460 nm) is between about 0.25 mg/mL and about 10 mg/mL, about 0.25 mg/mL and about 5 mg/mL, about 0.25 mg/mL and about 1 mg/mL, about 0.25 mg/mL and about 0.5 mg/mL, about 0.5 mg/mL and about 10 mg/mL, about 0.5 mg/mL and about 5 mg/mL, about 0.5 mg/mL and about 1 mg/mL, about 1 mg/mL and about 10 mg/mL, about 1 mg/mL and about 5 mg/mL, or about 5 mg/mL and about 10 mg/mL.

In some embodiments, the ratio of quantum dots to the polyfunctional poly(alkylene oxide) ligand measured by optical density (at a wavelength between about 600 nm and about 750 nm) is between about 0.25 mg/mL and about 10 mg/mL, about 0.25 mg/mL and about 5 mg/mL, about 0.25 mg/mL and about 1 mg/mL, about 0.25 mg/mL and about 0.5 mg/mL, about 0.5 mg/mL and about 10 mg/mL, about 0.5 mg/mL and about 5 mg/mL, about 0.5 mg/mL and about 1 mg/mL, about 1 mg/mL and about 10 mg/mL, about 1 mg/mL and about 5 mg/mL, or about 5 mg/mL and about 10 mg/mL.

The percentage of first ligands displaced by the polyfunctional poly(alkylene oxide) ligand can be measured by $^1$H NMR. In some embodiments, the mole percentage of first ligands displaced by the polyfunctional poly(alkylene oxide) ligand is between about 20% and about 100%, about 20% and about 80%, about 20% and about 60%, about 20% and about 40%, about 25% and about 100%, about 25% and about 80%, about 25% and about 60%, about 25% and about 40%, about 30% and about 100%, about 30% and about 80%, about 30% and about 60%, about 30% and about 40%, about 40% and about 100%, about 40% and about 80%, about 40% and about 60%, about 60% and about 100%, about 60% and about 80%, or about 80% and about 100%.

The percentage of polyfunctional poly(alkylene oxide) ligands that are bound to a nanostructure in a population of nanostructures can be measured by $^1$H NMR. In some embodiments, the mole percentage of polyfunctional poly(alkylene oxide) ligands bound to a nanostructures is between about 20% and about 100% is between about 20% and about 100%, about 20% and about 80%, about 20% and about 60%, about 20% and about 40%, about 25% and about 100%, about 25% and about 80%, about 25% and about 60%, about 25% and about 40%, about 30% and about 100%, about 30% and about 80%, about 30% and about 60%, about 30% and about 40%, about 40% and about 100%, about 40% and about 80%, about 40% and about 60%, about 60% and about 100%, about 60% and about 80%, or about 80% and about 100%.

The percentage of nanostructures in a population of nanostructures that comprise a polyfunctional poly(alkylene oxide) ligand can be measured by $^1$H NMR. In some embodiments, the mole percentage of ligands bound to the at least one population of nanostructures that comprise a polyfunctional poly(alkylene oxide) ligand is between about 20% and about 100% is between about 20% and about 100%, about 20% and about 80%, about 20% and about 60%, about 20% and about 40%, about 25% and about 100%, about 25% and about 80%, about 25% and about 60%, about 25% and about 40%, about 30% and about 100%, about 30% and about 80%, about 30% and about 60%, about 30% and about 40%, about 40% and about 100%, about 40% and about 80%, about 40% and about 60%, about 60% and about 100%, about 60% and about 80%, or about 80% and about 100%.

Organic Resin

In some embodiments, the nanostructures are dispersed in an organic resin. A suitable organic resin is substantially non-reactive with nanostructures under conditions used to prepare and store a nanostructure composition, but are capable of undergoing a reaction to form a polymer and/or interpenetrating network.

The performance and atmospheric/thermal stability of the films is improved by two design features of the polyfunctional poly(alkylene oxide) ligands: (1) reactive end groups to enable the ligand to become part of a cross-linked matrix; and (2) stronger binding to the quantum dot surface through the use of the bidentate ligand.

Capping the ligands with hydroxyl groups allows the hydroxyl groups to react with epoxide resins and form dense crosslinked networks. An example of the reaction of a hydroxyl group with an epoxide is shown in SCHEME 5.

SCHEME 5

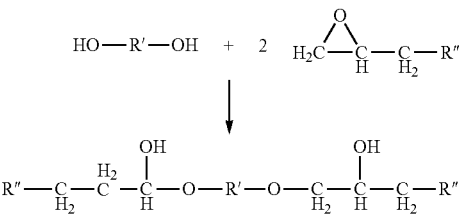

In some embodiments, the organic resin is capable of undergoing a radical polymerization reaction. In some embodiments, the organic resin comprises one or more monomers. In some embodiments, the organic resin comprises one or more oligomers.

In some embodiments, the organic resin has a radical-polymerizable group. In some embodiments, the radical-polymerizable group is an ethylenically unsaturated group. In some embodiments, the ethylenically unsaturated group is an acryloyloxy group, an acrylyloxyalkyl group, a methacrylyloxy group, a methacrylyloxyalkyl group, an acrylamide group, a methacrylamide group, a vinyloxy group, a vinyl carbonate group, an O-vinyl carbamate group, an N-vinyl carbamate group, an aromatic vinyl group, or a vinyl group.

In some embodiments, the organic resin is an acrylate. In some embodiments, the acrylate is a single acrylate compound or a mixture of different acrylate compounds. In some embodiments, the acrylate is monofunctional, difunctional, trifunctional, or of a higher functionality.

In some embodiments, the acrylate is monofunctional. In some embodiments, the monofunctional acrylate is isobornyl acrylate, tetrahydrofurfuryl acrylate, an ethoxylated phenyl acrylate, lauryl acrylate, stearyl acrylate, octyl acrylate, isodecyl acrylate, tridecyl acrylate, caprolactone acrylate, nonyl phenol acrylate, cyclic trimethylolpropane formal acrylate, a methoxy polyethyleneglycol acrylate, a methoxy polypropyleneglycol acrylate, hydroxyethyl acrylate, hydroxypropyl acrylate, 2-phenoxyethyle acrylate, ethoxylated o-phenylphenol acrylate, N-[2-(acryloyloxy)ethyl] phthalimide, 2-acryloyloxyethyl succinate or glycidyl acrylate. In some embodiments, the monofunctional acrylate is isobornyl acrylate.

In some embodiments, the acrylate is difunctional. In some embodiments, the difunctional acrylate is tricyclodecane dimethanol diacrylate (SARTOMER® 833s), dioxane glycerol diacrylate (SARTOMER® CD 536), 1,6-hexanediol diacrylate (SARTOMER® 238), ethoxylated 1,6-hexanediol diacrylate, 3-methyl 1,5-pentanediol diacrylate (SARTOMER® 341), tripropylene glycol diacrylate (SARTOMER® 306), neopentyl glycol diacrylate (SARTOMER® 247), propoxylated neopentyl glycol diacrylate, dimethyloltricyclodecane diacrylate (KAYARAD® R-684), 1,4-dihydroxymethylcyclohexane diacrylate, 2,2-bis(4-hydroxy-cyclohexyl)propane diacrylate, bis(4-hydroxycyclohexyl)methane diacrylate, hydroxy pivalic acid neopentyl glycol diacrylate, or dipropylene glycol diacrylate. In some embodiments, the difunctional acrylate is dipropylene glycol diacrylate.

In some embodiments, the acrylate is an aromatic difunctional acrylate. In some embodiments, the aromatic difunctional acrylate is bisphenol A polyethylene glycol diether diacrylate (KAYARAD® R-551), 2,2'-methylenebis[p-phenylenepoly(oxyethylene)oxy]diethyl diacrylate (KAYARAD® R-712), hydroquinone diacrylate, 4,4'-dihydroxybiphenyl diacrylate, bisphenol A diacrylate, bisphenol F diacrylate, bisphenol S diacrylate, ethoxylated or propoxylated bisphenol A diacrylate, ethoxylated or propoxylated bisphenol F diacrylate, ethoxylated or propoxylated bisphenol S diacrylate, or bisphenol-A epoxy diacrylate.

In some embodiments, the acrylate is a polyethylenglycol difunctional acrylate. In some embodiments, the polyethyleneglycol difunctional acrylate is tetraethyleneglycol diacrylate (SARTOMER® 268), polyethyleneglycol (200) diacrylate (SARTOMER® 259), polyethyleneglycol (400) diacrylate (SARTOMER® 344).

In some embodiments, the acrylate is a trifunctional acrylate or an acrylate with even higher functionality. In some embodiments, the acrylate is hexane-2,4,6-triol triacrylate, glycerol triacrylate, 1,1,1-trimethylolpropane triacrylate, ethoxylated or propoxylated glycerol triacrylate, ethoxylated or propoxylated 1,1,1-trimethylolpropane triacrylate, pentaerythritol tetraacrylate, bistrimethylolpropane tetraacrylate, pentaerythritol monohydroxytriacrylate, dipentaerythritol monohydroxypentaacrylate, dipentaerythritol pentaacrylate (SARTOMER® 399), pentaerythritol triacrylate (SARTOMER® 444), pentaerythritol tetraacrylate (SARTOMER® 295), trimethylolpropane triacrylate (SARTOMER® 351), tris(2-acryloxy ethyl) isocyanurate triacrylate (SARTOMER® 368), ethoxylated trimethylolpropane triacrylate (SARTOMER® 454), or dipentaerythritol pentaacrylate ester (SARTOMER® 9041). In some embodiments, the acrylate is an aromatic triacrylate reaction product of triglycidyl ethers of trihydric phenols and phenol or cresol novolaks (phenol-formaldehdye condensation polymer) containing three hydroxy groups, with acrylic acid.

In some embodiments, the acrylate is a polyfunctional urethane acrylate. Urethane acrylates can be prepared by, e.g., reacting a hydroxy-terminated polyurethane with acrylic acid, or by reacting an isocyanate-terminated prepolymer with a hydroxyalkyl acrylate to give the urethane acrylate. In some embodiments, the urethane acrylate is made from a polyester diol, an aliphatic isocyanate, or a hydroxyalkyl acrylate.

In some embodiments, the acrylate is a higher functionality acrylate, including hyberbranched polyester types. In some embodiments, the acrylate is a commercially available acrylate such as CN2301, CN2302, CN2303, CN2304 available from SARTOMER®.

In some embodiments, the acrylate is a commercially available acrylate such as KAYARAD® D-310, D-330, DPHA-2H, DPHA-2C, DPHA-21, DPCA-20, DPCA-30, DPCA-60, DPCA-120, DN-0075, DN-2475, T-2020, T-2040, TPA-320, TPA-330 T-1420, PET-30, THE-330, and RP-1040 available from Nippon Kayaku Co., Ltd., Tokyo, Japan; R-526, R-604, R-011, R-300 and R-205 available from Nippon Kayaku Co., Ltd., Tokyo, Japan; ARONIX® M-210, M-220, M-233, M-240, M-215, M-305, M-309, M-310, M-315, M-325, M-400, M-6200, and M-6400 available from Toagosei Chemical Industry Co., Ltd., Tokyo, Japan; light acrylate BP-4EA, BP-4PA, BP-2EA, BP-2PA, and DCP-A available from Kyoeisha Chemical Industry Co., Ltd., Osaka, Japan; New Frontier BPE-4, TEICA, BR-42M, and GX-8345 available from Daichi Kogyo Seiyaku Co., Ltd., Tokyo, Japan; ASF-400 available from Nippon Steel Chemical Co., Ltd., Tokyo, Japan; Ripoxy SP-1506, SP-1507, SP-1509, VR-77, SP-4010 and SP-4060 available from Showa Highpolymer Co., Ltd., Tokyo, Japan; NK Ester A-BPE-4 available from Shin-Nakamura Chemical Industry Co., Ltd., Wakayama, Japan; SA-1002 available from Mitsubishi Chemical Co., Ltd., Tokyo, Japan; or Viscoat-195, Viscoat-230, Viscoat-260, Viscoat-310, Viscoat-2141P, Viscoat-295, Viscoat-300, Viscoat-360, Viscoat-GPT, Viscoat-400, Viscoat-700, Viscoat-540, Viscoat-3000, and Viscoat-3700 available from Osaka Organic Chemical Industry Co., Ltd., Osaka, Japan.

In some embodiments, the organic resin is a methacrylate. In some embodiments, the methacrylate is a single methacrylate compound or a mixture of different methacrylate compounds. In some embodiments, the methacrylate is monofunctional, difunctional, trifunctional, or of higher functionality.

In some embodiments, the methacrylate is monofunctional. In some embodiments, the monofunctional methacrylate is isobornyl methacrylate, tetrahydrofurfuryl methacrylate, ethoxylated phenyl methacrylate, lauryl methacrylate, stearyl methacrylate, octyl methacrylate, isodecyl methacrylate, tridecyl methacrylate, caprolactone methacrylate, nonyl phenol methacrylate, cyclic trmethylolpropane formal methacrylate, methoxy polyethyleneglycol methacrylates, methoxy polypropyleneglycol methacrylates, hydroxyethyl methacrylate, hydroxypropyl methacrylate, or glycidyl methacrylate.

In some embodiments, the methacrylate is an aliphatic or cycloaliphatic difunctional methacrylate such as 1,4-dihydroxymethylcyclohexane dimethacrylate, 2,2-bis(4-hydroxy-cyclohexyl)propane dimethacrylate, bis(4-hydroxycyclohexyl)methane dimethacrylate, or 1,6-hexanediol dimethacrylate. In some embodiments, the methacrylate is 1,6-hexanediol dimethacrylate.

In some embodiments, the methacrylate is an aromatic difunctional methacrylate such as ethoxylated (2) bisphenol A dimethacrylate (SARTOMER® 10 IK), ethoxylated (2) bisphenol A dimethacrylate (SARTOMER® 348L), ethoxylated (3) bisphenol A dimethacrylate (SARTOMER® 348C), ethoxylated (4) bisphenol A dimethacrylate (SARTOMER® 150), ethoxylated (4) bisphenol A dimethacrylate (SARTOMER® 540), ethoxylated (10) bisphenol A dimethacrylate (SARTOMER® 480), hydroquinone dimethacrylate, 4,4'-dihydroxybiphenyl dimethacrylate, bisphenol A dimethacrylate, bisphenol F dimethacrylate, bisphenol S dimethacrylate, ethoxylated or propoxylated bisphenol A dimethacrylate, ethoxylated or propoxylated bisphenol F dimethacrylate, or ethoxylated or propoxylated bisphenol S dimethacrylate.

In some embodiments, the methacrylate is a trifunctional methacrylate or a methacrylate with higher functionality such as tricyclodecane dimethanol dimethacrylate (SARTOMER® 834), trimethylolpropane trimethacrylate (SARTOMER® 350), tetramethylolmethane tetramethacrylate (SARTOMER® 367), hexane-2,4,6-triol trimethacrylate, glycerol trimethacrylate, 1,1,1-trimethylolpropane trimethacrylate, ethoxylated or propoxylated glycerol trimethacrylate, ethoxylated or propoxylated 1,1,1-trimethylolpropane trimethacrylate, pentaerythritol tetramethacrylate, bistrimethylolpropane tetramethacrylate, pentaerythritol monohydroxy triacrylate, or dipentaerythritol monohydroxypentamethacrylate.

In some embodiments, the methacrylate is an aromatic trifunctional methacrylate. In some embodiments, the aromatic trifunctional methacrylate is the reaction product of a triglycidyl ether of a trihydric phenol with phenol or cresol novolaks containing three hydroxy groups, with methacrylic acid. In some embodiments, the aromatic trimethacrylates is the reaction product of a triglycidyl ether of a trihydric phenol with a phenol or cresol novolak containing three hydroxy groups, with methacrylic acid.

In some embodiments, the organic resin is selected from the group consisting of isobornyl acrylate, isobornyl methacrylate, lauryl methacrylate, tricyclodecane dimethanol diacrylate, trimethylolpropane triacrylate, trimethylolpropane trimethacrylate, 1,3,5-triallyl-1,3,5-triazine-2,4,6(1H, 3H,5H)-trione, 1,6-hexanediol dimethacrylate, dipropylene glycol diacrylate, and combinations thereof.

In some embodiments, the organic resin is an epoxy monomer. In some embodiments, the epoxy monomer is 3,4-epoxycyclohexylmethyl-3',4-epoxycyclohexane carboxylate, cyclohexene oxide, limonene dioxide, glycidyl methacrylate, trimethylolpropane triglycidyl ether, neopentyl glycol diglycidyl ether, bisphenol-A diglycidyl ether, glycidyl acrylate ester, glycidyl methacrylate ester, α-ethyl acrylate glycidyl ester, α-N-propyl acrylate glycidyl ester, α-N-butyl acrylate glycidyl ester, acrylate-3,4-epoxy-butyl ester, methacrylate-3,4-epoxy-butyl ester, acrylate-6,7-epoxy-heptyl ester, methacrylate-6,7-epoxy-heptyl ester, α-ethyl acrylate-6,7-epoxy-heptyl ester, o-vinyl benzyl glycidyl ether, m-vinyl benzyl glycidyl ether, or p-vinyl benzyl glycidyl ether. In some embodiments, the epoxy monomer is limonene dioxide.

In some embodiments, the organic resin is an oxetane monomer. In some embodiments, the oxetane monomer is dioxetanyl ether, 3-ethyl-3-hydroxymethyl oxetane, 3-ethyl-3-phenoxymethyloxetane, 3,3-dimethyl oxetane, 3,3-(hydroxymethyl) methyl oxetane, 3,3-(nitratomethyl) methyl oxetane, 3,3-bis(hydroxymethyl) oxetane, 3,3-bis(chloromethyl) oxetane, 3,3-(azidomethyl) methyl oxetane, 3,3-bis (azidomethyl) oxetane, 3-methyl nitroaminomethyl-oxetane, 3,3-bis(methyl nitraminomethyl) oxetane, 3,3-(difluoroaminomethyl) methyl oxetane, 3,3-bis(difluoro aminomethyl) oxetane, 3-hydroxy-oxetane, 1,4-bis[(3-ethyl-3-oxetanylmethoxy)methyl]benzene, or bis[1-ethyl(3-oxetanyl)]methyl ether. In some embodiments, the oxetane monomer is dioxetanyl ether.

In some embodiments, the nanostructure composition comprises at least one organic resin. In some embodiments, the nanostructure composition comprises between 1 and 5, between 1 and 4, between 1 and 3, between 1 and 2, between 2 and 5, between 2 and 4, between 2 and 3, between 3 and 5, between 3 and 4, or between 4 and 5 organic resins.

The organic resin can be present in any suitable amount. For example, the organic resin can be present in an amount that is more than, about the same as, or less than (weight/weight) compared to the nanostructures. In some embodiments, the weight ratio of the organic resin to the nanostructures is about 1000:1 to about 1:1000, about 1000:1 to about 1:500, about 1000:1 to about 1:200, about 1000:1 to about 1:100, about 1000:1 to about 1:50, about 1000:1 to about 1:10, about 1000:1 to about 1:1, about 500:1 to about 1:1000, about 500:1 to about 1:500, about 500:1 to about 1:200, about 500:1 to about 1:100, about 500:1 to about 1:50, about 500:1 to about 1:10, about 500:1 to about 1:1, about 200:1 to about 1:1000, about 200:1 to about 1:500, about 200:1 to about 1:200, about 200:1 to about 1:100, about 200:1 to about 1:50, about 200:1 to about 1:10, about 200:1 to about 1:1, about 100:1 to about 1:1000, about 100:1 to about 1:500, about 100:1 to about 1:200, about 100:1 to about 1:100, about 100:1 to about 1:50, about 100:1 to about 1:10, about 100:1 to about 1:1, about 50:1 to about 1:1000, about 50:1 to about 1:500, about 50:1 to about 1:200, about 50:1 to about 1:100, about 50:1 to about 1:50, about 50:1 to about 1:10, about 50:1 to about 1:1, about 10:1 to about 1:1000, about 10:1 to about 1:500, about 1:10, to about 1:200, about 10:1 to about 1:100, about 10:1 to about 1:50, about 10:1 to about 1:10, about 10:1 to about 1:1. In some embodiments, the weight ratio of the organic resin to the nanostructures is about 1000:1, about 500:1, about 200:1, about 100:1, about 50:1, about 10:1, about 1:1, about 1:10, about 1:50, about 1:100, about 1:200, about 1:500, or about 1:1000.

In some embodiments, the weight percentage of the organic resin in the nanostructure composition is between about 0.01% and about 99%, about 0.01% and about 95%, about 0.01% and about 90%, about 0.01% and about 80%, about 0.01% and about 70%, about 0.01% and about 60%, about 0.01% and about 50%, about 0.01% and about 25%, about 0.01% and about 20%, about 0.01% and about 15%, about 0.01% and about 10%, about 0.01% and about 5%, about 0.01% and about 2%, about 0.01% and about 1%, about 1% and about 99%, about 1% and about 95%, about 1% and about 90%, about 1% and about 80%, about 1% and about 70%, about 1% and about 60%, about 1% and about 50%, about 1% and about 25%, about 1% and about 20%, about 1% and about 15%, about 1% and about 10%, about 1% and about 5%, about 1% and about 2%, about 2% and about 99%, about 2% and about 95%, about 2% and about 90%, about 2% and about 80%, about 2% and about 70%, about 2% and about 60%, about 2% and about 50%, about 2% and about 25%, about 2% and about 20%, about 2% and about 15%, about 2% and about 10%, about 2% and about 5%, about 5% and about 99%, about 5% and about 95%, about 5% and about 90%, about 5% and about 80%, about 5% and about 70%, about 5% and about 60%, about 5% and about 50%, about 5% and about 25%, about 5% and about 20%, about 5% and about 15%, about 5% and about 10%, about 10% and about 99%, about 10% and about 95%, about 10% and about 90%, about 10% and about 80%, about 10% and about 70%, about 10% and about 60%, about 10% and about 50%, about 10% and about 25%, about 10% and about 20%, about 10% and about 15%, about 15% and about 50%, about 15% and about 25%, about 15% and about 20%, about 20% and about 99%, about 20% and about 95%, about 20% and about 90%, about 20% and about 80%, about 20% and about 70%, about 20% and about 60%, about 20% and about 50%, about 20% and about 25%, about 25% and about 99%, about 25% and about 95%, about 25% and about 90%, about 25% and about 80%, about 25% and about 70%, about 25% and about 60%, about 25% and about 50%, about 50% and about 99%, about 50% and about 95%, about 50% and about 90%, about 50% and about 80%, about 50% and about 70%, about 50% and about 60%, about 60% and about 99%, about 60% and about 95%, about 60% and about 90%, about 60% and about 80%, about 60% and about 70%, about 70% and about 99%, about 70% and about 95%, about 70% and about 90%, about 70% and about 80%, about 80% and about 90%, about 80% and about 95%, about 80% and about 99%, about 90% and about 95%, about 90% and about 99%, or about 95% and about 99%.

In some embodiments, the weight percentage of the organic resin in the nanostructure molded article is between about 0.01% and about 99%, about 0.01% and about 95%, about 0.01% and about 90%, about 0.01% and about 80%, about 0.01% and about 70%, about 0.01% and about 60%, about 0.01% and about 50%, about 0.01% and about 25%, about 0.01% and about 20%, about 0.01% and about 15%, about 0.01% and about 10%, about 0.01% and about 5%, about 0.01% and about 2%, about 0.01% and about 1%, about 1% and about 99%, about 1% and about 95%, about 1% and about 90%, about 1% and about 80%, about 1% and about 70%, about 1% and about 60%, about 1% and about 50%, about 1% and about 25%, about 1% and about 20%, about 1% and about 15%, about 1% and about 10%, about 1% and about 5%, about 1% and about 2%, about 2% and about 99%, about 2% and about 95%, about 2% and about 90%, about 2% and about 80%, about 2% and about 70%, about 2% and about 60%, about 2% and about 50%, about 2% and about 25%, about 2% and about 20%, about 2% and about 15%, about 2% and about 10%, about 2% and about 5%, about 5% and about 99%, about 5% and about 95%, about 5% and about 90%, about 5% and about 80%, about 5% and about 70%, about 5% and about 60%, about 5% and about 50%, about 5% and about 25%, about 5% and about 20%, about 5% and about 15%, about 5% and about 10%, about 10% and about 99%, about 10% and about 95%, about 10% and about 90%, about 10% and about 80%, about 10% and about 70%, about 10% and about 60%, about 10% and about 500, about 10% and about 25%, about 10% and about 20%, about 10% and about 15%, about 15% and about 50%, about 15% and about 25%, about 15% and about 20%, about 20% and about 99%, about 20% and about 95%, about 20% and about 90%, about 20% and about 80%, about 20% and about 70%, about 20% and about 60%, about 20% and about 50%, about 20% and about 25%, about 25% and about 99%, about 25% and about 95% about 250 and about 90%, about 25% and about 80%, about 25% and about 70%, about 25% and about 60%, about 25% and about 50%, about 50% and about 99%, about 50% and about 95%, about 50% and about 90%, about 50% and about 80%, about 50% and about 70%, about 50% and about 60%, about 60% and about 99%, about 60% and about 95%, about 60% and about 90%, about 60% and about 80%, about 60% and about 70%, about 70% and about 99%, about 70% and about 95%, about 70% and about 90%, about 70% and about 80%, about 80% and about 90%, about 80% and about 90%, about 80% and about 95%, about 80% and about 99%, about 90% and about 95%, about 90% and about 99%, or about 95% and about 99%.

Making the Nanostructure Compositions

The present invention provides a method of making a nanostructure composition comprising admixing at least one population of nanostructures, wherein the nanostructures comprise a polyfunctional poly(alkylene oxide) bound to the nanostructures, and at least one organic resin.

The present invention provides a method of preparing a nanostructure composition, the method comprising:

(a) providing a composition comprising at least one population of nanostructures, wherein the nanostructures comprise polyfunctional poly(alkylene oxide) ligands bound to the nanostructures; and (b) admixing at least one organic resin with the composition of (a).

In some embodiments, the population of nanostructures emits red, green, or blue light. In some embodiments, the respective portions of red, green, and blue light can be controlled to achieve a desired white point for the white light emitted by a display device incorporating a nanostructure film.

In some embodiments, the nanostructure composition comprises at least one population of nanostructure materials. In some embodiments, the nanostructure composition comprises a population of between 1 and 5, 1 and 4, 1 and 3, 1 and 2, 2 and 5, 2 and 4, 2 and 3, 3 and 5, 3 and 4, or 4 and 5 nanostructure materials. Any suitable ratio of the populations of quantum dots can be combined to create the desired nanostructure composition characteristics. In some embodiments, the nanostructure is a quantum dot.

In some embodiments, the nanostructure composition comprises at least one organic resin. In some embodiments, the nanostructure composition comprises between 1 and 5, 1 and 4, 1 and 3, 1 and 2, 2 and 5, 2 and 4, 2 and 3, 3 and 5, 3 and 4, or 4 and 5 organic resins. In some embodiments, the nanostructure composition comprises between 1 and 3, 1 and 2, or 2 and 3 organic resins. In some embodiments, the nanostructure composition comprises 1 organic resin. In some embodiments, the nanostructure is a quantum dot.

In some embodiments, the weight percentage of the population of nanostructures in the nanostructure composition is between about 0.001% and about 2%, about 0.001% and about 1%, about 0.001% and about 0.5%, about 0.001% and about 0.1%, about 0.001% and 0.01%, about 0.01% and about 2%, about 0.01% and about 1%, about 0.01% and about 0.5%, about 0.01% and about 0.1%, about 0.1% and about 2%, about 0.1% and about 1%, about 0.1% and about 0.5%, about 0.5% and about 2%, about 0.5% and about 1%, or about 1% and about 2%. In some embodiments, the nanostructure is a quantum dot.

In some embodiments, the weight percentage of the organic resin in the nanostructure composition is between about 5% and about 50%, about 5% and about 40%, about 5% and about 30%, about 5% and about 20%, about 5% and about 10%, about 10% and about 50%, about 10% and about 40%, about 10% and about 30%, about 10% and about 20%, about 20% and about 50%, about 20% and about 40%, about 20% and about 30%, about 30% and about 50%, about 30% and about 40%, or about 40% and about 50%.

In some embodiments, the at least one organic resin is admixed with the at least one population of nanostructures at an agitation rate of between about 100 rpm and about 10,000 rpm, about 100 rpm and about 5,000 rpm, about 100 rpm and about 3,000 rpm, about 100 rpm and about 1,000 rpm, about 100 rpm and about 500 rpm, about 500 rpm and about 10,000 rpm, about 500 rpm and about 5,000 rpm, about 500 rpm and about 3,000 rpm, about 500 rpm and about 1,000 rpm, about 1,000 rpm and about 10,000 rpm, about 1,000 rpm and about 5,000 rpm, about 1,000 rpm and about 3,000 rpm, about 3,000 rpm and about 10,000 rpm, about 3,000 rpm and about 10,000 rpm, or about 5,000 rpm and about 10,000 rpm.

In some embodiments, the at least one organic resin is admixed with the at least one population of nanostructures at a temperature between about −5° C. and about 100° C., about −5° C. and about 75° C., about −5° C. and about 50° C., about −5° C. and about 23° C., about 23° C. and about 100° C., about 23° C. and about 75° C., about 23° C. and about 50° C., about 50° C. and about 100° C., about 50° C. and about 75° C., or about 75° C. and about 100° C. In some embodiments, the at least one organic resin is admixed with the at least one population of nanostructures at a temperature between about 23° C. and about 50° C.

In some embodiments, the least one organic resin is admixed with the at least one population of nanostructures for a time of between about 10 minutes and about 24 hours, about 10 minutes and about 20 hours, about 10 minutes and about 15 hours, about 10 minutes and about 10 hours, about 10 minutes and about 5 hours, about 10 minutes and about 1 hour, about 10 minutes and about 30 minutes, about 30 minutes and about 24 hours, about 30 minutes and about 20 hours, about 30 minutes and about 15 hours, about 30 minutes and about 10 hours, about 30 minutes and about 5 hours, about 30 minutes and about 1 hour, about 1 hour and about 24 hours, about 1 hour and about 20 hours, about 1 hour and about 15 hours, about 1 hour and about 10 hours, about 1 hour and about 5 hours, about 5 hours and about 24 hours, about 5 hours and about 20 hours, about 5 hours and about 15 hours, about 5 hours and about 10 hours, about 10 hours and about 24 hours, about 10 hours and about 20 hours, about 10 hours and about 15 hours, about 15 hours and about 24 hours, about 15 hours and about 20 hours, or about 20 hours and about 24 hours.

In some embodiments, the admixing further comprises a solvent. In some embodiments, the solvent is selected from the group consisting of chloroform, acetone, butanon, ethylene glycol monoethyl ether, ethylene glycol monopropyl ether, ethylene glycol monobutyl ether, diethylene glycol diethyl ether, methyl ethyl ketone, methyl isobutyl ketone, monomethyl ether glycol ester, gamma-butyrolactone, methylacetic-3-ethyl ether, butyl carbitol, butyl carbitol acetate, propanediol monomethyl ether, propanediol monomethyl ether acetate, cyclohexane, toluene, xylene, isopropyl alcohol, and combinations thereof.

Increased Stability of the Nanostructure Compositions

The polyfunctional poly(alkylene oxide) ligand provides increased stability to the population of nanostructures in an organic resin and allows for storage of the nanostructures for extended periods of time. In some embodiments, the at least one population of nanostructures can be stored with an organic resin at a temperature between about 10° C. and about 90° C. for between about 1 minute and about 3 years, about 1 minute and about 12 months, about 1 minute and about 6 months, about 1 minute and about 3 months, about 1 minute and about 1 month, about 1 minute and about 15 days, about 1 minute and about 1 day, about 1 day and about 3 years, about 1 day and about 12 months, about 1 day and about 6 months, about 1 day and about 3 months, about 1 day and about 1 month, about 1 day and about 15 days, about 15 days and about 3 years, about 15 days and about 12 months, about 15 days and about 6 months, about 15 days and about 3 months, about 15 days and about 1 month, about 1 month and about 3 years, about 1 month and about 12 months, about 1 month and about 6 months, about 1 month and about 3 months, about 3 months and about 3 years, about 3 months and about 12 months, about 3 months and about 6 months, about 6 months and about 3 years, about 6 months and about 12 months, or about 12 months and about 3 years.

The polyfunctional poly(alkylene oxide) ligand provides increased stability to the population of nanostructures in an organic resin and allows for storage of inks prepared with the nanostructure compositions for extended periods of time. In some embodiments, the at least one population of nanostructures can be stored with an organic resin at a temperature between about 30° C. and about 90° C. for between about 1 minute and about 3 years, about 1 minute and about 12 months, about 1 minute and about 6 months, about 1 minute and about 3 months, about 1 minute and about 1 month, about 1 minute and about 15 days, about 1 minute and about 1 day, about 1 day and about 3 years, about 1 day and about 12 months, about 1 day and about 6 months, about 1 day and about 3 months, about 1 day and about 1 month, about 1 day and about 15 days, about 15 days and about 3 years, about 15 days and about 12 months, about 15 days and about 6 months, about 15 days and about 3 months, about 15 days and about 1 month, about 1 month and about 3 years, about 1 month and about 12 months, about 1 month and about 6 months, about 1 month and about 3 months, about 3 months and about 3 years, about 3 months and about 12 months, about 3 months and about 6 months, about 6 months and about 3 years, about 6 months and about 12 months, or about 12 months and about 3 years.

In some embodiments, inks prepared with nanostructures comprising polyfunctional poly(alkylene oxide) ligands provide increased resistance to aggregation with the organic resin. This allows an increased concentration of organic resin to be used before the nanostructure composition begins to precipitate. In some embodiments, inks prepared with nanostructure compositions comprising polyfunctional poly(alkylene oxide) ligands and an organic resin can be stored at a temperature between about 10° C. and about 90° C. with an organic resin without precipitation for between about 1 minute and about 3 years, about 1 minute and about 12 months, about 1 minute and about 6 months, about 1 minute and about 3 months, about 1 minute and about 1 month, about 1 minute and about 15 days, about 1 minute and about 1 day, about 1 day and about 3 years, about 1 day and about 12 months, about 1 day and about 6 months, about 1 day and about 3 months, about 1 day and about 1 month, about 1 day and about 15 days, about 15 days and about 3 years, about 15 days and about 12 months, about 15 days and about 6 months, about 15 days and about 3 months, about 15 days and about 1 month, about 1 month and about 3 years, about 1 month and about 12 months, about 1 month and about 6 months, about 1 month and about 3 months, about 3 months and about 3 years, about 3 months and about 12 months, about 3 months and about 6 months, about 6 months and about 3 years, about 6 months and about 12 months, or about 12 months and about 3 years.

Increased Stability of the Nanostructure Compositions in Inks

The polyfunctional poly(alkylene oxide) ligand bind more stronger to the quantum dots and provide increased thermal and environmental stability to the population of nanostructures in an organic resin and allows for improved external quantum efficiency of inks prepared with the nanostructure compositions. In some embodiments, films made using inks prepared with nanostructure compositions show an external quantum efficiency (EQE) of between about 1% and about 30% when stored at a temperature between about 10° C. and about 90° C. for between about 1 minute and about 3 years, about 1 minute and about 12 months, about 1 minute and about 6 months, about 1 minute and about 3 months, about 1 minute and about 1 month, about 1 minute and about 15 days, about 1 minute and about 1 day, about 1 day and about 3 years, about 1 day and about 12 months, about 1 day and about 6 months, about 1 day and about 3 months, about 1 day and about 1 month, about 1 day and about 15 days, about 15 days and about 3 years, about 15 days and about 12 months, about 15 days and about 6 months, about 15 days and about 3 months, about 15 days and about 1 month, about 1 month and about 3 years, about 1 month and about 12 months, about 1 month and about 6 months, about 1 month and about 3 months, about 3 months and about 3 years, about 3 months and about 12 months, about 3 months and about 6 months, about 6 months and about 3 years, about 6 months and about 12 months, or about 12 months and about 3 years.

The polyfunctional poly(alkylene oxide) ligand provides increased stability to the population of nanostructures in an organic resin and allows for storage of the nanostructures for extended periods of time. In some embodiments, the at least one population of nanostructures can be stored with an organic resin at a temperature between about 30° C. and about 90° C. for between about 1 minute and about 3 years, about 1 minute and about 12 months, about 1 minute and about 6 months, about 1 minute and about 3 months, about 1 minute and about 1 month, about 1 minute and about 15 days, about 1 minute and about 1 day, about 1 day and about 3 years, about 1 day and about 12 months, about 1 day and about 6 months, about 1 day and about 3 months, about 1 day and about 1 month, about 1 day and about 15 days, about 15 days and about 3 years, about 15 days and about 12 months, about 15 days and about 6 months, about 15 days and about 3 months, about 15 days and about 1 month, about 1 month and about 3 years, about 1 month and about 12 months, about 1 month and about 6 months, about 1 month and about 3 months, about 3 months and about 3 years, about 3 months and about 12 months, about 3 months and about 6 months, about 6 months and about 3 years, about 6 months and about 12 months, or about 12 months and about 3 years.

In some embodiments, nanostructures comprising polyfunctional poly(alkylene oxide) ligands provide increased resistance to aggregation with the organic resin. This allows an increased concentration of organic resin to be used before the nanostructure composition begins to precipitate. In some embodiments, the at least one population of nanostructures can be stored at a temperature between about 10° C. and about 90° C. with an organic resin without precipitation for between about 1 minute and about 3 years, about 1 minute and about 12 months, about 1 minute and about 6 months, about 1 minute and about 3 months, about 1 minute and about 1 month, about 1 minute and about 15 days, about 1 minute and about 1 day, about 1 day and about 3 years, about 1 day and about 12 months, about 1 day and about 6 months, about 1 day and about 3 months, about 1 day and about 1 month, about 1 day and about 15 days, about 15 days and about 3 years, about 15 days and about 12 months, about 15 days and about 6 months, about 15 days and about 3 months, about 15 days and about 1 month, about 1 month and about 3 years, about 1 month and about 12 months, about 1 month and about 6 months, about 1 month and about 3 months, about 3 months and about 3 years, about 3 months and about 12 months, about 3 months and about 6 months, about 6 months and about 3 years, about 6 months and about 12 months, or about 12 months and about 3 years.

Making a Nanostructure Layer

The nanostructures used in the present invention can be embedded in a polymeric matrix using any suitable method. As used herein, the term "embedded" is used to indicate that the nanostructure population is enclosed or encased with the polymer that makes up the majority of the component of the matrix. In some embodiments, at least one nanostructure population is suitably uniformly distributed throughout the matrix. In some embodiments, the at least one nanostructure population is distributed according to an application-specific distribution. In some embodiments, the nanostructures are mixed in a polymer and applied to the surface of a substrate.

The nanostructure composition can be deposited by any suitable method known in the art, including but not limited to painting, spray coating, solvent spraying, wet coating, adhesive coating, spin coating, tape-coating, roll coating, flow coating, inkjet vapor jetting, drop casting, blade coating, mist deposition, or a combination thereof. Preferably, the nanostructure composition is cured after deposition. Suitable curing methods include photo-curing, such as UV curing, and thermal curing. Traditional laminate film processing methods, tape-coating methods, and/or roll-to-roll fabrication methods can be employed in forming the nanostructure films. The nanostructure composition can be coated directly onto the desired layer of a substrate. Alternatively, the nanostructure composition can be formed into a solid layer as an independent element and subsequently applied to the substrate. In some embodiments, the nanostructure composition can be deposited on one or more barrier layers.

Spin Coating

In some embodiments, the nanostructure composition is deposited onto a substrate using spin coating. In spin coating a small amount of material is typically deposited onto the center of a substrate loaded a machine called the spinner which is secured by a vacuum. A high speed of rotation is applied on the substrate through the spinner which causes centripetal force to spread the material from the center to the edge of the substrate. While most of the material would be spun off, a certain amount remains o the substrate, forming a thin film of material on the surface as the rotation continues. The final thickness of the film is determined by the nature of the deposited material and the substrate in addition to the parameters chosen for the spin process such as spin speed, acceleration, and spin time. For typical films, a spin speed of 1500 to 6000 rpm is used with a spin time of 10-60 seconds.

Mist Deposition

In some embodiments, the nanostructure composition is deposited onto a substrate using mist deposition. Mist deposition takes place at room temperature and atmospheric pressure and allows precise control over film thickness by changing the process conditions. During mist deposition, a liquid source material is turned into a very fine mist and carried to the deposition chamber by nitrogen gas. The mist is then drawn to the wafer surface by a high voltage potential between the field screen and the wafer holder. Once the droplets coalesce on the wafer surface, the wafer is removed from the chamber and thermally cured to allow the solvent to evaporate. The liquid precursor is a mixture of solvent and material to be deposited. It is carried to the atomizer by pressurized nitrogen gas. Price, S. C., et al., "Formation of Ultra-Thin Quantum Dot Films by Mist Deposition," *ESC Transactions* 11:89-94 (2007).

Spray Coating

In some embodiments, the nanostructure composition is deposited onto a substrate using spray coating. The typical equipment for spray coating comprises a spray nozzle, an atomizer, a precursor solution, and a carrier gas. In the spray deposition process, a precursor solution is pulverized into micro sized drops by means of a carrier gas or by atomization (e.g., ultrasonic, air blast, or electrostatic). The droplets that come out of the atomizer are accelerated by the substrate surface through the nozzle by help of the carrier gas which is controlled and regulated as desired. Relative motion between the spray nozzle and the substrate is defined by design for the purpose of full coverage on the substrate.

In some embodiments, application of the nanostructure composition further comprises a solvent. In some embodiments, the solvent for application of the nanostructure composition is water, organic solvents, inorganic solvents, halogenated organic solvents, or mixtures thereof. Illustrative solvents include, but are not limited to, water, $D_2O$, acetone, ethanol, dioxane, ethyl acetate, methyl ethyl ketone, isopropanol, anisole, γ-butyrolactone, dimethylformamide, N-methylpyrroldinone, dimethylacetamide, hexamethylphosphoramide, toluene, dimethylsulfoxide, cyclopentanone, tetramethylene sulfoxide, xylene, ε-caprolactone, tetrahydrofuran, tetrachloroethylene, chloroform, chlorobenzene, dichloromethane, 1,2-dichloroethane, 1,1,2,2-tetrachloroethane, or mixtures thereof.

In some embodiments, the nanostructure compositions are thermally cured to form the nanostructure layer. In some embodiments, the compositions are cured using UV light. In some embodiments, the nanostructure composition is coated directly onto a barrier layer of a nanostructure film, and an additional barrier layer is subsequently deposited upon the nanostructure layer to create the nanostructure film. A support substrate can be employed beneath the barrier film for added strength, stability, and coating uniformity, and to prevent material inconsistency, air bubble formation, and wrinkling or folding of the barrier layer material or other materials. Additionally, one or more barrier layers are preferably deposited over a nanostructure layer to seal the material between the top and bottom barrier layers. Suitably, the barrier layers can be deposited as a laminate film and optionally sealed or further processed, followed by incorporation of the nanostructure film into the particular lighting device. The nanostructure composition deposition process can include additional or varied components, as will be understood by persons of ordinary skill in the art. Such embodiments will allow for in-line process adjustments of the nanostructure emission characteristics, such as brightness and color (e.g., to adjust the quantum dot film white point), as well as the nanostructure film thickness and other characteristics. Additionally, these embodiments will allow for periodic testing of the nanostructure film characteristics during production, as well as any necessary toggling to achieve precise nanostructure film characteristics. Such testing and adjustments can also be accomplished without changing the mechanical configuration of the processing line, as a computer program can be employed to electronically change the respective amounts of mixtures to be used in forming a nanostructure film.

Barrier Layers

In some embodiments, the nanostructure molded article comprises one or more barrier layers disposed on either one or both sides of the nanostructure layer. Suitable barrier layers protect the nanostructure layer and the nanostructure molded article from environmental conditions such as high temperatures, oxygen, and moisture. Suitable barrier materials include non-yellowing, transparent optical materials which are hydrophobic, chemically and mechanically compatible with the nanostructure molded article, exhibit photo- and chemical-stability, and can withstand high temperatures. Preferably, the one or more barrier layers are index-matched to the nanostructure molded article. In preferred embodiments, the matrix material of the nanostructure molded article and the one or more adjacent barrier layers are index-matched to have similar refractive indices, such that most of the light transmitting through the barrier layer toward the nanostructure molded article is transmitted from the barrier layer into the nanostructure layer. This index-matching reduces optical losses at the interface between the barrier and matrix materials.

The barrier layers are suitably solid materials, and can be a cured liquid, gel, or polymer. The barrier layers can comprise flexible or non-flexible materials, depending on the particular application. Barrier layers are preferably planar layers, and can include any suitable shape and surface area configuration, depending on the particular lighting application. In preferred embodiments, the one or more barrier layers will be compatible with laminate film processing techniques, whereby the nanostructure layer is disposed on at least a first barrier layer, and at least a second barrier layer is disposed on the nanostructure layer on a side opposite the nanostructure layer to form the nanostructure molded article according to one embodiment. Suitable barrier materials include any suitable barrier materials known in the art. For example, suitable barrier materials include glasses, polymers, and oxides. Suitable barrier layer materials include, but are not limited to, polymers such as polyethylene terephthalate (PET); oxides such as silicon oxide, titanium oxide, or aluminum oxide (e.g., $SiO_2$, $Si_2O_3$, $TiO_2$, or $Al_2O_3$); and suitable combinations thereof. Preferably, each barrier layer of the nanostructure molded article comprises at least 2 layers comprising different materials or compositions, such that the multi-layered barrier eliminates or reduces pinhole defect alignment in the barrier layer, providing an effective barrier to oxygen and moisture penetration into the nanostructure layer. The nanostructure layer can include any suitable material or combination of materials and any suitable number of barrier layers on either or both sides of the nanostructure layer. The materials, thickness, and number of barrier layers will depend on the particular application, and will suitably be chosen to maximize barrier protection and brightness of the nanostructure layer while minimizing thickness of the nanostructure molded article. In preferred embodiments, each barrier layer comprises a laminate film, preferably a dual laminate film, wherein the thickness of each barrier layer is sufficiently thick to eliminate wrinkling in roll-to-roll or laminate manufacturing processes. The number or thickness of the barriers may further depend on legal toxicity guidelines in embodiments where the nanostructures comprise heavy metals or other toxic materials, which guidelines may require more or thicker barrier layers. Additional considerations for the barriers include cost, availability, and mechanical strength.

In some embodiments, the nanostructure film comprises two or more barrier layers adjacent each side of the nanostructure layer, for example, two or three layers on each side or two barrier layers on each side of the nanostructure layer. In some embodiments, each barrier layer comprises a thin glass sheet, e.g., glass sheets having a thickness of about 100 µm, 100 µm or less, or 50 µm or less.

Each barrier layer of the nanostructure film can have any suitable thickness, which will depend on the particular requirements and characteristics of the lighting device and application, as well as the individual film components such as the barrier layers and the nanostructure layer, as will be understood by persons of ordinary skill in the art. In some embodiments, each barrier layer can have a thickness of 50 µm or less, 40 µm or less, 30 µm or less, 25 µm or less, 20 µm or less, or 15 µm or less. In certain embodiments, the barrier layer comprises an oxide coating, which can comprise materials such as silicon oxide, titanium oxide, and aluminum oxide (e.g., $SiO_2$, $Si_2O_3$, $TiO_2$, or $Al_2O_3$). The oxide coating can have a thickness of about 10 µm or less, 5 µm or less, 1 µm or less, or 100 nm or less. In certain embodiments, the barrier comprises a thin oxide coating with a thickness of about 100 nm or less, 10 nm or less, 5 nm or less, or 3 nm or less. The top and/or bottom barrier can consist of the thin oxide coating, or may comprise the thin oxide coating and one or more additional material layers.

In some embodiments, the barrier layers can be a hybrid structure consisting of a transparent surface such as glass on one side and an opaque surface on the other side. The opaque surface can be a reflective material such as a metal, silicon, or other semiconductor. The opaque surface can be used for optical and/or thermal and/or electrical purposes.

Improved Properties of the Nanostructure Films

Films prepared using nanostructure compositions comprising a population of nanostructures comprising polyfunctional poly(alkylene oxide) ligands in an organic resin provide increased stability at high temperatures. In some embodiments, films prepared using the nanostructure compositions can be stably stored at a temperature between 40° C. and 100° C. for between about 1 minute and about 3 years, about 1 minute and about 12 months, about 1 minute and about 6 months, about 1 minute and about 3 months, about 1 minute and about 1 month, about 1 minute and about 15 days, about 1 minute and about 1 day, about 1 day and about 3 years, about 1 day and about 12 months, about 1 day and about 6 months, about 1 day and about 3 months, about 1 day and about 1 month, about 1 day and about 15 days, about 15 days and about 3 years, about 15 days and about 12 months, about 15 days and about 6 months, about 15 days and about 3 months, about 15 days and about 1 month, about 1 month and about 3 years, about 1 month and about 12 months, about 1 month and about 6 months, about 1 month and about 3 months, about 3 months and about 3 years, about 3 months and about 12 months, about 3 months and about 6 months, about 6 months and about 3 years, about 6 months and about 12 months, or about 12 months and about 3 years.

Films prepared using nanostructure compositions comprising a population of nanostructures comprising polyfunctional poly(alkylene oxide) ligands in an organic resin provide increased stability at high humidity levels. In some embodiments, films prepared using the nanostructure compositions can be stably stored at a relative humidity level between about 60% and about 100% for between about 1 minute and about 3 years, about 1 minute and about 12 months, about 1 minute and about 6 months, about 1 minute and about 3 months, about 1 minute and about 1 month, about 1 minute and about 15 days, about 1 minute and about 1 day, about 1 day and about 3 years, about 1 day and about 12 months, about 1 day and about 6 months, about 1 day and about 3 months, about 1 day and about 1 month, about 1 day and about 15 days, about 15 days and about 3 years, about 15 days and about 12 months, about 15 days and about 6 months, about 15 days and about 3 months, about 15 days and about 1 month, about 1 month and about 3 years, about 1 month and about 12 months, about 1 month and about 6 months, about 1 month and about 3 months, about 3 months and about 3 years, about 3 months and about 12 months, about 3 months and about 6 months, about 6 months and about 3 years, about 6 months and about 12 months, or about 12 months and about 3 years.

Nanostructure Film Features and Embodiments

In some embodiments, the nanostructure films are used to form display devices. As used herein, a display device refers to any system with a lighting display. Such devices include, but are not limited to, devices encompassing a liquid crystal display (LCD), televisions, computers, mobile phones, smart phones, personal digital assistants (PDAs), gaming devices, electronic reading devices, digital cameras, and the like.

In some embodiments, the optical films containing nanostructure compositions are substantially free of cadmium. As used herein, the term "substantially free of cadmium" is intended that the nanostructure compositions contain less than 100 ppm by weight of cadmium. The RoHS compliance definition requires that there must be no more than 0.01% (100 ppm) by weight of cadmium in the raw homogeneous precursor materials. The cadmium concentration can be measured by inductively coupled plasma mass spectroscopy (ICP-MS) analysis, and are on the parts per billion (ppb) level. In some embodiments, optical films that are "substantially free of cadmium" contain 10 to 90 ppm cadmium. In other embodiment, optical films that are substantially free of cadmium contain less than about 50 ppm, less than about 20 ppm, less than about 10 ppm, or less than about 1 ppm of cadmium.

EXAMPLES

The following examples are illustrative and non-limiting, of the products and methods described herein. Suitable modifications and adaptations of the variety of conditions, formulations, and other parameters normally encountered in the field and which are obvious to those skilled in the art in view of this disclosure are within the spirit and scope of the invention.

Mercaptosuccinic acid (97%), 3-mercaptopropionic acid (99%), azobisisobutyronitrile (AIBN, 98%), and all solvents were purchased from Sigma-Aldrich. Allyloxy polyethylene glycols of various molecular weights were purchased from Gelest. Ethyl (2,4,6-trimethylbenzoyl) phenylphosphinate [TPO-L] was purchased from Ciba Specialty Chemicals. All chemicals were used without further purification.

Example 1

Preparation of a Hydroxy-Terminated Dicarboxylic Acid Ligand Using a Photoinitiator

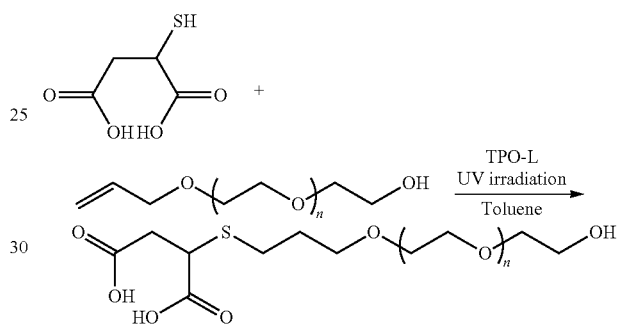

In a 40 mL glass vial in a $N_2$ filled glovebox, 1.5 g (10 mmol) of mercaptosuccinic acid, 8 g (~10.7 mmol) allyloxy polyethylene glycol (12-20 EO units, approx. MW 750), 0.1 g TPO-L (equivalent to 1% of solids in reaction), and 20 mL toluene were added. The vial was capped and then placed in a UV chamber irradiated with a metal halide lamp and fitted with a mechanical shutter. The vial was irradiated for 10 sec at a time, with intermittent shaking, for a total exposure of 1 min (equivalent to 5000 mJ/cm$^2$ dose). Mercaptosuccinic acid is a solid that is mostly insoluble in toluene, but the final product is a liquid and partially soluble. Therefore, the progress of the reaction can be followed visually—it starts as a heterogeneous mixture but becomes a clear and colorless solution upon consumption of mercaptosuccinic acid.

Upon completion of the reaction, the vial was transferred to a glovebox and the contents were washed by adding an equal part of hexane and shaking vigorously. Upon centrifugation for 5 minutes at 4000 rpm, two clear and colorless phases formed. The top phase containing hexane, toluene, and excess TPO-L was discarded. The product was isolated by drying the bottom phase under vacuum at room temperature.

The choice of TPO-L in the photoinitiated synthesis is guided by its initiation efficiency, ease of handling, and solubility in a wide range of solvents. Solubility is important since it allows easy removal of excess TPO-L by washing before the product is exposed to quantum dots. This is important because long-lived radicals from excess initiator are known to quench quantum dot photoluminescence.

Figure 2:
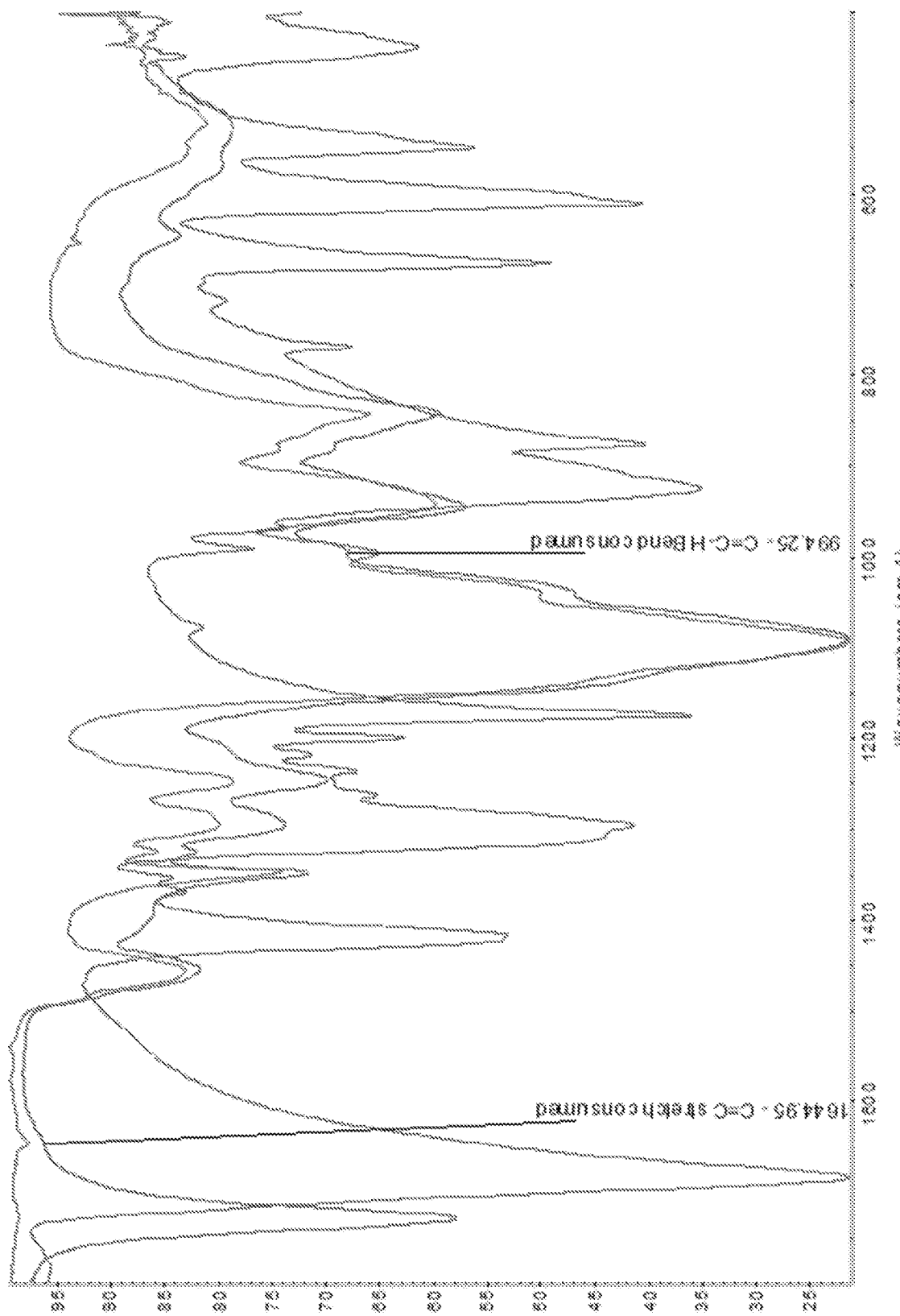
FIG. 2 is a Fourier-transform infrared (FTIR) spectra of the mercaptosuccinic acid starting material, the allyloxy PEG-750 starting material, and the hydroxy-terminated PEG-750 ligand product expanded for the 400-1800 $cm^{-1}$ wavelength range.

The product was characterized using FTIR spectroscopy, as shown in FIGS. 1 and 2. The clearest indicator of the progress of the reaction is the loss of the S—H stretch at 2100 cm$^1$, indicating consumption of the thiol in mercaptosuccinic acid. The O—H stretch at 3400-3500 cm is retained, indicating presence of the hydroxy group in the product.

Example 2

Preparation of a Hydroxy-Terminated Dicarboxylic Acid Ligand Using a Thermal Radical Initiator

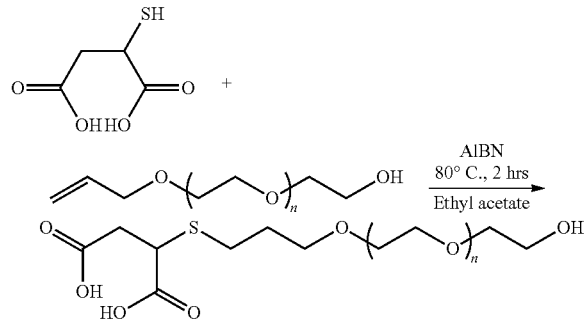

For the thermally initiated synthesis, the amounts of allyloxy polyethylene glycol and mercaptosuccinic acid were kept the same as above. Azobisisobutyronitrile (AIBN) at a concentration of 4% (w/w of total solids) was found to provide effective initiation, while also allowing easy removal of excess initiator after completion of the reaction.

All the components were mixed together in a 100 mL round bottom flask in a $N_2$ filled glovebox. The reaction mixture was heated at 80° C. for 2 hours, causing the ethyl acetate to reflux. The product was isolated by washing the reaction mixture with equal parts of hexane, followed by centrifugation. The bottom phase was dried under vacuum at room temperature to yield a clear, colorless to slightly yellowish liquid.

Example 3

Ligand Exchange

For ligand exchange, the hydroxy-terminated ligand of Example 2 was added to a solution of native quantum dots in chloroform. The amount of ligand added depends on the quantum dot type, and is typically 25% of the dry mass of quantum dots. After heating at 60° C. for 1 hour, the quantum dots were precipitated in a 4:1 ratio of hexane and centrifuged at 5000 rpm for 5 minutes. The supernatant was discarded and quantum dots were dispersed in chloroform. The ligand exchange process results in removal of the native hydrophobic ligands and replacement with the hydroxy-terminated ligands. Following this process, the quantum dots can be dispersed in a variety of polar hydrophilic solvents, such as propylene glycol monomethyl ether acetate (PGMEA) and 1,4-butanediol diacetate (BDDA).

The quantum dots can be combined with additional components to use in ink formulations. Solvents used for dispersing quantum dots and the main components of the inks are shown in Table 1.

TABLE 1

Composition of quantum dot inks.

| Ink curing method | Main components of the ink | Quantum dot solvent |
| --- | --- | --- |
| thermal | quantum dots, reactive polymers, curing agents, scattering particles, solvent | 1,4-butanediol diacetate (BDDA) |
| UV-cationic | quantum dots, epoxy monomers, photoacid generators, scattering particles | dioxetanyl ether (DOX) |

Example 4

Preparation of Films from Quantum Dot Inks

Films were fabricated from quantum dot inks using spin-coating at three different speeds (400 rpm, 700 rpm, and 1000 rpm). The films fabricated from thermal inks were cured by baking for 2 minutes at 100° C. in air, followed by 2 hours at 180° C. in $N_2$. The films fabricated from cationic inks were cured by placing them in an $N_2$-filled glovebox with a transparent quartz window and then irradiating the films with UV light (2000 mJ/cm$^2$).

Both films—those fabricated from thermal inks and those fabricated from cationic inks—were measured immediately after curing (To) and again after baking in air at 150° C. for 2 hours and 5 hours. These baking steps allowed the thermal and atmospheric stability of the films to be studied.

Figure 3A:
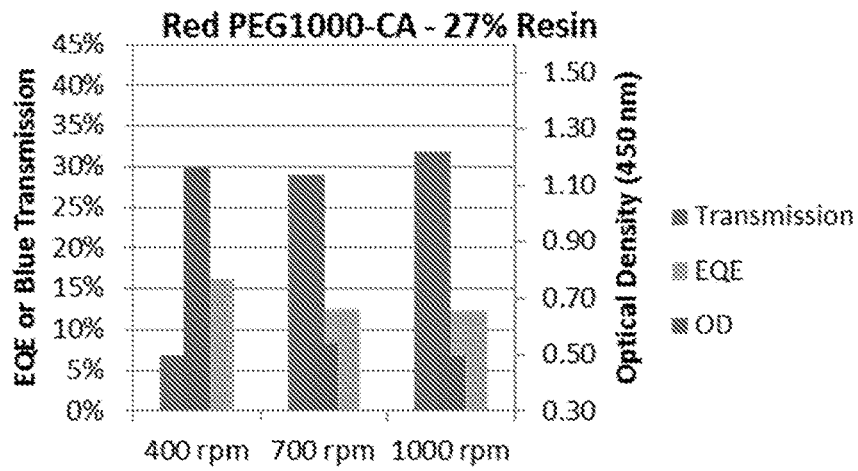
FIG. 3A is a bar graph showing percent blue transmission, percent external quantum efficiency (EQE), and optical density (450 nm) for films fabricated from thermal inks containing red quantum dots with carboxylic acid-terminated PEG-1000 ligands and resin (27%) using spin-coating at three different speeds (400 rpm, 700 rpm, and 1000 rpm). Measurements were taken immediately after curing.
Figure 3B:
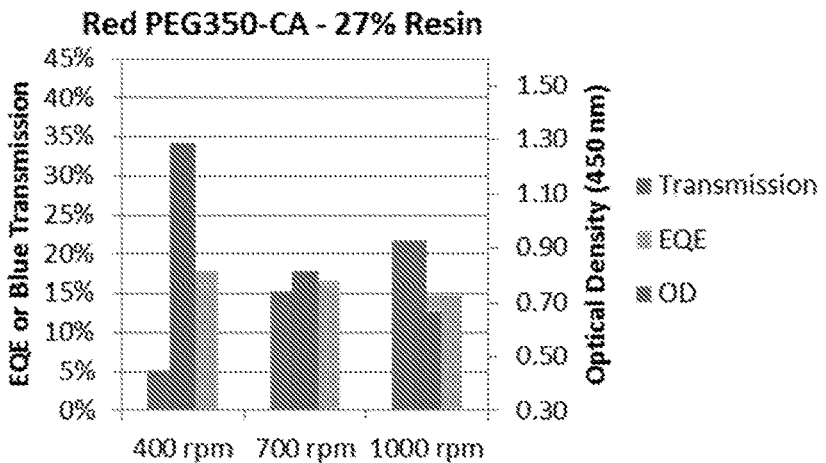
FIG. 3B is a bar graph showing percent blue transmission, percent EQE, and optical density (450 nm) for films fabricated from thermal inks containing red quantum dots with carboxylic acid-terminated PEG-350 ligands and resin (27%) using spin-coating at three different speeds (400 rpm, 700 rpm, and 1000 rpm). Measurements were taken immediately after curing.
Figure 3C:
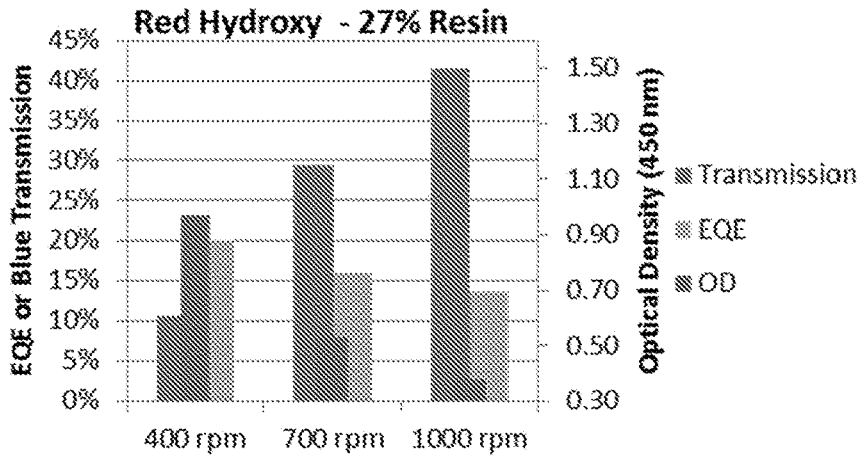
FIG. 3C is a bar graph showing percent blue transmission, percent EQE, and optical density (450 nm) for films fabricated from thermal inks containing red quantum dots with hydroxy-terminated PEG-750 ligands and resin (27%) using spin-coating at three different speeds (400 rpm, 700 rpm, and 1000 rpm). Measurements were taken immediately after curing.
Figure 4A:
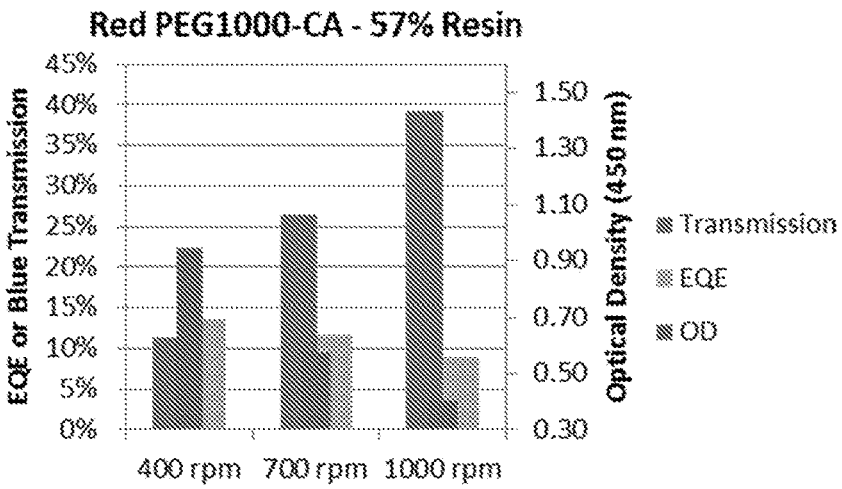
FIG. 4A is a bar graph showing percent blue transmission, percent EQE, and optical density (450 nm) for films fabricated from thermal inks containing red quantum dots with carboxylic acid-terminated PEG-1000 ligands and resin (57%) using spin-coating at three different speeds (400 rpm, 700 rpm, and 1000 rpm). Measurements were taken immediately after curing.
Figure 4B:
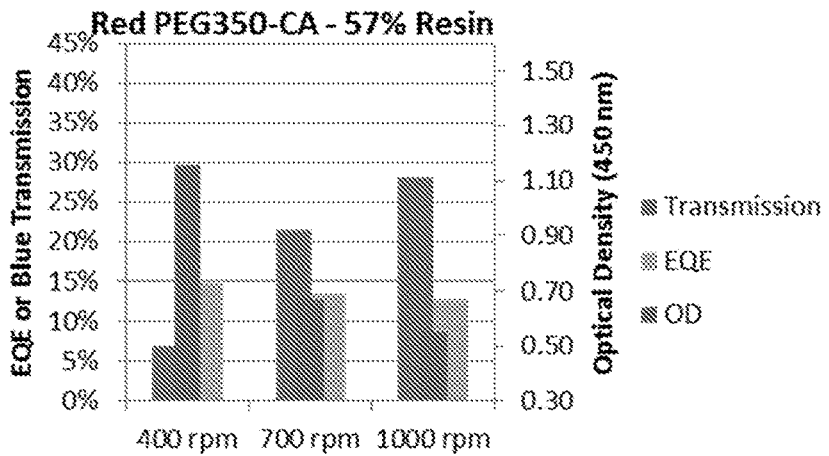
FIG. 4B is a bar graph showing percent blue transmission, percent EQE, and optical density (450 nm) for films fabricated from thermal inks containing red quantum dots with carboxylic acid-terminated PEG-350 ligands and resin (57%) using spin-coating at three different speeds (400 rpm, 700 rpm, and 1000 rpm). Measurements were taken immediately after curing.
Figure 4C:
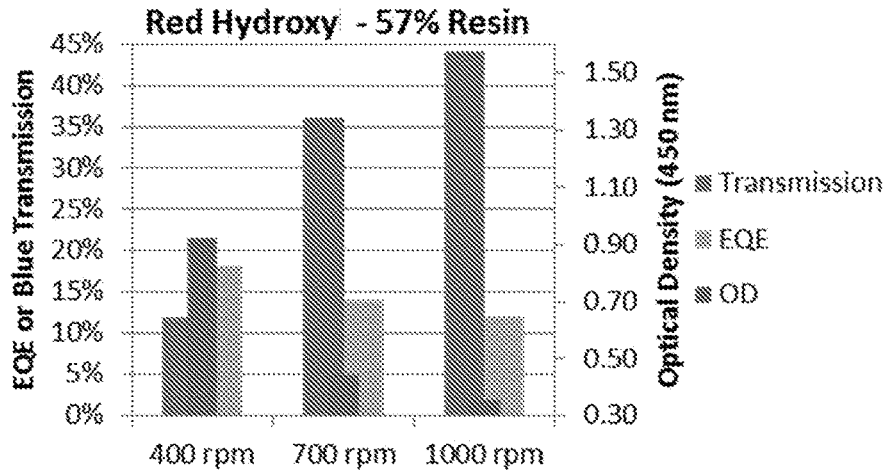
FIG. 4C is a bar graph showing percent blue transmission, percent EQE, and optical density (450 nm) for films fabricated from thermal inks containing red quantum dots with hydroxy-terminated PEG-750 ligands and resin (57%) using spin-coating at three different speeds (400 rpm, 700 rpm, and 1000 rpm). Measurements were taken immediately after curing.

Red quantum dot films were fabricated from thermal inks and the percent external quantum efficiency, percent blue transmission, and optical density (450 nm) were measured at $T_0$. Results for red quantum dot films containing 27% resin are shown in FIGS. 3A-3C for a red quantum dot with a PEG-1000 carboxylic acid ligand (FIG. 3A), for a red quantum dot with a PEG-350 carboxylic acid ligand (FIG. 3B), and for a red quantum dot with a PEG-750 polyfunctional hydroxy ligand (FIG. 3C). As shown in FIGS. 3A-3C, red films made from thermal inks containing quantum dots with PEG-750 polyfunctional ligands showed a higher external quantum efficiency (EQE) than films made from thermal inks containing other ligands. Results for red quantum dot films containing 57% resin are shown in FIGS. 4A-4C for a red quantum dot with a PEG-1000 carboxylic acid ligand (FIG. 4A), for a red quantum dot with a PEG-350 carboxylic acid ligand (FIG. 4B), and for a red quantum dot with a PEG-750 polyfunctional hydroxy ligand (FIG. 4C). As shown in FIGS. 4A-4C, red films made from thermal inks containing quantum dots with PEG-750 polyfunctional ligands showed a higher external quantum efficiency (EQE) than films made from thermal inks containing other ligands.

Figure 5A:
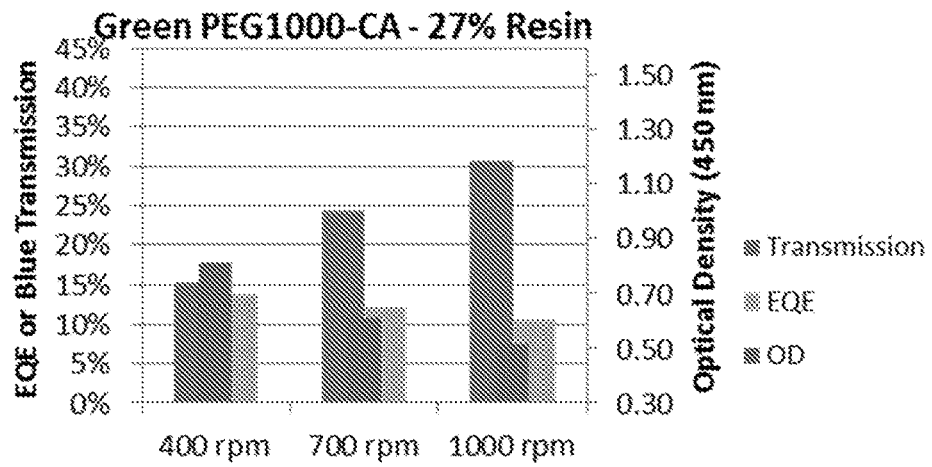
FIG. 5A is a bar graph showing percent blue transmission, percent EQE, and optical density (450 nm) for films fabricated from thermal inks containing green quantum dots with carboxylic acid-terminated PEG-1000 ligands and resin (27%) using spin-coating at three different speeds (400 rpm, 700 rpm, and 1000 rpm). Measurements were taken immediately after curing.
Figure 5B:
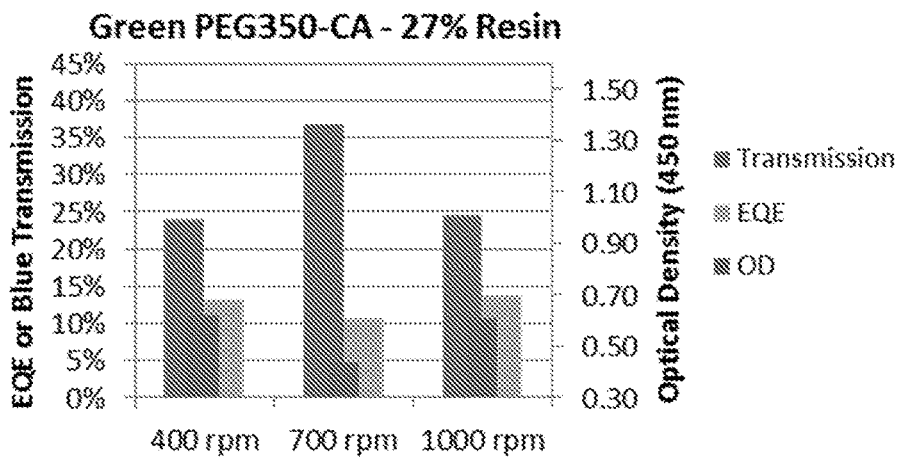
FIG. 5B is a bar graph showing percent blue transmission, percent EQE, and optical density (450 nm) for films fabricated from thermal inks containing green quantum dots with carboxylic acid-terminated PEG-350 ligands and resin (27%) using spin-coating at three different speeds (400 rpm, 700 rpm, and 1000 rpm). Measurements were taken immediately after curing.
Figure 5C:
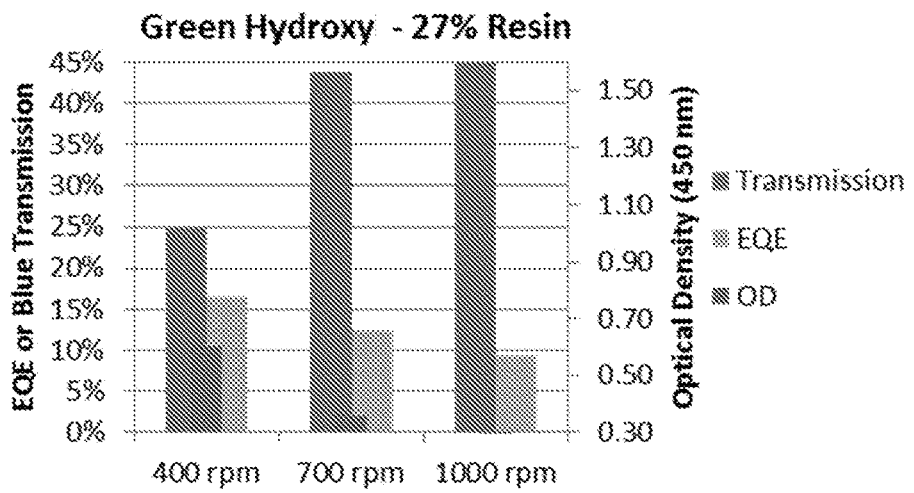
FIG. 5C is a bar graph showing percent blue transmission, percent EQE, and optical density (450 nm) for films fabricated from thermal inks containing green quantum dots with hydroxy-terminated PEG-750 ligands and resin (27%) using spin-coating at three different speeds (400 rpm, 700 rpm, and 1000 rpm). Measurements were taken immediately after curing.
Figure 6A:
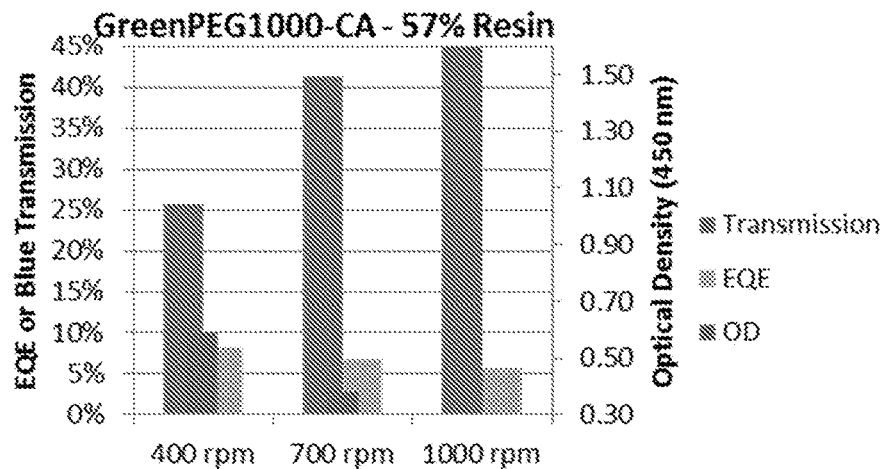
FIG. 6A is a bar graph showing percent blue transmission, percent EQE, and optical density (450 nm) for films fabricated from thermal inks containing green quantum dots with carboxylic acid-terminated PEG-1000 ligands and resin (57%) using spin-coating at three different speeds (400 rpm, 700 rpm, and 1000 rpm). Measurements were taken immediately after curing.
Figure 6B:
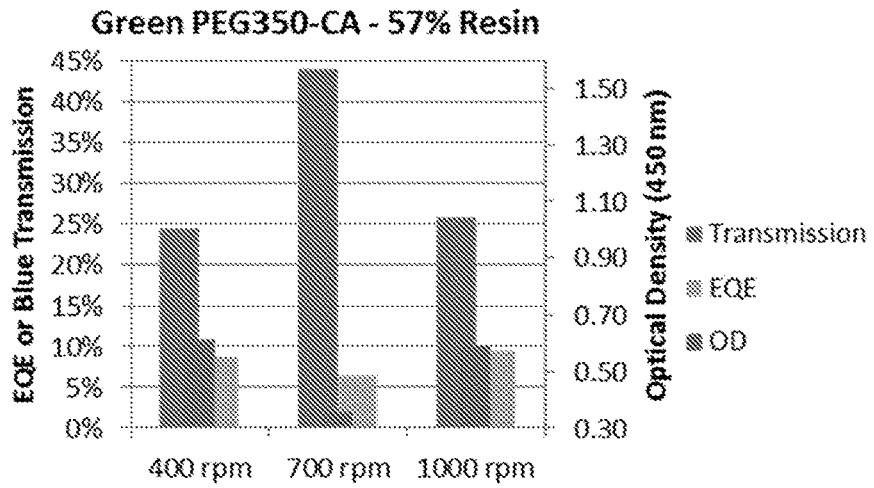
FIG. 6B is a bar graph showing percent blue transmission, percent EQE, and optical density (450 nm) for films fabricated from thermal inks containing green quantum dots with carboxylic acid-terminated PEG-350 ligands and resin (57%) using spin-coating at three different speeds (400 rpm, 700 rpm, and 1000 rpm). Measurements were taken immediately after curing.
Figure 6C:
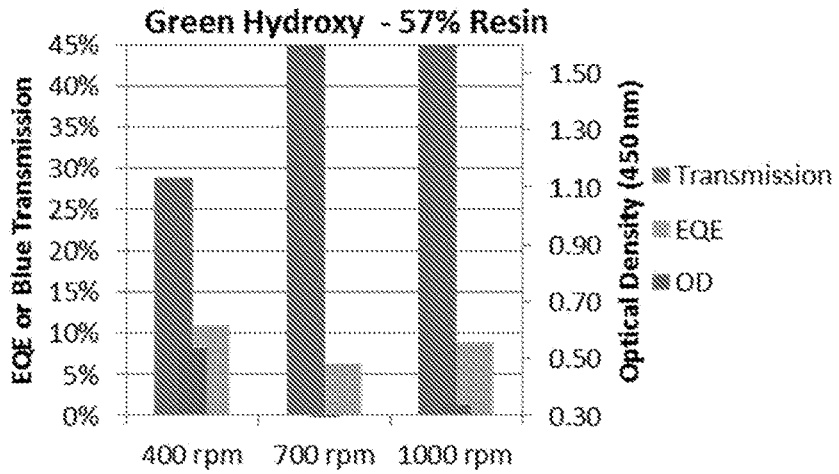
FIG. 6C is a bar graph showing percent blue transmission, percent EQE, and optical density (450 nm) for films fabricated from thermal inks containing green quantum dots with hydroxy-terminated PEG-750 ligands and resin (57%) using spin-coating at three different speeds (400 rpm, 700 rpm, and 1000 rpm). Measurements were taken immediately after curing.

Green quantum dot films were fabricated from thermal inks and the percent EQE, percent blue transmission, and optical density (450 nm) were measured at $T_0$. Results for green quantum dot films containing 27% resin are shown in FIGS. 5A-5C for a green quantum dot with a PEG-1000 carboxylic acid ligand (FIG. 5A), for a green quantum dot with a PEG-350 carboxylic acid ligand (FIG. 5B), and for a green quantum dot with a PEG-750 polyfunctional hydroxy ligand (FIG. 5C). As shown in FIGS. 5A-5C, green films made from thermal inks containing quantum dots with PEG-750 polyfunctional ligands showed a higher external quantum efficiency (EQE) than films made from thermal inks containing other ligands. Results for green quantum dot films containing 57% resin are shown in FIGS. 6A-6C for a green quantum dot with a PEG-1000 carboxylic acid ligand (FIG. 6A), for a green quantum dot with a PEG-350 carboxylic acid ligand (FIG. 6B), and for a red quantum dot with a PEG-750 polyfunctional hydroxy ligand (FIG. 6C). As shown in FIGS. 6A-C, green films made from thermal inks containing quantum dots with PEG-750 polyfunctional ligands showed a higher external quantum efficiency (EQE) than films made from thermal inks containing other ligands.

Figure 7A:
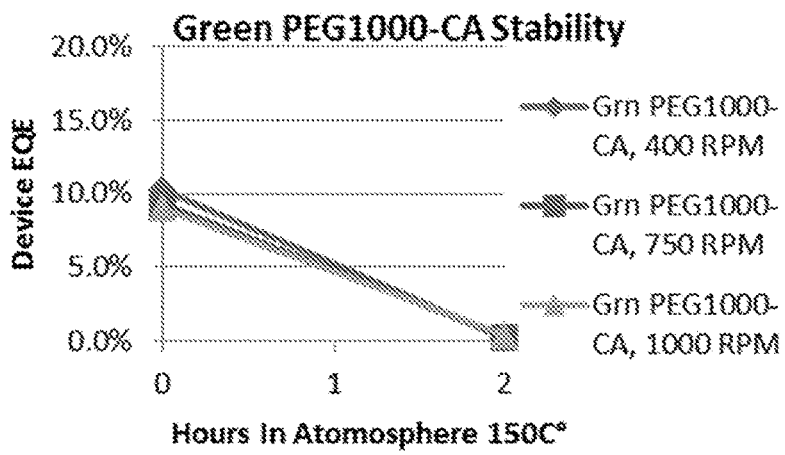
FIG. 7A is a line graph showing percent EQE for films fabricated from UV-cationic inks containing green quantum dots with carboxylic acid-terminated PEG-1000 ligands using spin-coating at three different speeds (400 rpm, 700 rpm, and 1000 rpm). Measurements were taken immediately and after baking in air at 150° C. for 2 hours.
Figure 7B:
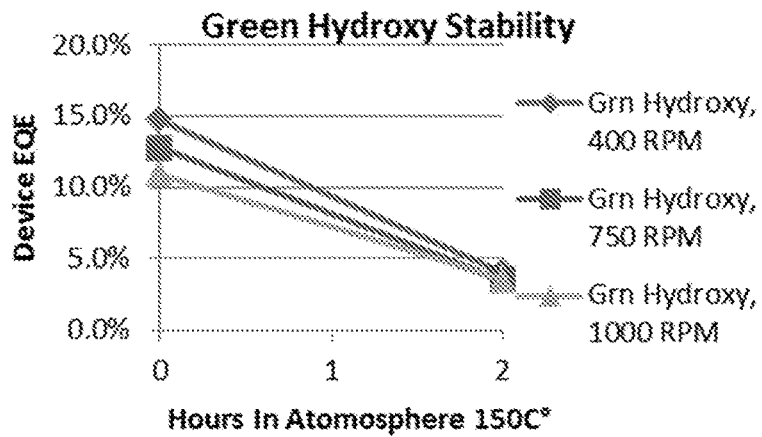
FIG. 7B is a line graph showing percent EQE for films fabricated from UV-cationic inks containing green quantum dots with hydroxy-terminated PEG-750 ligands using spin-coating at three different speeds (400 rpm, 700 rpm, and 1000 rpm). Measurements were taken immediately and after baking in air at 150° C. for 2 hours.
Figure 7C:
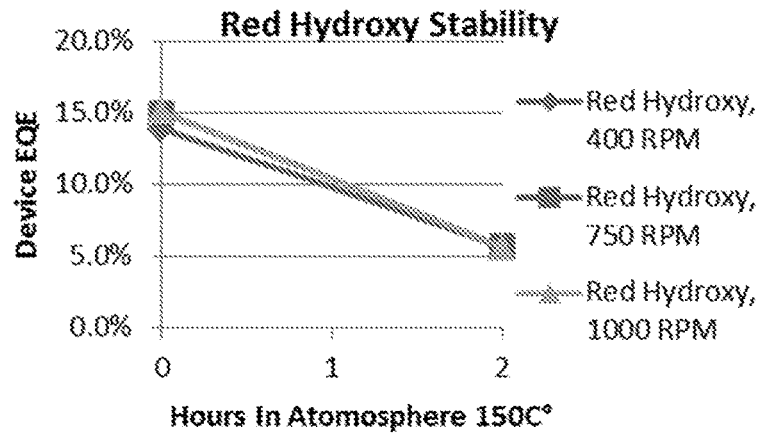
FIG. 7C is a line graph showing percent EQE for films fabricated from UV-cationic inks containing red quantum dots with hydroxy-terminated PEG-750 ligands using spin-coating at three different speeds (400 rpm, 700 rpm, and 1000 rpm). Measurements were taken immediately and after baking in air at 150° C. for 2 hours.

Films were also prepared using cationic inks containing quantum dots (FIGS. 7A-7C). The EQE of both red quantum dot films and green quantum dot films was measured at $T_0$ and after baking in air at 150° C. for 2 hours. As shown in FIG. 7A, green quantum dot films with a PEG-1000 carboxylic acid ligand showed a EQE of about 10% which dropped to about 0% after 2 hours. As shown in FIG. 7B, green quantum dos films with a PEG-750 polyfunctional hydroxy ligand showed a EQE of about 10-15% which dropped to about 3-5% after 2 hours. And, as shown in FIG. 7C, red quantum dot films with a PEG-750 polyfunctional hydroxy ligand showed a EQE of about 15% which dropped to about 5% after 2 hours. As shown in FIG. 7A, the EQE of the films with PEG-1000 went down to almost zero after two hours. But, even after baking for 2 hours at 150° C. in air, the films made from quantum dots with polyfunctional PEG-750 hydroxy ligands showed higher EQE, indicating an improvement in thermal and atmospheric stability.

While various embodiments have been described above, it should be understood that they have been presented by way of example only, and not limitation. It will be apparent to persons skilled in the relevant art that various changes in form and detail can be made therein without departing from the spirit and scope of the invention. Thus, the breadth and scope should not be limited by any of the above-described exemplary embodiments, but should be defined only in accordance with the following claims and their equivalents.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. A nanostructure composition, comprising:
(a) at least one population of nanostructures; and
(b) at least one polyfunctional poly(alkylene oxide) ligand, wherein the poly(alkylene oxide) ligand comprises at least two terminal functional groups, wherein at least one terminal functional group is bound to the surface of the nanostructures;
wherein the at least one polyfunctional poly(alkylene oxide) ligand has the formula (IV):

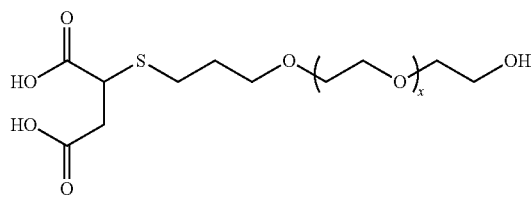

wherein:
x is 1 to 100.

2. The nanostructure composition of claim 1, wherein the nanostructures are quantum dots.

3. A nanostructure composition, comprising:
(a) at least one population of nanostructures;
(b) a polyfunctional poly(alkylene oxide) ligand bound to the nanostructures; and
(c) at least one organic resin;
wherein the polyfunctional poly(alkylene oxide) ligand has the formula (IV):

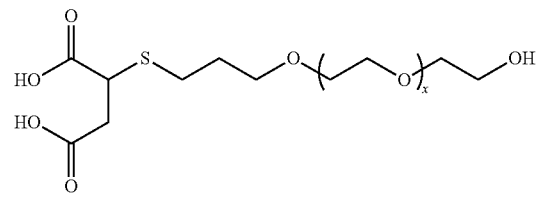

wherein:
x is 1 to 100.

4. The nanostructure composition of claim 3, comprising between one and five populations of nanostructures.

5. The nanostructure composition of claim 3, comprising one population of nanostructures.

6. The nanostructure composition of claim 3, wherein the nanostructures comprise a core selected from the group consisting of InP, InZnP, InGaP, CdSe, CdS, CdSSe, CdZnSe, CdZnS, ZnSe, ZnSSe, InAs, InGaAs, and InAsP.

7. The nanostructure composition of claim 3, wherein the nanostructures comprise a core of InP.

8. The nanostructure composition of claim 3, wherein the nanostructure composition comprises as a weight percentage between about 0.0001% and about 5% of the at least one population of nanostructures.

9. The nanostructure composition of claim 3, wherein the nanostructure composition comprises a population of nanostructures comprising a InP core and/or a population of nanostructures comprising a CdSe core.

10. A molded article comprising the nanostructure composition of claim 3.

11. The molded article of claim 10, wherein the molded article is a film, a substrate for a display, or a light emitting diode.

12. The molded article of claim 10, wherein the molded article is a film.

13. A method of replacing a first ligand on a nanostructure with a second ligand, the method comprising admixing a reaction mixture comprising a population of nanostructures having the first ligand non-covalently bound to the nanostructure and a polyfunctional poly(alkylene oxide) ligand which is the second ligand, such that the second ligand displaces the first ligand and becomes non-covalently bound to the nanostructure, wherein the polyfunctional poly(alkylene oxide) ligand has formula (IV):

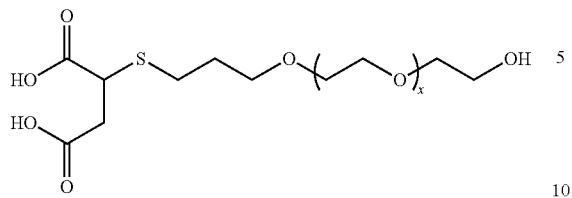

(IV)

wherein:
x is 100.

14. A method of preparing a nanostructure composition, the method comprising:
(a) providing a composition comprising at least one population of nanostructures and polyfunctional poly(alkylene oxide) ligands bound to the nanostructures; and
(b) admixing at least one organic resin with the composition of (a);
wherein the polyfunctional poly(alkylene oxide) ligands have the formula (IV):

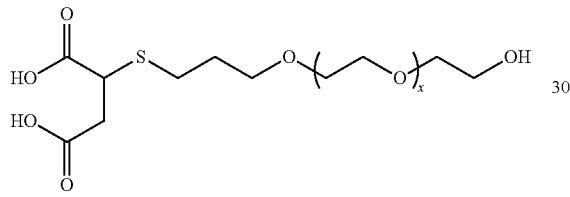

(IV)

wherein:
x is 1 to 100.

15. A nanostructure film layer comprising:
(a) at least one population of nanostructures comprising a polyfunctional poly(alkylene oxide) ligand bound to the nanostructures; and
(b) at least one organic resin;
wherein the polyfunctional poly(alkylene oxide) ligand has the formula (IV):

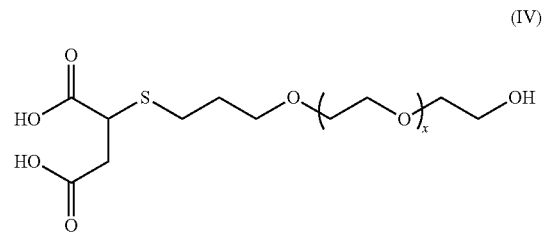

(IV)

wherein:
x is 1 to 100.

16. The nanostructure composition of claim 1, wherein x is 1 to 10.
17. The nanostructure composition of claim 3, wherein x is 1 to 10.
18. The molded article of claim 10, wherein x is 1 to 10.
19. The method of claim 13, wherein x is 1 to 10.
20. The method of claim 14, wherein x is 1 to 10.
21. The nanostructure film layer of claim 15, wherein x is 1 to 10.

* * * * *

UNITED STATES PATENT AND TRADEMARK OFFICE
CERTIFICATE OF CORRECTION

PATENT NO. : 11,267,980 B2
APPLICATION NO. : 16/758626
DATED : March 8, 2022
INVENTOR(S) : Tangirala et al.

Page 1 of 1

It is certified that error appears in the above-identified patent and that said Letters Patent is hereby corrected as shown below:

In the Specification

In Column 26, Line 50, insert --is - -- after "$R^{1A}$".

In Column 26, Line 53, delete "X" and insert --$X_1$--, therefore.

In Column 26, Line 54, delete "X" and insert --$X_1$--, therefore.

In Column 26, Line 55, delete "X" and insert --$X_1$--, therefore.

In Column 27, Line 48, delete "$C_1$" and insert --$C_{1-12}$--, therefore.

In Column 28, Line 10, insert --is - -- after "$R^{1A}$".

In Column 31, Lines 23-26, delete " 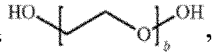 " and insert -- 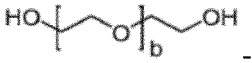 --, therefore.

In Column 32, Line 11, delete "$R^1$" and insert --$R^{1B}$--, therefore.

In Column 32, Line 11, delete "$R^1$" and insert --$R^{1B}$--, therefore.

In Column 32, Line 12, delete "$R^1$" and insert --$R^{1B}$--, therefore.

In Column 32, Line 13, delete "$R^1$" and insert --$R^{1B}$--, therefore.

In Column 32, Line 14, delete "$R^1$" and insert --$R^{1B}$--, therefore.

In the Claims

In Column 55, Claim 13, Line 13, insert --1 to-- after "is".

Signed and Sealed this
Twenty-eighth Day of June, 2022

Katherine Kelly Vidal
*Director of the United States Patent and Trademark Office*